(12) United States Patent
Lee et al.

(10) Patent No.: US 8,487,070 B2
(45) Date of Patent: Jul. 16, 2013

(54) SULFONATED POLY(ARYLENE ETHER) HAVING CROSSLINKABLE MOIETY COMBINED IN CHAIN OF POLYMER, SULFONATED POLY(ARYLENE ETHER) HAVING CROSSLINKABLE MOIETIES COMBINED IN POLYMER AND AT POLYMER END GROUP, AND POLYMER ELECTROLYTE MEMBRANE USING SULFONATED POLY(ARYLENE ETHER)

(75) Inventors: Jae-Suk Lee, Gwangju (KR); Myung-Hwan Jeong, Gwangju (KR); Kwan-Soo Lee, Gwangju (KR); Eun-Seon Park, Gwangju (KR); Young-Mu Joe, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 716 days.

(21) Appl. No.: 12/246,495

(22) Filed: Oct. 6, 2008

(65) Prior Publication Data

US 2009/0233146 A1    Sep. 17, 2009

(30) Foreign Application Priority Data

Oct. 11, 2007    (KR) .................. 10-2007-0102342

(51) Int. Cl.
*C08G 75/00*    (2006.01)

(52) U.S. Cl.
USPC ........... 528/373; 528/220; 528/125; 528/171; 528/295; 521/27; 429/493; 429/479; 429/480; 429/498

(58) Field of Classification Search
USPC ........... 528/373, 220, 125, 171, 295; 521/27; 429/493, 479, 480, 498
See application file for complete search history.

(56) References Cited

U.S. PATENT DOCUMENTS 7,173,155 B1 *    2/2007    Lee et al. .................. 568/34

2004/0191602 A1    9/2004    Ishikawa et al.
(Continued)

FOREIGN PATENT DOCUMENTS

EP    1 890 355 A2    2/2008
JP    2003292609 A    10/2003
(Continued)

OTHER PUBLICATIONS

Heo et al. Journal of Power Source, 172, 2007, 215-219.*
(Continued)

*Primary Examiner* — Shane Fang

(57) ABSTRACT

A sulfonated poly(arylene ether) copolymer that has a crosslinking structure in a chain of a polymer, a sulfonated poly(arylene ether) copolymer that has a crosslinking structure in and at an end of a chain of a polymer, and a polymer electrolyte film that is formed by using them are disclosed. According to the polycondensation reaction of the sulfonated dihydroxy monomer (HO—SAr1-OH), the none sulfonated dihydroxy monomer (HO—Ar—OH), the crosslinkable dihalide monomer (X—CM-X) and the none sulfonated dihalide monomer (X—Ar—X), the poly(arylene ether) copolymer in which the sulfonic acid is included is synthesized. The formed poly(arylene ether) copolymer has the crosslinkable structure in the chain of the polymer. In addition, by carrying out the polycondensation reaction in respects to the crosslinkable monohydroxy monomer or the crosslinkable monohalide monomer, the crosslinking can be formed at the end of the polymer. Through this, the thermal stability, the mechanical stability, the chemical stability, the film formation ability and the like is the same as or better than those of the Nafion film that is currently commercialized and is used as the polymer electrolyte film, and the proton conductivity and the cell performance are excessively improved. In addition, even though it is exposed to the moisture over a long period of time, since there is no change in the property of the electrolyte film, the dimensional stability is high.

6 Claims, 15 Drawing Sheets

U.S. PATENT DOCUMENTS

| | | | |
|---|---|---|---|
| 2006/0088749 A1 | 4/2006 | Panambur et al. | |
| 2006/0280988 A1* | 12/2006 | Chen | 429/33 |
| 2007/0082247 A1 | 4/2007 | Lee et al. | |
| 2007/0207361 A1 | 9/2007 | Yamashita | |
| 2007/0231671 A1* | 10/2007 | Inasaki et al. | 429/40 |
| 2010/0105786 A1* | 4/2010 | Onodera et al. | 521/27 |

FOREIGN PATENT DOCUMENTS

| | | |
|---|---|---|
| JP | 2004010677 A | 1/2004 |
| JP | 2005264008 A | 9/2005 |
| JP | 2007107003 A | 4/2007 |
| JP | 2008542505 A | 11/2008 |

OTHER PUBLICATIONS

European Search Report for EP 08 10 5545 filed on Oct. 11, 2007.

* cited by examiner

SPAEDF-mSX30-1
SPAEDF-mSX25-1
SPAEDF-mSX20-1
SPAEDF-mSX15-1
SPAEDF-mSX10-1

SULFONATED POLY(ARYLENE ETHER) HAVING CROSSLINKABLE MOIETY COMBINED IN CHAIN OF POLYMER, SULFONATED POLY(ARYLENE ETHER) HAVING CROSSLINKABLE MOIETIES COMBINED IN POLYMER AND AT POLYMER END GROUP, AND POLYMER ELECTROLYTE MEMBRANE USING SULFONATED POLY(ARYLENE ETHER)

BACKGROUND OF THE INVENTION

1. Field of the Invention

The present invention relates to a sulfonated poly(arylene ether) copolymer and a polymer electrolyte film using the same, and more particularly, to a sulfonated poly(arylene ether) copolymer that has a crosslinking structure in a polymer chain, and in and at an end of a polymer chain, and a polymer electrolyte film that is crosslinked by using the same.

2. Description of the Related Art

The fuel cell is the electrical energy transforming system that converts the chemical energy into the electrical energy with the electro chemistry reaction that invented by Grove in the $19^{th}$ century. The fuel cell was used as the special purpose for 1960's like the Gemini spaceship, but it is expected to be used as the engine power of the non-polluted vehicle from the end of 1980's, and research and development about this all over the world actively proceed as the alternative energy corresponding to the increment of explosive population and electricity consumption.

In particular, since total pollutant load control of the carbon dioxide through the Green Round (convention on climatic change) and the low-pollutant vehicle obligatory sale have been being near at hand, the motor company of every country hurries the development of the pollution-free car like the fuel cell vehicle. In addition, the fuel cell can be immediately used for the munitions purpose power generation including the field stand small scale power generation of building and partial area, submarine, mobile communications and the like. This fuel cell does not have the function of accumulating the electricity, but is a clean high efficiency generation apparatus in which efficiency is high as the generation device in comparison with the preexistence internal combustion engine, the fuel-use quantity is less, and the environment load substance that includes sulfur oxides (Sox), nitric oxide (NOx) and the like are almost not discharged, and is expected as the solution plan of the environment problem in respects to the fossil fuel usage.

The polymer electrolyte that is used as a cation exchange resin or a cation exchange film in the fuel cell has been used for decades and continuously studied. Recently, as the medium that transfers the cations that are used in the direct methanol fuel cell (DMFC) or the polymer electrolyte membrane fuel cell (PEMFC), many studies in respects to the cation exchange film have been made.

Currently, as the cation exchange film that is extensively commercialized in the fuel cell field, there is a Nafion™ film that is a polymer including the hyperfluoride sulfon acid group. When the film includes moisture in the saturated moisture content, it has the ion conductivity of 0.1 S/cm and the excellent mechanical strength and chemical resistance, and also has the stable performance as the electrolyte film so that it is used in the fuel cell for vehicles. In addition, as the commercial film that has the similar shape, there are an Aciplex-S film that is manufactured by Asahi Chemicals, Co., Ltd, a Dow film that is manufactured by Dow Chemicals, Co., Ltd., a Flemion film that is manufactured by Asahi Glass, Co., Ltd., a GoreSelcet film that is manufactured by Gore & Associate, Co., Ltd. and the like, and an alpha or beta type perfluorinated polymer has been developed in Ballard Power System, Co., Ltd.

However, since the above films are costly, there is a difficulty in mass production because of the critical synthesis methods, there is a methanol crossover phenomenon in an electric energy system such as a direct methanol fuel cell, and they have the low proton conductivity at the high temperature or the low temperature, thus showing the property in which the efficiency is largely reduced as the cation exchange film, they are used for the limited purpose.

Because of these disadvantages, many studies have been made in respects to the cation exchange film in which a non fluorine system is substituted and fluorine is partially substituted, and a representative example thereof includes a sulfonated poly(phenylene oxide) system, a poly(phenylene sulfide) system, a polysulfone system, a poly(para-phenylene) system, a polystyrene system, a polyether ether ketone system, a polyimide and the like.

However, since their ion conductivities are in proportion to the degree of sulfonification, in the case of when they are sulfonificated over the critical concentration, the reduction of molecular weight cannot be avoided, there is a disadvantage in that it cannot be used over a long period of time because of the reduction of the mechanical properties in the hydration, thus in order to improve this, a method for producing the polymer using the sulfonated monomer and a method for selectively sulfonating the polymer have been studied and developed [U.S. Pat. Nos. 5,468,574, 5,679,482, and 6,110,616], but the high temperature stability and the problems that occur in use over a long period of time are not completely avoided.

Therefore, there is a need to develop a novel material that has the excellent electrochemical property, and high temperature stability, and can be easily produced for a thin film.

SUMMARY OF THE INVENTION

The present invention has been made keeping in mind the above problems occurring in the related arts, a primary object of the present invention is to provide a sulfonated poly(arylene ether) copolymer that has a crosslinking structure in a polymer chain.

In addition, a secondary object of the present invention is to provide a sulfonated poly(arylene ether) copolymer that has a crosslinking structure in and at an end of a polymer chain.

In addition, a tertiary object of the present invention is to provide a polymer electrolyte film using the poly(arylene ether) copolymer that is provided by accomplishing the primary object and the secondary object.

In order to accomplish the primary object, the present invention provides a poly(arylene ether) copolymer that has a crosslinking structure in a polymer chain that is represented by the following Formula 1 and is sulfonated:

[Formula 1]

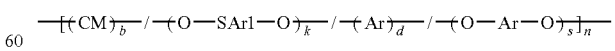

wherein SAr1 represents an sulfonated aromatic, Ar represents a none sulfonated aromatic, and CM represents a crosslinkable moiety, wherein k is in the range of 0.001-1.000, s=1−k, b is in the range of 0.001-1.000, d=1−b, n represents a repeating unit of a polymer, and n is an integer and is in the range of 10 to 500.

In order to accomplish the secondary object, the present invention provides a poly(arylene ether) copolymer that has a crosslinking structure inside and at an end of a polymer chain that is represented by the following Formula 2 and is sulfonated:

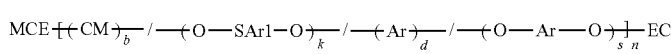

[Formula 2]

wherein SAr1 represents an sulfonated aromatic, Ar represents a none sulfonated aromatic, CM represents a crosslinkable moiety in the polymer chain, and ECM represents a crosslinkable moiety at the end of the polymer, wherein k is in the range of 0.001-1.000, s=1−k, b is in the range of 0.001-1.000, d=1−b, n represents a repeating unit of a polymer, and n is an integer and is in the range of 10 to 500.

In order to accomplish the tertiary object, the present invention provides a polymer electrolyte film that is crosslinked through the heat treatment and the acid treatment by using a sulfonated poly(arylene ether) copolymer that is represented by the following Formula 1 or 2:

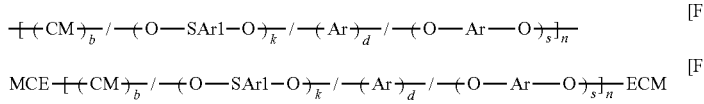

[Formula 1]

[Formula 2]

wherein SAr1 represents an sulfonated aromatic, Ar represents a none sulfonated aromatic, CM represents a crosslinkable moiety in the polymer chain, and MCE represents a crosslinkable moiety at the end of the polymer, wherein k is in the range of 0.001-1.000, s=1−k, b is in the range of 0.001-1.000, d=1−b, n represents a repeating unit of a polymer, and n is an integer and is in the range of 10 to 500.

According to the present invention, the polymer electrolyte film that uses the sulfonated poly(arylene ether) copolymer including the crosslinking structure maintains the thermal stability, the mechanical stability, the chemical stability, the film formation ability and the like that are the same as or better than those of the polymer electrolyte film that is commercialized in the related art. In addition, in terms of the proton conductivity and the cell performance, in comparison with the known polymer electrolyte film, the excessively improved effect is shown, even though it is exposed to the moisture over a long period of time, since there is no change in the electrolyte film property, the high stability is shown and it can be used in a fuel cell, a secondary cell and the like.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

DESCRIPTION OF THE PREFERRED EMBODIMENTS

Figure 1:
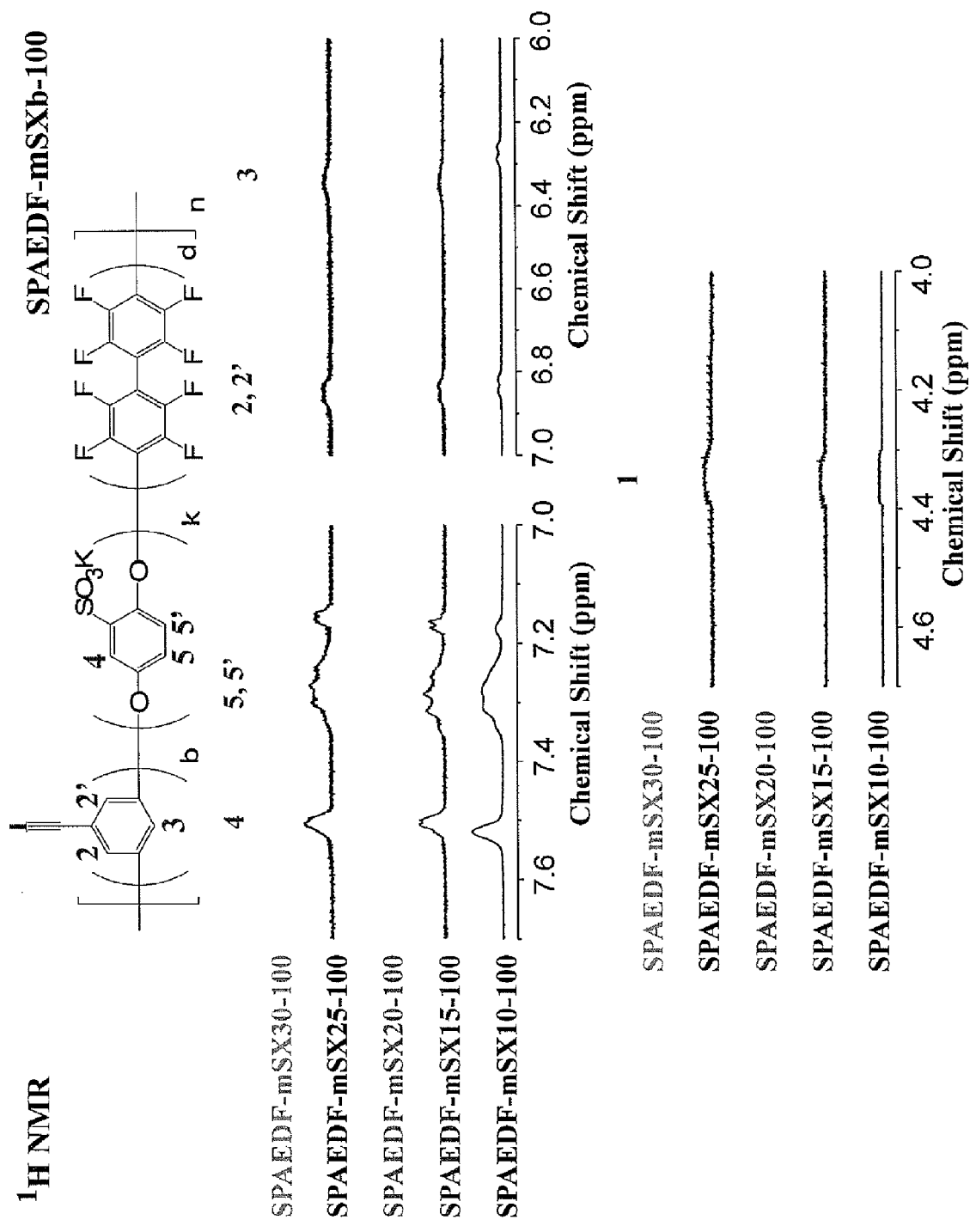
FIG. 1 is a view that illustrates a $^1$H-NMR spectrum of a sulfonated poly(arylene ether) copolymer (SPAEDF-mSXb-100) that includes a crosslinking structure according to the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. This invention may, however, be embodied in many different forms and should not be construed as being limited to the embodiments set forth herein; rather, these embodiments are provided so that this disclosure will be thorough and complete, and will fully convey the concept of the invention to those of ordinary skill in the art.

In addition, the terminology used herein is for the purpose of describing particular embodiments only and is not intended to be limited by the exemplified embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

It is to be understood that all the terminology used therein including technical and scientific terms has the same meansing those that are understood by those who skilled in the art. It must be understood that the terms defined by the dictionary are identical with the meaning of the context of the related art, and they should not be ideally or excessively formally defined unless the context clearly dictate otherwise.

The preferred embodiments of the invention will now be described more fully with reference to the accompanying drawings.

Example 1

The sulfonated poly(arylene ether) copolymer according to Example 1 of the present invention has a crosslinking structure in a repeating unit of a polymer. In particular, the crosslinking structure is formed at an end of the repeating unit of a polymer. This sulfonated poly(arylene ether) copolymer is represented by the following Formula 1.

[Formula 1]

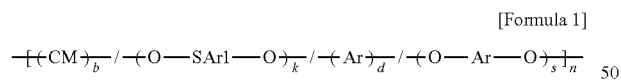

Wherein SAr1 represents a sulfonated aromatic. SAr1 is

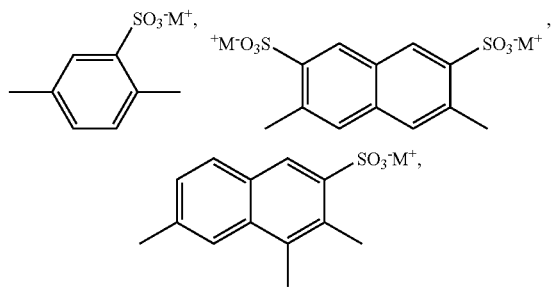

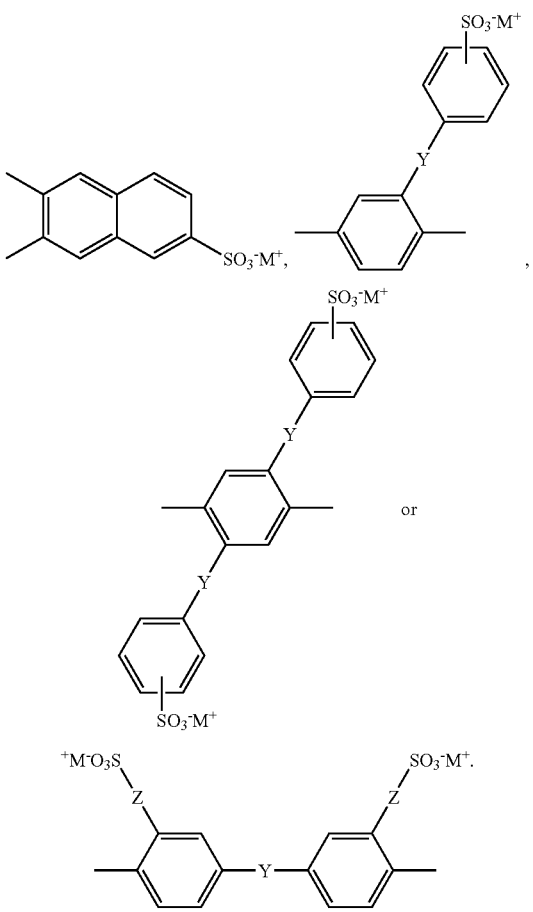

In addition, Ar represents a none sulfonated aromatic, and

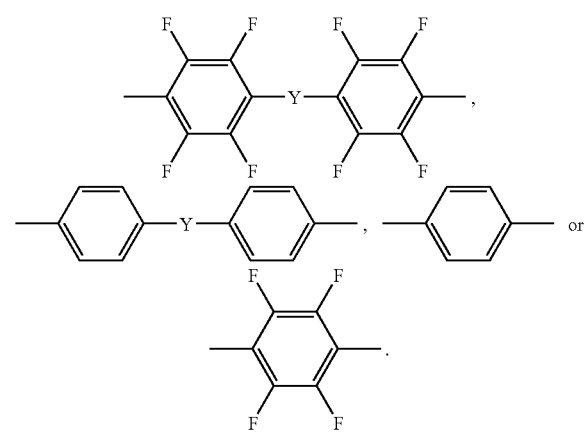

Y is a single bond in which carbon and carbon are directly connected to each other, —O—, —S—,

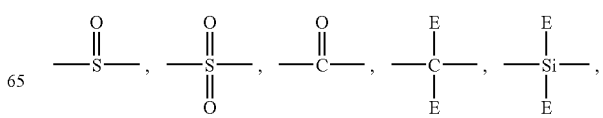

-continued

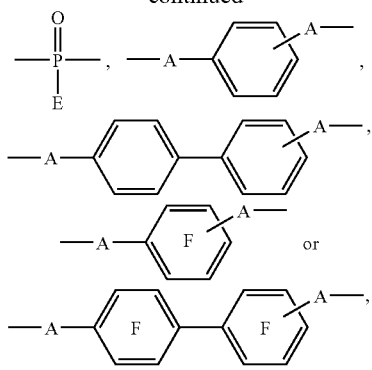

A is a single bond in which carbon and carbon are directly connected to each other, —O—, —S—,

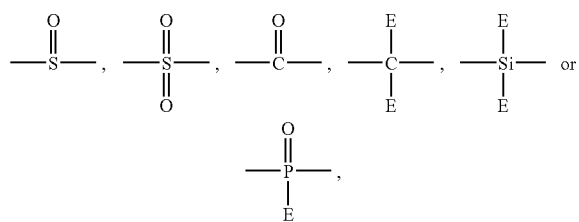 or

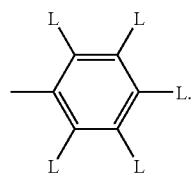

E is H, CH₃, F, CF₃, C1~C5 or

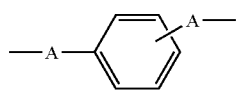

In addition, in Y,

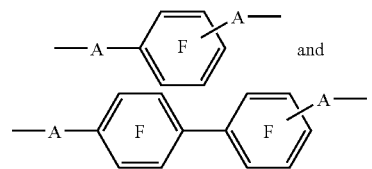

represents a benzene structure in which a connection moiety is capable of being positioned at an ortho, metha, or para positions, and

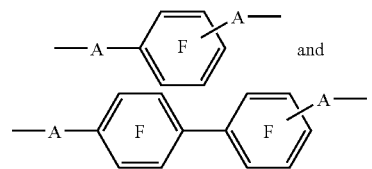

represents a benzene structure in which fluorine is completely substituted and a connection moiety is capable of being positioned at ortho, metha, or para positions.

In addition, in E, H represents hydrogen, F represents fluorine, C1~C5 represents an alkyl structure that has 1 to 5 carbon atoms and is substituted with hydrogen or fluorine, and

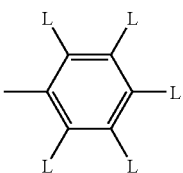

represents a structure in which L is substituted in benzene. L represents H, F, or C1~C5, H represents hydrogen, F represents fluorine, C1~C5 represents an alkyl structure that has 1 to 5 carbon atoms and is substituted with hydrogen or fluorine.

In addition, Z is a bond in which carbon of benzene is directly bonded to —SO₃⁻M⁺,

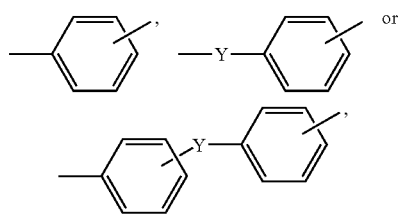

and may be positioned at ortho, metha, or para positions. The meaning of Y in Z is the same as the meaning of Y as described above.

M⁺ is a counterion having a cation charge, and represents a potassium ion (K⁺), a sodium ion (Na⁺) or alkyl amine (⁺NR₄) or the like, and preferably the potassium ion or the sodium ion.

CM is a crosslinkable moiety, and

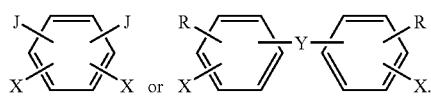

In CM, J is

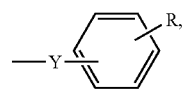

R is a triple bond that is substituted by R1 (ethynyl part)

(R = —≡R1), a double bond (vinyl part) (R=

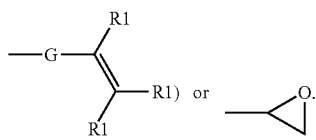

In R, G is a single bond in which carbon and carbon are directly connected to each other, —O—, —S— or

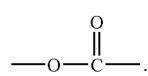.

In addition, R1 is H, F, C1~C5 or

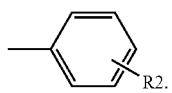

In R1, H represents hydrogen, F represents fluorine, C1~C5 represents an alkyl structure that has 1 to 5 carbon atoms and is substituted with hydrogen or fluorine, and R2 represents a substituent that has a benzene structure that is capable of being substituted at the ortho, metha, and para positions. R2 is H, X, or C1~C5. In R2, H represents hydrogen, and C1~C5 represents an alkyl structure that has 1 to 5 carbon atoms and is substituted with hydrogen or fluorine, x corresponds to a halogen atom, and X may be a functional group that can perform the polymerization in conjunction with a hydroxy group of another polymer chain. In CM, the meaning of Y is the same as the meaning of Y as described above.

In addition, in Formula 1, k, s, b and d represents a molar ratio of each of the monomers. K is in the range of 0.001-1.000, s=1-k, b is in the range of 0.001-1.000, and d=1-b. In addition, n represents a repeating unit of the polymer, and n is an integer and is in the range of 10~500.

The sulfonated poly(arylene ether) copolymer that has the crosslinking structure in the polymer chain of Formula 1 according to Example 1 of the present invention is produced by using the following Reaction Equation 1.

100 hours to produce the polymer corresponding to Formula 1. In addition, the polar solvent is classified into the non protonic polar solvent (aprotic polar solvent) and the protonic polar solvent, and it is preferable that the non protonic polar solvent is used.

In addition, according to the kind of the solvent production, instead of the non protonic polar solvent, the protonic polar solvent (protic polar solvent) may be used.

In addition, in the present example, in order to improve the thermal stability, the electrochemical property, the film formation ability, the dimension stability, the mechanical stability, the chemical property, the physical property, the cell performance and the like of the polymer that is represented by Formula 1, the CM (Crosslinkable Moiety) that includes the crosslikable group that is capable of being thermally crosslinked in the chain of the polymer is substituted by the polycondensation reaction to produce the desired sulfonated poly(arylene ether) copolymer that includes the crosslinking structure in the chain of the polymer of Formula 1.

In polycondensation reaction and the crosslinkable group introduction reaction for synthesizing the sulfonated poly (arylene ether) copolymer that includes the crosslinking structure in the desired polymer chain in the present embodiment, as the base, an inorganic base that is selected from an alkali metal, hydroxides of an alkali earth metal, carbonate and sulfate may be used, or an organic base that is selected from ammonia and general amines may be used.

In addition, a non protonic polar solvent or a protonic polar solvent may be used as the reaction solvent. N-methylpyrroli-

[Reaction Equation 1]

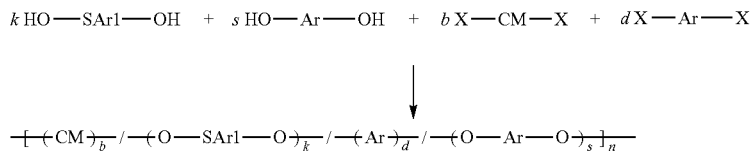

[Formula 1]

The Reaction Equation 1 illustrates the reaction process for producing the polymer of Formula 1, the method for the polymer corresponding to Formula 1 is the polycondensation method, and the monomers that participate in the reaction may be different from each other. In particular, as the sulfonated monomer that is used in Reaction Equation 1, the dihydroxy monomer (HO—SAr1-OH) may be used.

In addition, in Reaction Equation 1, k is in the range of 0.001-1.000, s=1-k, b is in the range of 0.001-1.000, and d=1-b. In addition, k, s, b, and d correspond to a molar ratio of the monomers that participate in the reaction.

With reference to the production process of Reaction Equation 1, the sulfonated dihydroxy monomer (HO—SAr1-OH) and the none sulfonated dihydroxy monomer (HO—Ar—OH) are activated. The activation process is an activation process in which the polycondensation reaction of the dihydroxy monomer and the dihalide monomer is easily performed.

In addition, the crosslinkable dihalide monomer (X—CM—X) and the none sulfonated dihalide monomer (X—Ar—X) may be supplied at the same stage as the dihydroxy monomer into the production process.

Under the presence of the base, the azeotropic solvent and the polar solvent, they are subjected to the polycondensation reaction at the temperature in the range of 0~300° C. for 1 to done (NMP), dimethyl formamide (DMF), N,N-dimethyl acetamide (DMAc), dimethyl sulfoxide (DMSO) or the like may be used as the non protonic polar solvent, methylene chloride ($CH_2Cl_2$), chloroform ($CH_3Cl$) or tetrahydrofurane (THF) may be used as the protonic polar solvent, and benzene, toluene, xylene or the like may be used as the azeotropic solvent.

In the sulfonated poly(arylene ether) copolymer that includes the crosslinking structure in the chain of the polymer that is produced by the above-mentioned method, the thermal stability, the film formation ability, the mechanical stability, the chemical property, the physical property, the cell performance and the like are the same as or better than the Nafion layer that is used as the known sulfonated poly(arylene ether) copoly or the commerced polymer electrolyte film, the electrochemical property, in particular, the proton conductivity and the cell performance are largely improved, and even though it is exposed to the moisture over a long period of time, since there is no change of the electrolyte film property, the result in which the dimension stability is high is shown.

The above present invention will be described in more detail with reference to the following Preparation Examples, but is not limited thereto.

Preparation Example 1

Production of the Sulfonated Poly(Arylene Ether) Copolymer Having the Crosslinking Structure in the Chain of the polymer (SPAEDF-mSXb-100 and SPAEDF-vSXb-100)

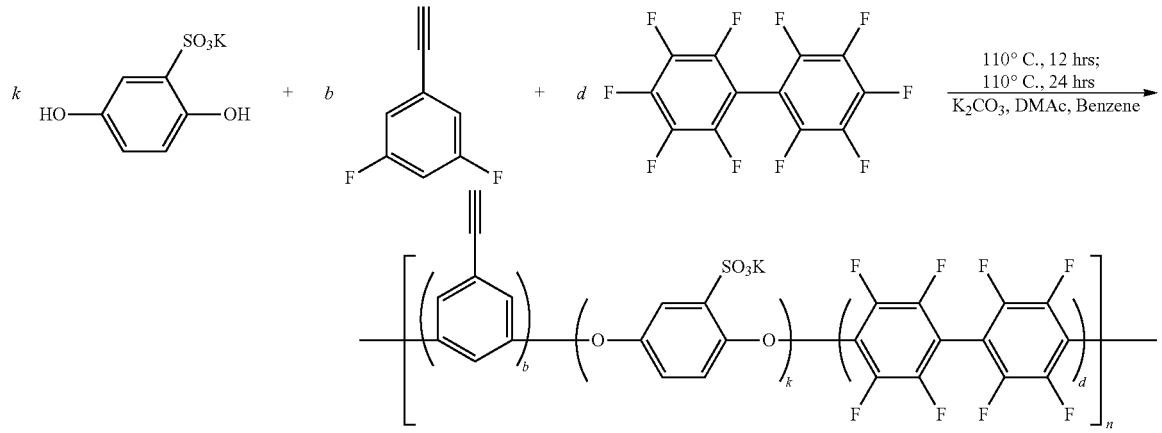

[Reaction Equation 2]

Into 250 ml of the two neck round flask that was provided with the agitation device, the nitrogen introduction pipe, the magnetic stir bar, and the Dean-Stark (azeotropic distillation), the hydroquinonesulfonic acid potassium salt was added in the molar ratio of 20 mmol (k=1) in conjunction with $K_2CO_3$ (1.15 equivalent), N,N-dimethylacetamide (DMAc) (60 ml) and benzene (20 ml).

The activation step was carried out for 6~8 hours by increasing the temperature in the range of 105~110° C. for 6 hours, in the reaction, water that was produced as the sideproduct was removed by the azeotropic distillation method with benzene that was one of the reaction solvents, and after the activation step was finished, benzene was removed from the reactor. Next, the molar ratio of 1-Ethynyl-3,5-difluorobenzene and decafluorobiphenyl esd 1 mmol:19 mmol (b:d=0.05:0.95), they were added to the reactor, the reaction was carried out for 12 hours or more while the reaction temperature was maintained at 110° C. After the reaction was finished, they were precipitated in 500 ml of ethanol, washed several times with water and ethanol, and vacuum dried at 60° C. for 3 days. The final product was obtained as the light brown solid, and the yield was not less than 90%.

This is called as SPAEDF-mSX5-100. 5 that is at the rear of SX represents that the molar ratio b is 0.05, and this is reduced as the percentage.

In addition, the molar ratios of 1-ethynyl-3,5-difluorobenzene and decafluorobiphenyl that were starting materials was 2 mmol:18 mmol (b:d=0.1:0.9), 3 mmol:17 mmol (b:d=0.15:0.85), 4 mmol:16 mmol (b:d=0.2:0.8), 5 mmol:15 mmol (b:d=0.25:0.75), 6 mmol:14 mmol (b:d=0.3:0.7), 7 mmol:13 mmol (b:d=0.35:0.65), 8 mmol:12 mmol (b:d=0.4:0.6), 9 mmol:11 mmol (b:d=0.45:0.55), and 10 mmol:10 mmol (b:d=0.5:0.5), and the sulfonated poly(arylene ether) copolymers that had the crosslinking structures in the chains of the polymers were produced. The copolymers that were formed according to the difference between the molar ratios of the starting materials were called as SPAEDF-mSX10-100, SPAEDF-mSX15-100, SPAEDF-mSX20-100, SPAEDF-mSX25-100, SPAEDF-mSX30-100, SPAEDF-mSX35-100, SPAEDF-mSX40-100, SPAEDF-mSX45-100, and SPAEDF-mSX50-100. Each of them was not less than 90%.

In addition, in Reaction Equation 2, instead of 1-ethynyl-3,5-difluorobenzene that was the starting material, in the case of when 4'-ethynyl-2,5-difluorobiphenyl was used, the sulfonated poly(arylene ether) copolymer SPAEDF-vSXb-100 that had the crosslinking structure in the chain of the polymer can be obtained. In respects to this, the following Reaction Equation 3 will be described. In addition, in the following Preparation Examples and Examples, b and k that are seen in the naming of copolymers or polymer electrolyte films are percentages of the molar ratios shown in the Reaction Equations as described above.

[Reaction Equation 3]

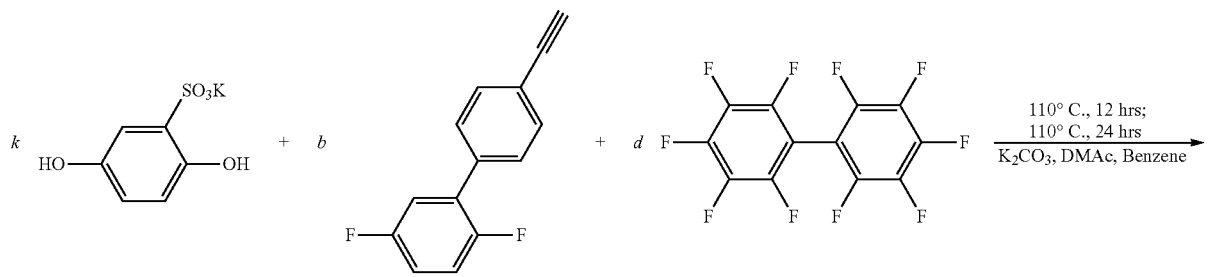

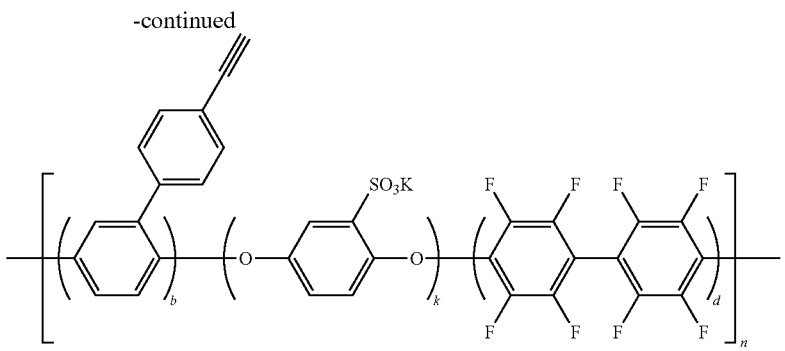

Preparation Example 2

Production of the Sulfonated Poly(Arylene Ether) Copolymer Having the Crosslinking Structure in the Chain of the Polymer (SPAEDF-mSXb-6Fk and SPAEDF-vSXb-6Fk)

[Reaction Equation 4]

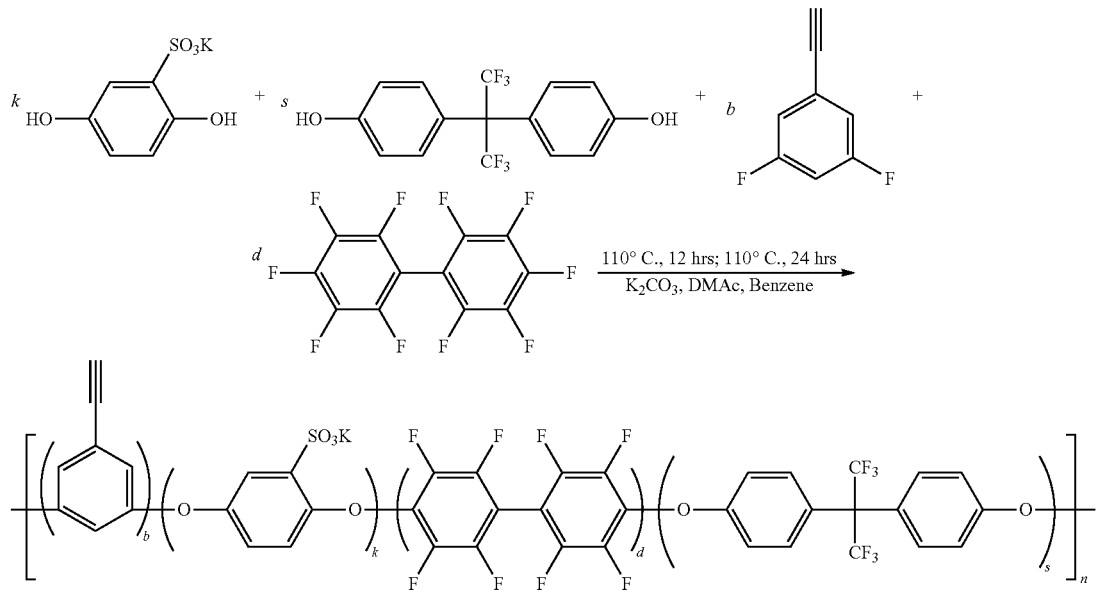

Into 250 ml of the two neck round flask that was provided with the agitation device, the nitrogen introduction pipe, the magnetic stir bar, and the Dean-Stark (azeotropic distillation), the hydroquinonesulfonic acid potassium salt and 4,4'-hexafluoroisopropylidene)diphenol were added in the molar ratio of 19 mmol:1 mmol (k:s=0.95:0.05) in conjunction with $K_2CO_3$ (1.15 equivalent), N,N-dimethylacetamide (DMAc) (60 ml) and benzene (20 ml).

The activation step was carried out for 6~8 hours by increasing the temperature in the range of 105~110° C. for 6 hours, in the reaction, water that was produced as the sideproduct was removed by the azeotropic distillation method with benzene that was one of the reaction solvents, and after the activation step was finished, benzene was removed from the reactor.

Next, the molar ratio of 1-ethynyl-3,5-difluorobenzene and decafluorobiphenyl is 1 mmol:19 mmol (b:d=0.05:0.95), they were added to the reactor, the reaction was carried out for 12 hours or more while the reaction temperature was maintained at 110° C. After the reaction was finished, they were precipitated in 500 ml of ethanol, washed several times with water and ethanol, and vacuum dried at 60° C. for 3 days. The final product was obtained as the light brown solid, and the yield was not less than 90%.

The final product that is produced by using the above process is called as SPAEDF-mSX5-6F95. 5 that is at the rear of SX represents that the molar ratio b is 0.05. In addition, 95 that is at the rear of 6F represents that the molar ratio k is 0.95. Accordingly, in the name of the product, b and k are obtained by reducing the molar ratio of the 1-ethynyl-3,5-difluorobenzene and the hydroquinonesulfonic acid potassium salt as the percentage.

In addition, by variously changing the molar ratios (k:s:b:d) of the hydroquinonesulfonic acid potassium salt, 4,4'-hexafluoroisopropylidene)diphenol, 1-ethynyl-3,5-difluorobenzene and decafluorobiphenyl that were starting materials, the sulfonated poly(arylene ether) copolymer that had the crosslinking structure in the chain of the polymer SPAEDF-mSXb-6Fk was produced. Each of them was not less than 90%.

In addition, in Reaction Equation 4, in the case of when 4'-ethynyl-2,5-difluorobiphenyl was used instead of 1-ethynyl-3,5-difluorobenzene as the starting material, SPAEDF-vSXb-6Fk that is the copolymer shown in the following Reaction Equation 5 can be obtained.

[Reaction Equation 5]
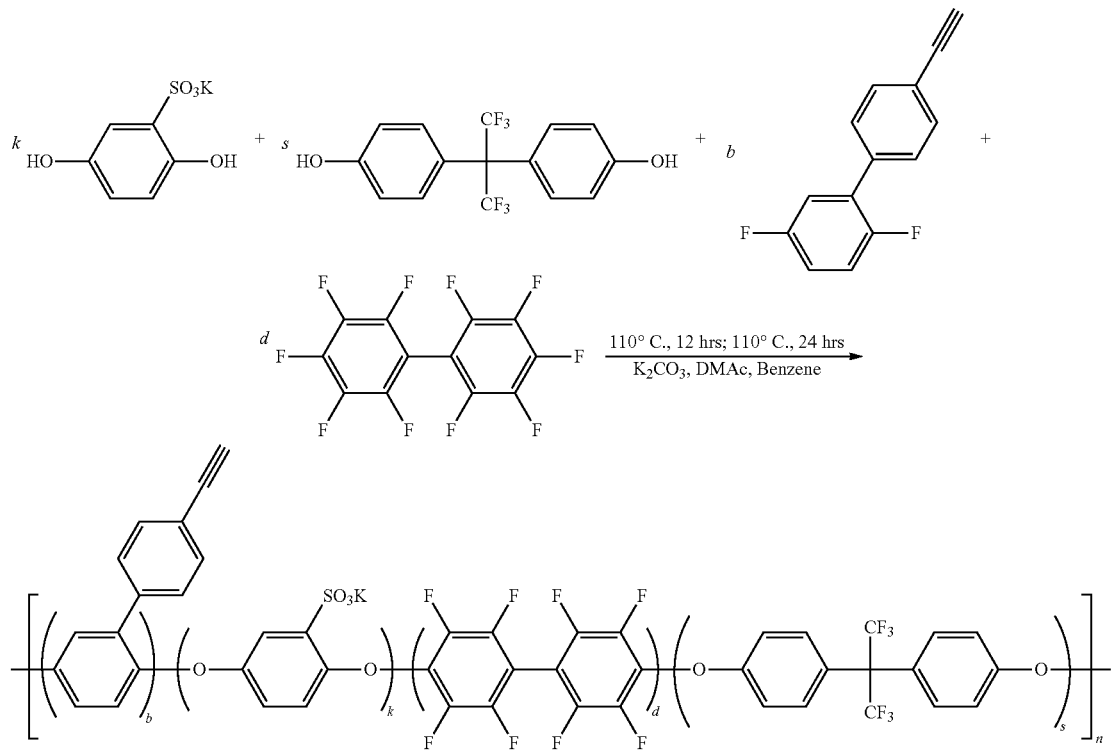
Preparation Example 3
Production of the Sulfonated Poly(Arylene Ether) Copolymer Having the Crosslinking Structure in the Chain of the Polymer (SPAEDF-mSXb-BPk and SPAEDF-vSXb-BPk)
[Reaction Equation 6]
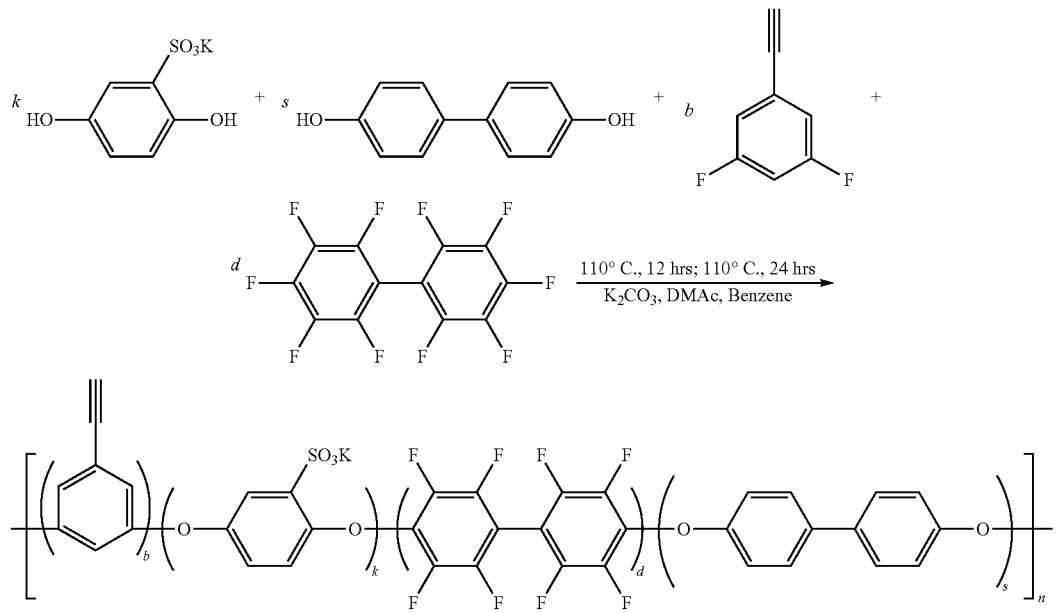

The process was carried out by using the same process as Preparation Example 2, 4,4'-biphenol was used instead of 4,4'-hexafluoroisopropylidene)diphenol as the starting material, and by changing the molar ratios (k:s:b:d) of the hydroquinonesulfonic acid potassium salt, 4,4'-biphenol, 1-ethynyl-3,5-difluorobenzene and decafluorobiphenyl that were starting materials, the sulfonated poly(arylene ether) copolymer that had the crosslinking structure in the chain of the polymer was produced.

The copolymers that were formed according to the difference between the molar ratios of the starting materials were called as SPAEDF-mSXb-BPk. Each of them was not less than 90%.

In addition, in Reaction Equation 4, in the case of when 4'-ethynyl-2,5-difluorobiphenyl was used instead of 1-ethynyl-3,5-difluorobenzene as the starting material, SPAEDF-vSXb-BPk that is the copolymer shown in the following Reaction Equation 7 can be obtained.

[Reaction Equation 7]

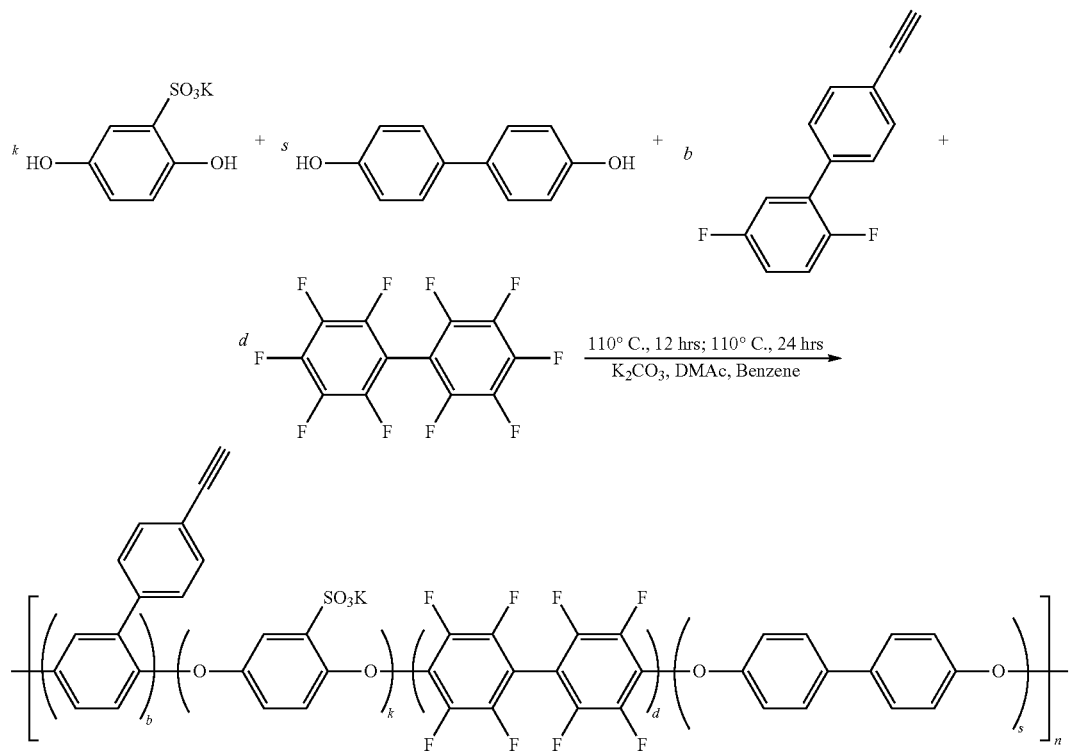

Preparation Example 4

Production of the Sulfonated Poly(Arylene Ether) Copolymer Having the Crosslinking Structure in the Chain of the Polymer (SPAEDF-mSXb-HQk and SPAEDF-vSXb-HQk)

[Reaction Equation 8]

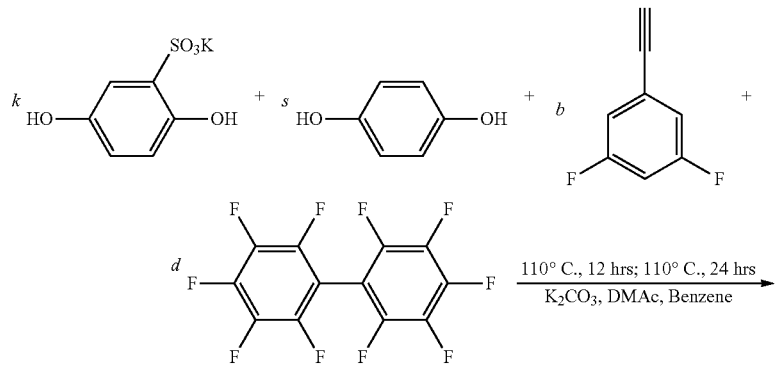

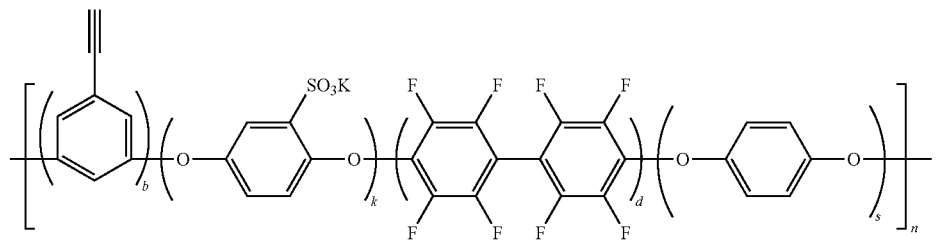

The process was carried out by using the same process as Preparation Example 2, hydroquinone was used instead of 4,4'-hexafluoroisopropylidene)diphenol as the starting material, and by changing the molar ratios (k:s:b:d) of the hydroquinonesulfonic acid potassium salt, hydroquinone, 1-ethynyl-3,5-difluorobenzene and decafluorobiphenyl that were starting materials, the sulfonated poly(arylene ether) copolymer SPAEDF-mSXb-HQk that had the crosslinking structure in the chain of the polymer was produced. The yield of each of the copolymers that were formed in the present Preparation Example was not less than 90%.

In addition, in Reaction Equation 8, in the case of when 4'-ethynyl-2,5-difluorobiphenyl was used instead of 1-ethynyl-3,5-difluorobenzene as the starting material, SPAEDF-vSXb-HQk that is the copolymer shown in the following Reaction Equation 9 can be obtained.

[Reaction Equation 9]

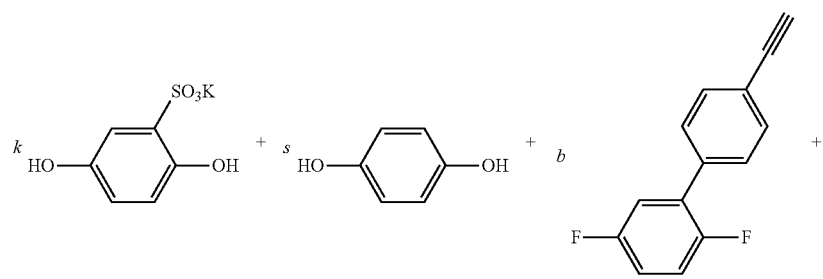

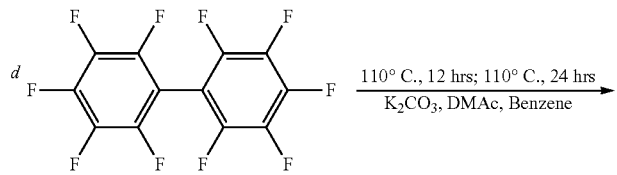

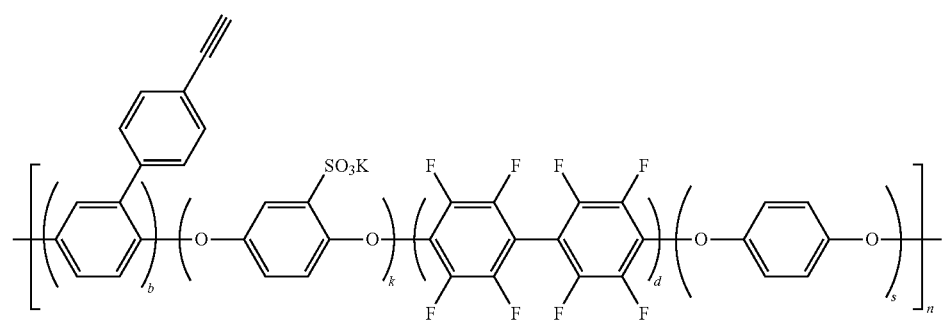

Preparation Example 5

Production of the Sulfonated Poly(Arylene Ether) Copolymer Having the Crosslinking Structure in the Chain of the Polymer (SPAEDF-mSXb-DEk and SPAEDF-vSXb-DEk)

[Reaction Equation 10]

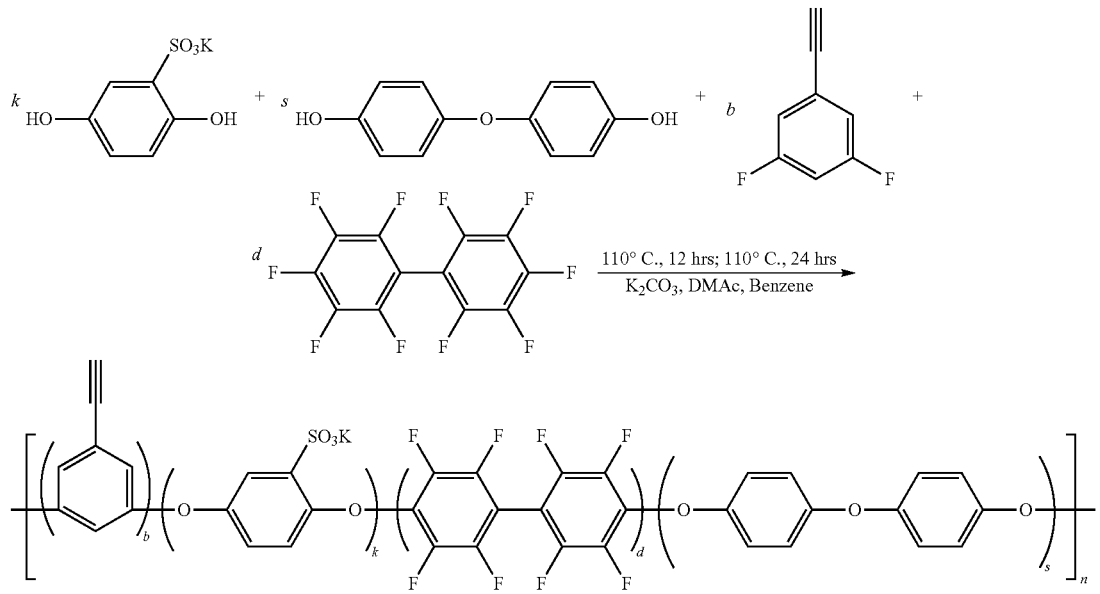

The process was carried out by using the same process as Preparation Example 2, 4,4'-dihydroxydiphenyl ether was used instead of 4,4'-hexafluoroisopropylidene)diphenol as the starting material, and by changing the molar ratios (k:s:b:d) of the hydroquinonesulfonic acid potassium salt, 4,4'-dihydroxydiphenyl ether, 1-ethynyl-3,5-difluorobenzene and decafluorobiphenyl that were starting materials, the sulfonated poly(arylene ether) copolymer SPAEDF-mSXb-DEk that had the crosslinking structure in the chain of the polymer was produced. The yield of each of the copolymers that were formed in the present Preparation Example was not less than 90%.

In addition, in Reaction Equation 10, in the case of when 4'-ethynyl-2,5-difluorobiphenyl was used instead of 1-ethynyl-3,5-difluorobenzene as the starting material, SPAEDF-vSXb-DEk that is the copolymer shown in the following Reaction Equation 11 can be obtained.

[Reaction Equation 11]

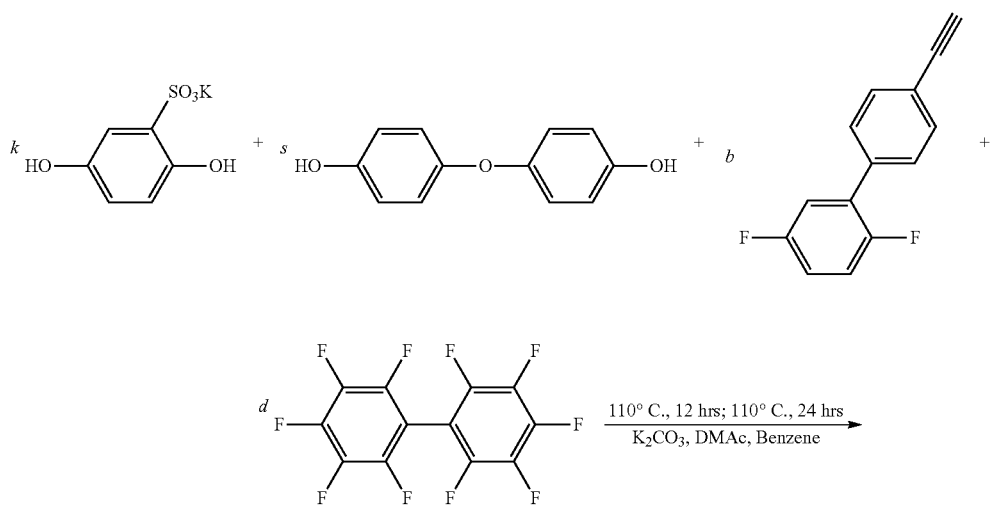

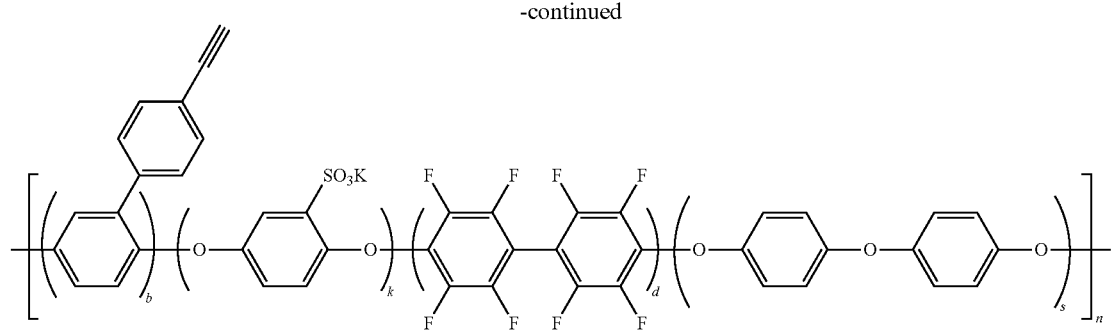

Preparation Example 6

Production of the Sulfonated Poly(Arylene Ether) Copolymer Having the Crosslinking Structure in the Chain of the Polymer (SPAES-mSXb-100 and SPAES-vSXb-100)

[Reaction Equation 12]

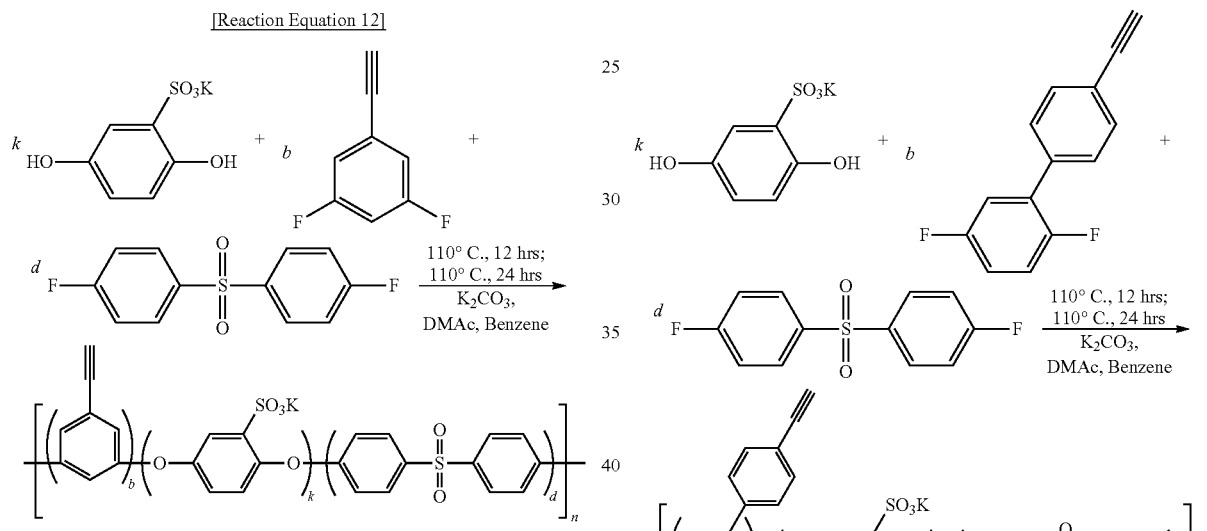

The process was carried out by using the same process as Preparation Example 1, 4,4'-difluorodiphenyl sulfone was used instead of decafluorobiphenyl as the starting material, and by changing the molar ratio (b:d) of the 1-ethynyl-3,5-difluorobenzene and 4,4'-difluorodiphenyl sulfone that were starting materials, the sulfonated poly(arylene ether) copolymer SPAES-mSXb-100 that had the crosslinking structure in the chain of the polymer was produced. In SPAES-mSXb-100 that was the name of the copolymer, b represents the percentage of the molar ratio of 1-ethynyl-3,5-difluorobenzene. The yield of the copolymer SPAES-mSXb-100 by the present Preparation Example was not less than 90%.

In addition, in Reaction Equation 12, in the case of when 4'-ethynyl-2,5-difluorobiphenyl was used instead of 1-ethynyl-3,5-difluorobenzene as the starting material, SPAES-vSXb-DEk that is the copolymer shown in the following Reaction Equation 13 can be obtained.

[Reaction Equation 13]

Preparation Example 7

Production of the Sulfonated Poly(Arylene Ether) Copolymer Having the Crosslinking Structure in the Chain of the Polymer (SPAES-mSXb-6Fk and SPAES-vSXb-6Fk)

[Reaction Equation 14]

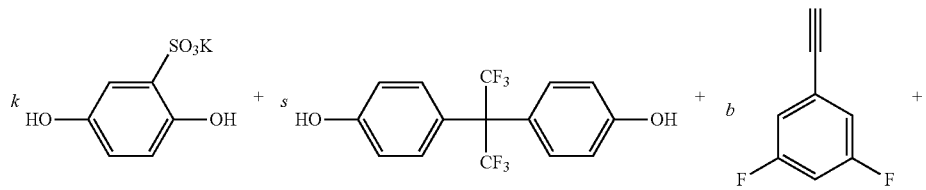

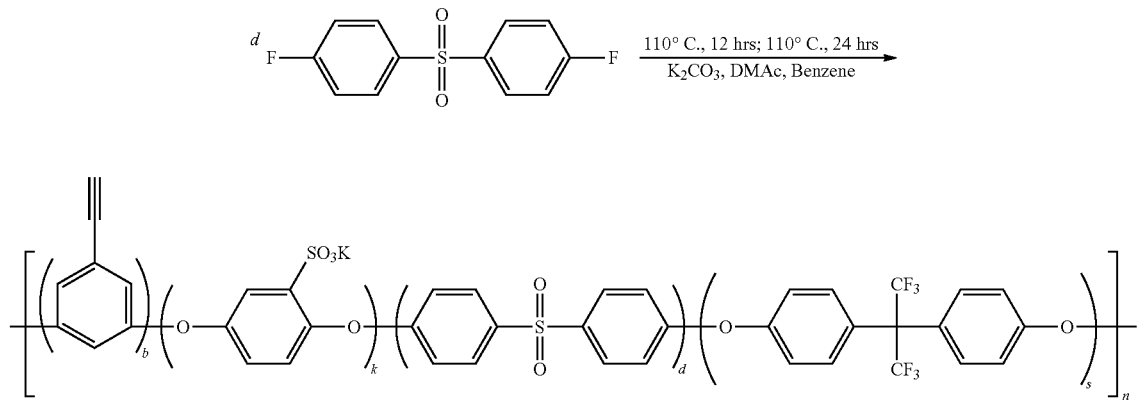

The process was carried out by using the same process as Preparation Example 2, 4,4'-difluorodiphenyl sulfone was used instead of decafluorobiphenyl as the starting material, and by changing the molar ratios (k:s:b:d) of the hydroquinonesulfonic acid potassium salt, (4,4'-hexafluoroisopropylidene)diphenol, 1-ethynyl-3,5-difluorobenzene and 4,4'-difluorodiphenyl sulfone that were starting materials, the sulfonated poly(arylene ether) copolymer SPAES-mSXb-6Fk that had the crosslinking structure in the chain of the polymer was produced. The yield of each of the copolymers was not less than 90%.

In addition, in Reaction Equation 14, in the case of when 4'-ethynyl-2,5-difluorobiphenyl was used instead of 1-ethynyl-3,5-difluorobenzene as the starting material, SPAES-vSXb-6Fk that is the copolymer shown in the following Reaction Equation 15 can be obtained.

[Reaction Equation 15]

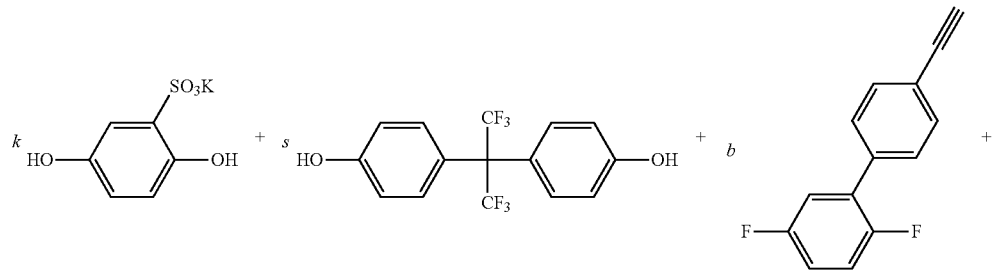

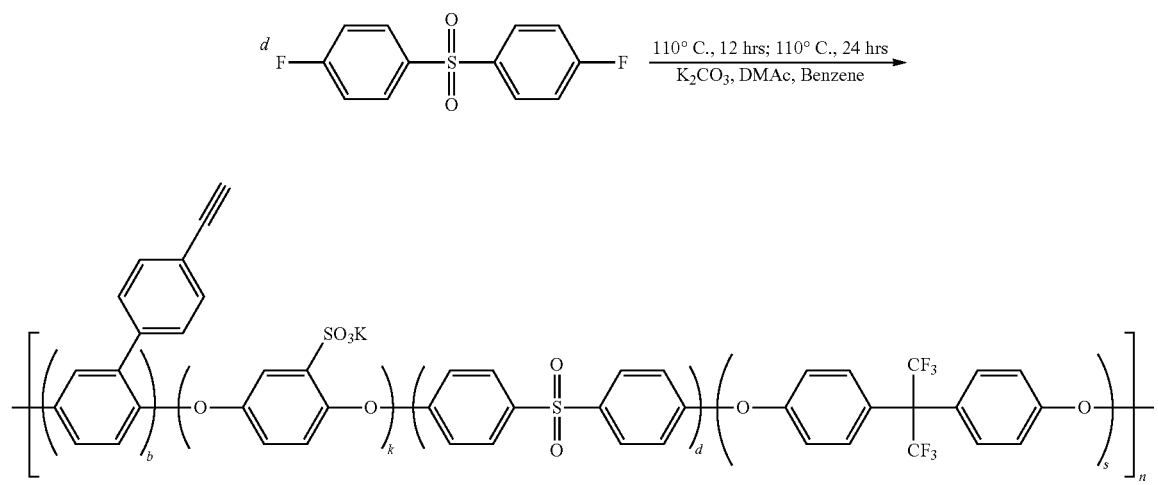

Preparation Example 8

Production of the Sulfonated Poly(Arylene Ether) Copolymer Having the Crosslinking Structure in the Chain of the Polymer (SPAES-mSXb-BPk and SPAES-vSXb-BPk)

[Reaction Equation 16]

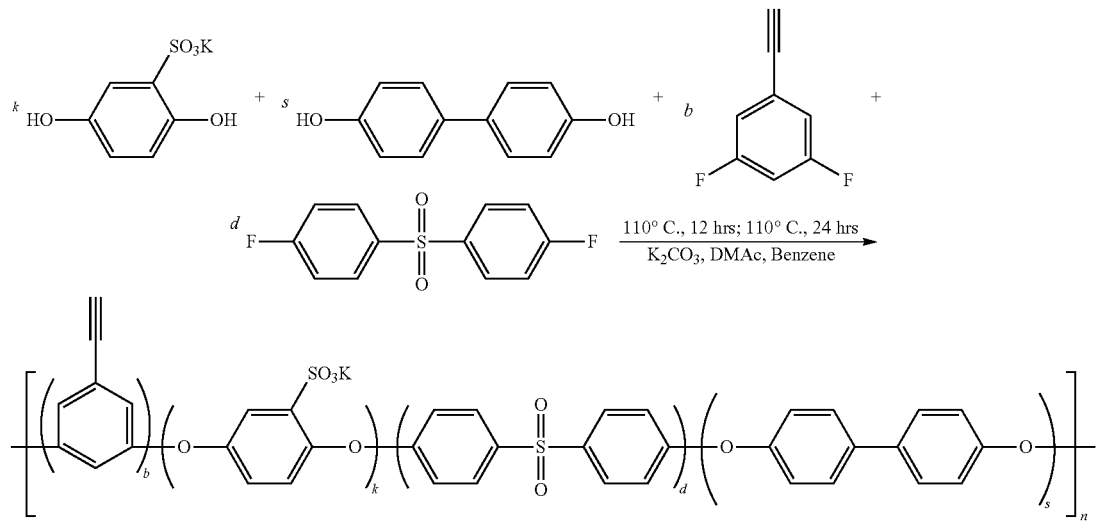

The process was carried out by using the same process as Preparation Example 2, 4,4'-difluorodiphenyl sulfone was used instead of decafluorobiphenyl as the starting material, 4,4'-biphenol was used instead of ((4,4'-hexafluoroisopropylidene)diphenol, and by changing the molar ratios (k:s:b:d) of the hydroquinonesulfonic acid potassium salt, 4,4'-biphenol, 1-ethynyl-3,5-difluorobenzene and 4,4'-difluorodiphenyl sulfone that were starting materials, the sulfonated poly(arylene ether) copolymer SPAES-mSXb-BPk that had the crosslinking structure in the chain of the polymer was produced. The yield of each of the copolymers was not less than 90%.

In addition, in Reaction Equation 16, in the case of when 4'-ethynyl-2,5-difluorobiphenyl was used instead of 1-ethynyl-3,5-difluorobenzene as the starting material, SPAES-vSXb-BPk that is the copolymer shown in the following Reaction Equation 17 can be obtained.

[Reaction Equation 17]

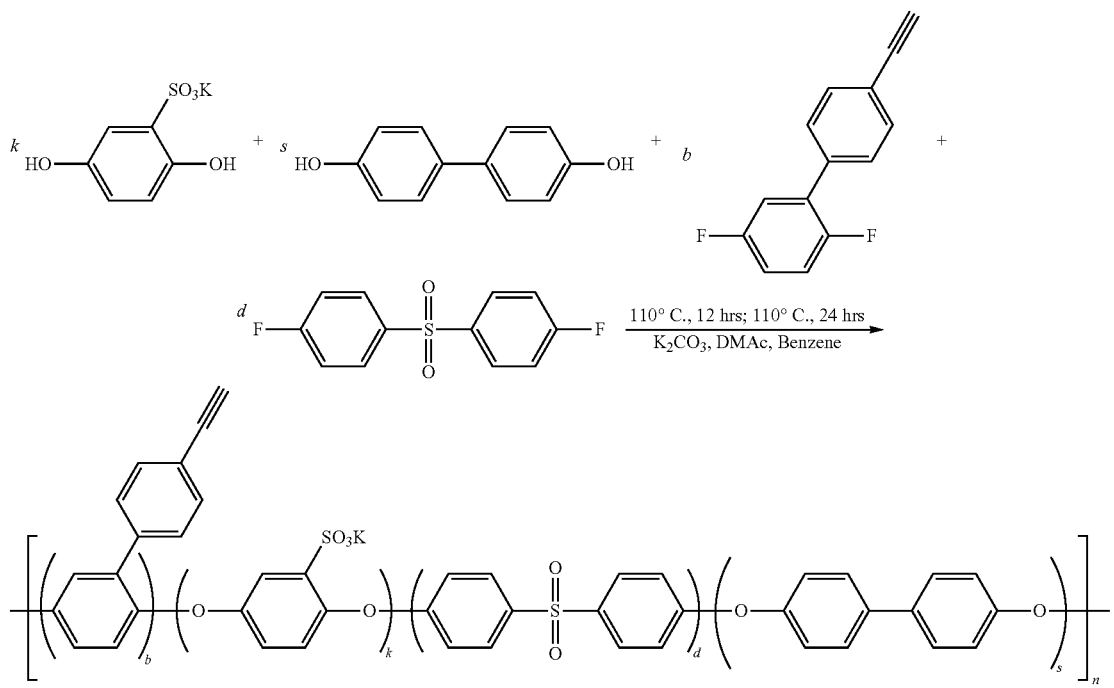

Preparation Example 9

Production of the Sulfonated Poly(Arylene Ether) Copolymer Having the Crosslinking Structure in the Chain of the Polymer (SPAES-mSXb-HQk and SPAES-vSXb-HQk)

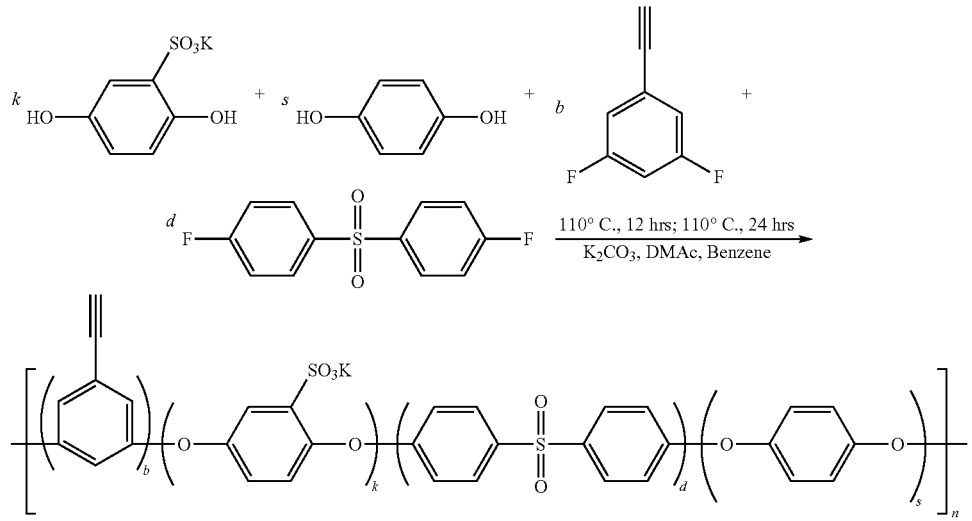

[Reaction Equation 18]

The process was carried out by using the same process as Preparation Example 2, 4,4'-difluorodiphenyl sulfone was used instead of decafluorobiphenyl as the starting material, hydroquinone was used instead of ((4,4'-hexafluoroisopropylidene)diphenol, and by changing the molar ratios (k:s:b:d) of the hydroquinonesulfonic acid potassium salt, hydroquinone, 1-ethynyl-3,5-difluorobenzene and 4,4'-difluorodiphenyl sulfone that were starting materials, the copolymer SPAES-mSXb-HQk was produced. The yield of each of the copolymers was not less than 90%.

In addition, in Reaction Equation 18, in the case of when 4'-ethynyl-2,5-difluorobiphenyl was used instead of 1-ethynyl-3,5-difluorobenzene as the starting material, SPAES-mSXb-HQk that is the copolymer shown in the following Reaction Equation 19 can be obtained.

[Reaction Equation 19]

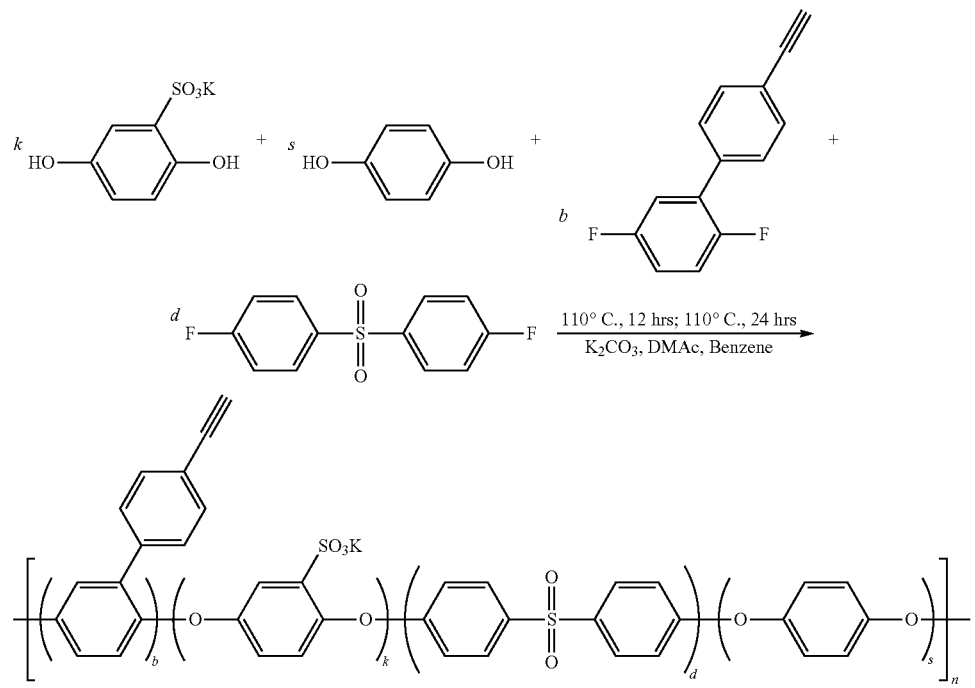

Preparation Example 10

Production of the Sulfonated Poly(Arylene Ether) Copolymer Having the Crosslinking Structure in the Chain of the Polymer (SPAES-mSXb-DEk and SPAES-vSXb-DEk)

[Reaction Equation 20]

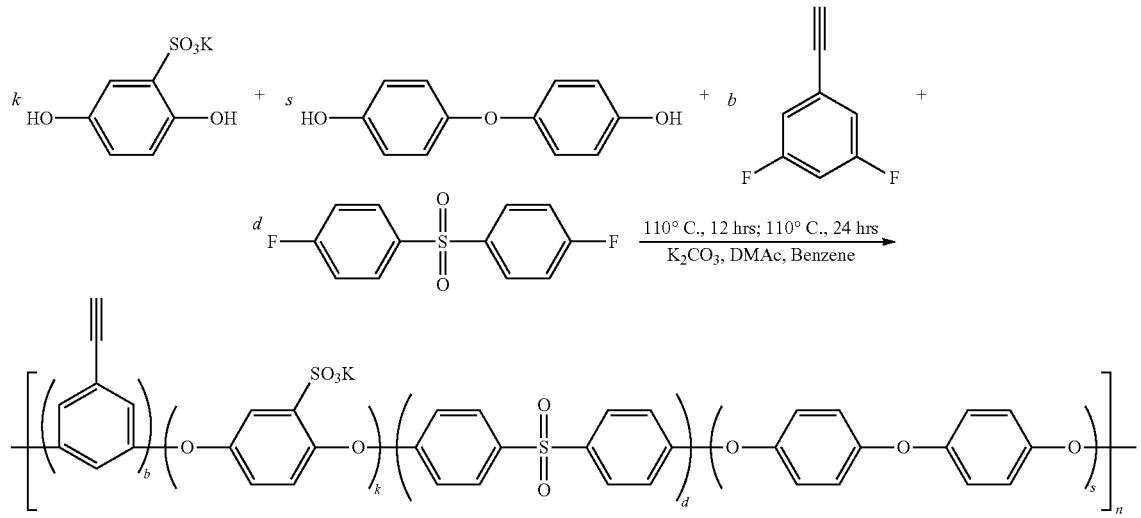

The process was carried out by using the same process as Preparation Example 2, 4,4'-difluorodiphenyl sulfone was used instead of decafluorobiphenyl as the starting material, 4,4'-dihydroxydiphenyl ether was used instead of ((4,4'-hexafluoroisopropylidene)diphenol, and by changing the molar ratios (k:s:b:d) of the hydroquinonesulfonic acid potassium salt, 4,4'-dihydroxydiphenyl ether, 1-ethynyl-3,5-difluorobenzene and 4,4'-difluorodiphenyl sulfone that were starting materials, the sulfonated poly(arylene ether) copolymer SPAES-mSXb-DEk that had the crosslinking structure in the chain of the polymer was produced. The yield of each of the copolymers was not less than 90%.

In addition, in Reaction Equation 20, in the case of when 4'-ethynyl-2,5-difluorobiphenyl was used instead of 1-ethynyl-3,5-difluorobenzene as the starting material, SPAES-vSXb-DEk that is the copolymer shown in the following Reaction Equation 21 can be obtained.

[Reaction Equation 21]

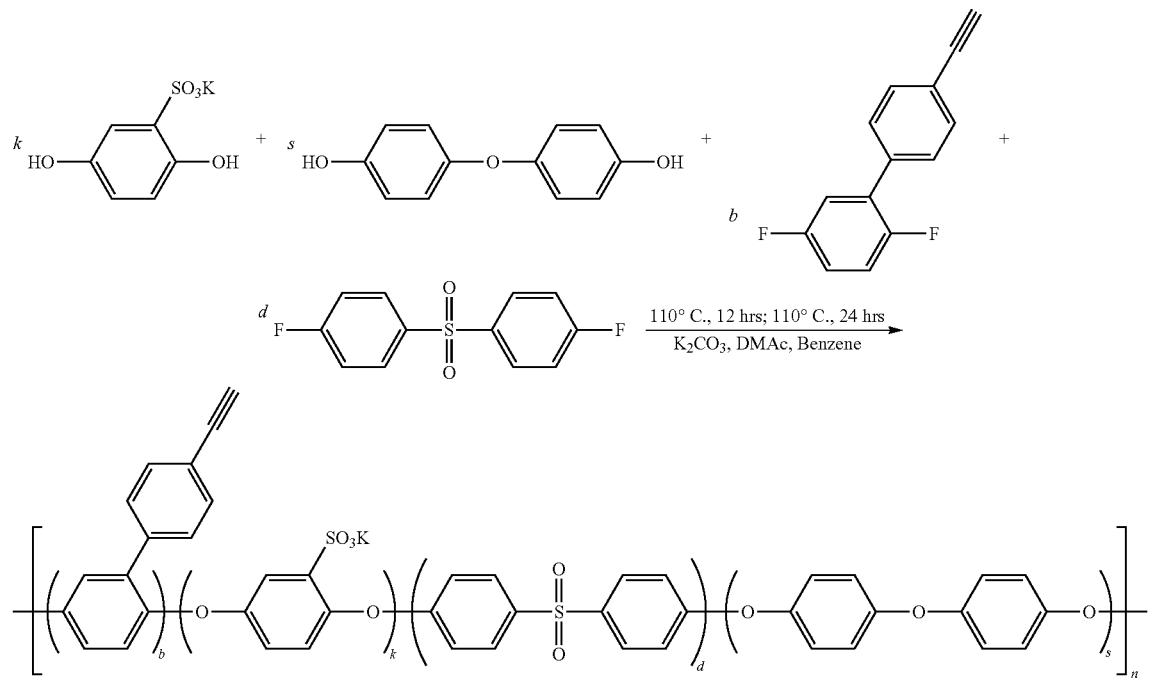

Preparation Example 11

Production of the Sulfonated Poly(Arylene Ether) Copolymer Having the Crosslinking Structure in the Chain of the Polymer (SPAEK-mSXb-100 and SPAEK-vSXb-100)

[Reaction Equation 22]

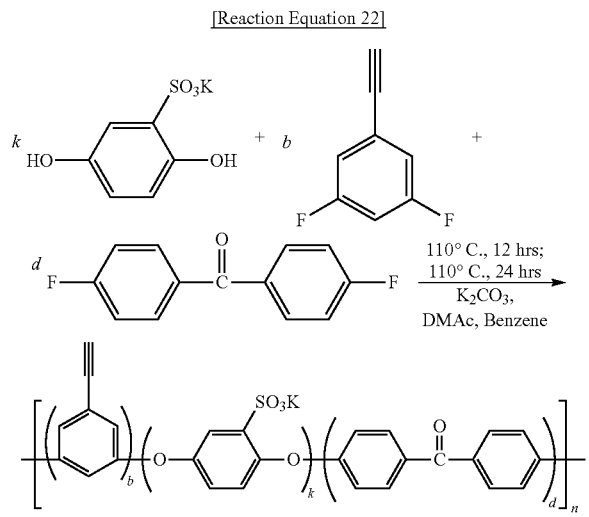

The process was carried out by using the same process as Preparation Example 1, 4,4'-difluorodiphenyl sulfone was used instead of decafluorobiphenyl as the starting material, and by changing the molar ratios (b:d) of 1-ethynyl-3,5-difluorobenzene and 4,4'-difluorobenzophenone that were starting materials, the sulfonated poly(arylene ether) copolymer SPAEK-mSXb-100 that had the crosslinking structure in the chain of the polymer was produced. The yield of each of the copolymers was not less than 90%.

In addition, in Reaction Equation 22, in the case of when 4'-ethynyl-2,5-difluorobiphenyl was used instead of 1-ethynyl-3,5-difluorobenzene as the starting material, SPAEK-vSXb-100 that is the copolymer shown in the following Reaction Equation 23 can be obtained.

[Reaction Equation 23]

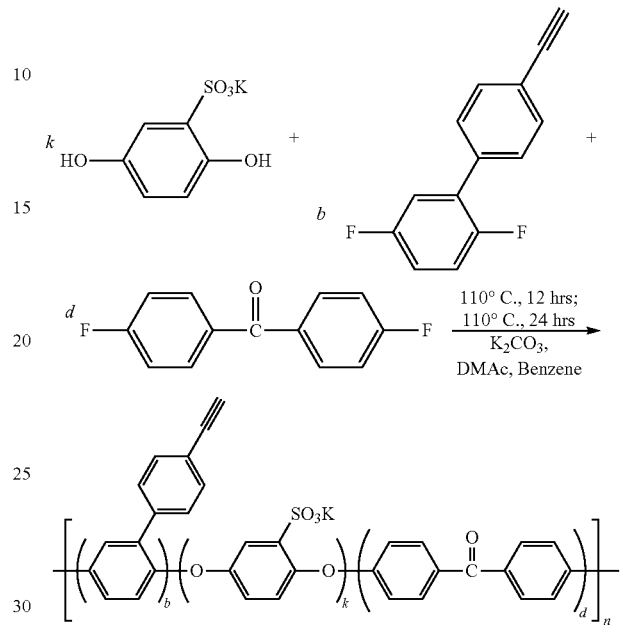

Preparation Example 12

Production of the Sulfonated Poly(Arylene Ether) Copolymer Having the Crosslinking Structure in the Chain of the Polymer (SPAEK-mSXb-6Fk and SPAEK-vSXb-6Fk)

[Reaction Equation 24]

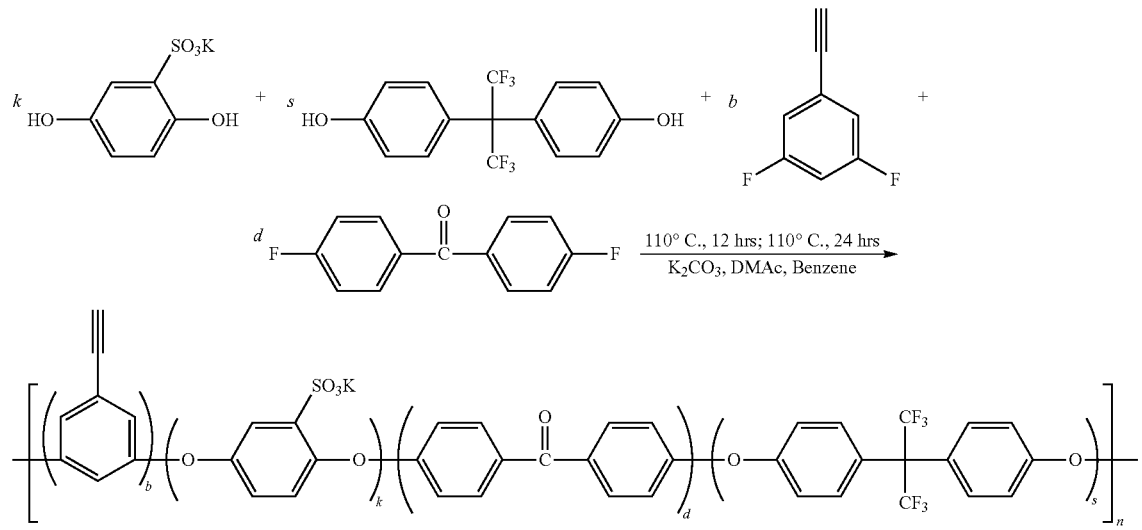

The process was carried out by using the same process as Preparation Example 2, 4,4'-difluorobenzophenone was used instead of decafluorobiphenyl as the starting material, and by changing the molar ratios (k:s:b:d) of the hydroquinone-sulfonic acid potassium salt, (4,4'-hexafluoroisopropylidene) diphenol, 1-ethynyl-3,5-difluorobenzene and 4,4'-difluorobenzophenone that were starting materials, the sulfonated poly(arylene ether) copolymer SPAEK-mSXb-6Fk that had the crosslinking structure in the chain of the polymer was produced. The yield of each of the copolymers was not less than 90%.

In addition, in Reaction Equation 24, in the case of when 4'-ethynyl-2,5-difluorobiphenyl was used instead of 1-ethynyl-3,5-difluorobenzene as the starting material, SPAEK-vSXb-6Fk that is the copolymer shown in the following Reaction Equation 25 can be obtained.

[Reaction Equation 25]

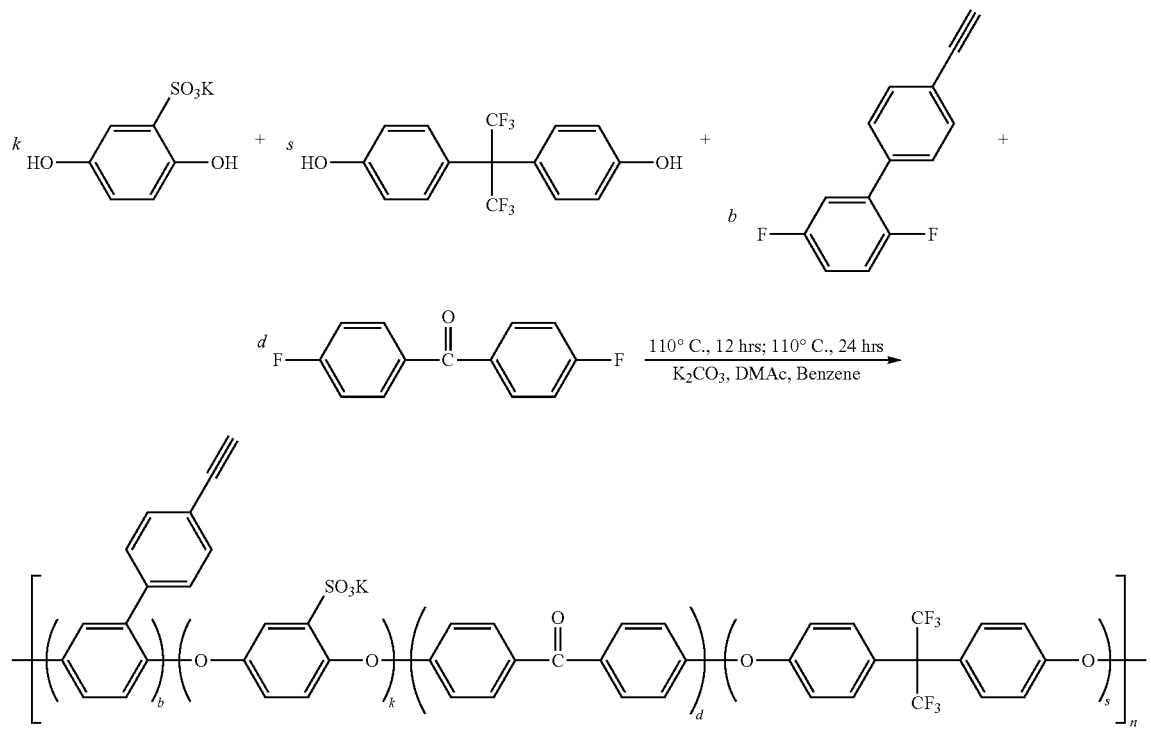

Preparation Example 13

Production of the Sulfonated Poly(Arylene Ether) Copolymer Having the Crosslinking Structure in the Chain of the Polymer (SPAEK-mSXb-BPk and SPAEK-vSXb-BPk)

[Reaction Equation 26]

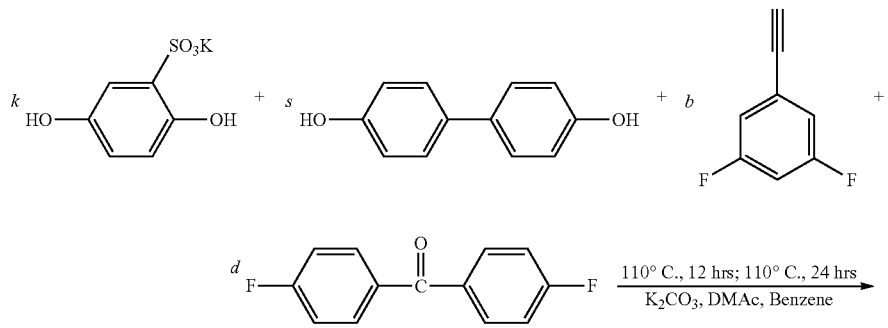

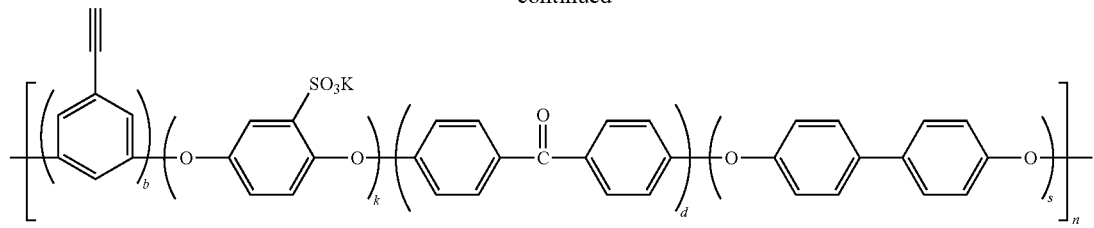

The process was carried out by using the same process as Preparation Example 2, 4,4'-difluorobenzophenone was used instead of decafluorobiphenyl as the starting material, 4,4'-biphenol was used instead of (4,4'-hexafluoroisopropylidene)diphenol, and by changing the molar ratios (k:s:b:d) of the hydroquinonesulfonic acid potassium salt, 4,4'-biphenol, 1-ethynyl-3,5-difluorobenzene and 4,4'-difluorobenzophenone that were starting materials, the sulfonated poly(arylene ether) copolymer SPAEK-mSXb-BPk that had the crosslinking structure in the chain of the polymer was produced. The yield of each of the copolymers was not less than 90%.

In addition, in Reaction Equation 26, in the case of when 4'-ethynyl-2,5-difluorobiphenyl was used instead of 1-ethynyl-3,5-difluorobenzene as the starting material, SPAEK-vSXb-BPk that is the copolymer shown in the following Reaction Equation 27 can be obtained.

[Reaction Equation 27]

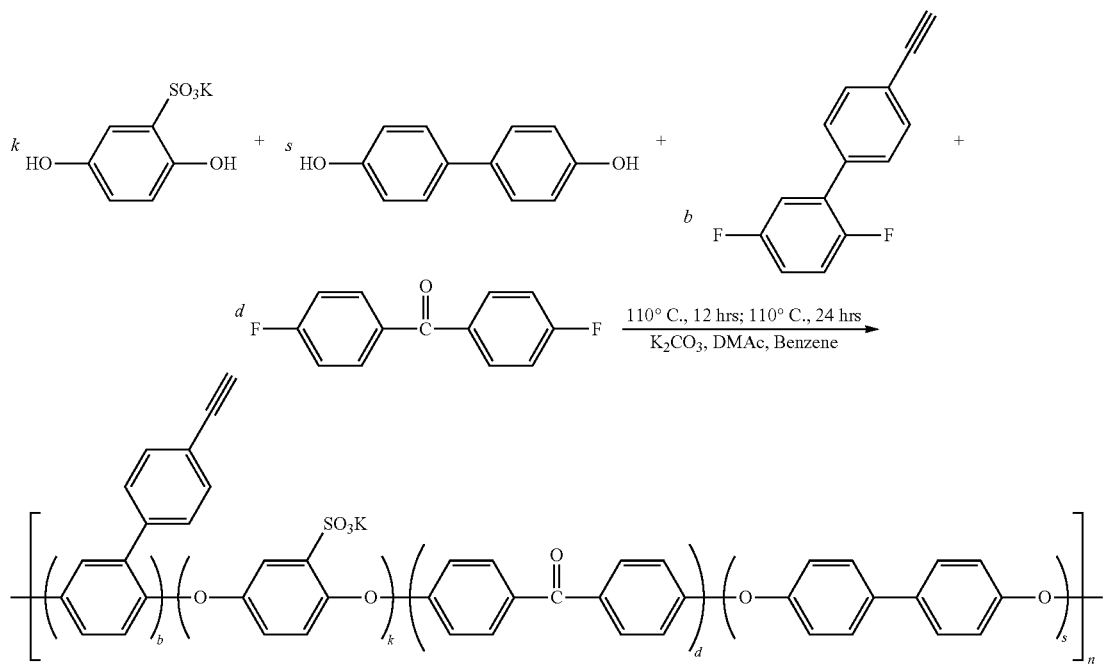

Preparation Example 14

Production of the Sulfonated Poly(Arylene Ether) Copolymer Having the Crosslinking Structure in the Chain of the Polymer (SPAEK-mSXb-HQk and SPAEK-vSXb-HQk)

[Reaction Equation 28]

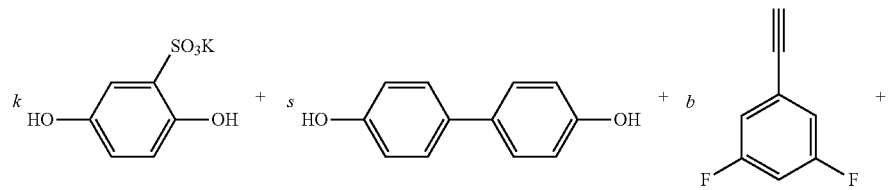

-continued

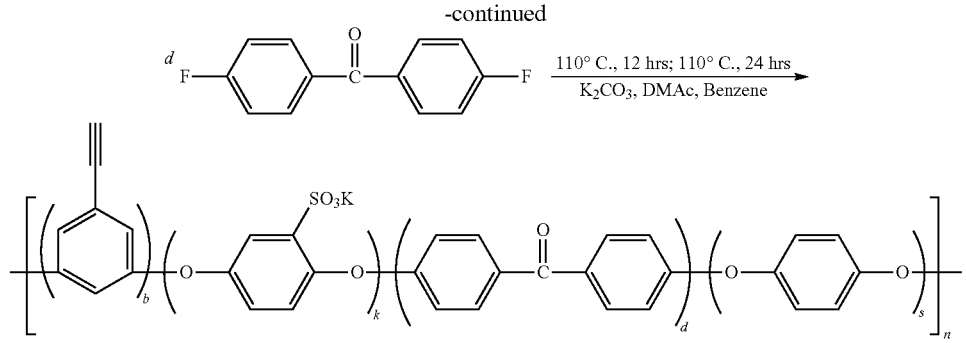

The process was carried out by using the same process as Preparation Example 2, 4,4'-difluorobenzophenone was used instead of decafluorobiphenyl as the starting material, hydroquinone was used instead of (4,4'-hexafluoroisopropylidene) diphenol, and by changing the molar ratios (k:s:b:d) of the hydroquinonesulfonic acid potassium salt, hydroquinone, 1-ethynyl-3,5-difluorobenzene and 4,4'-difluorobenzophenone that were starting materials, the sulfonated poly(arylene ether) copolymer SPAEK-mSXb-HQk that had the crosslinking structure in the chain of the polymer was produced. The yield of each of the copolymers was not less than 90%.

In addition, in Reaction Equation 28, in the case of when 4'-ethynyl-2,5-difluorobiphenyl was used instead of 1-ethynyl-3,5-difluorobenzene as the starting material, SPAEK-vSXb-HQk that is the copolymer shown in the following Reaction Equation 29 can be obtained.

[Reaction Equation 29]

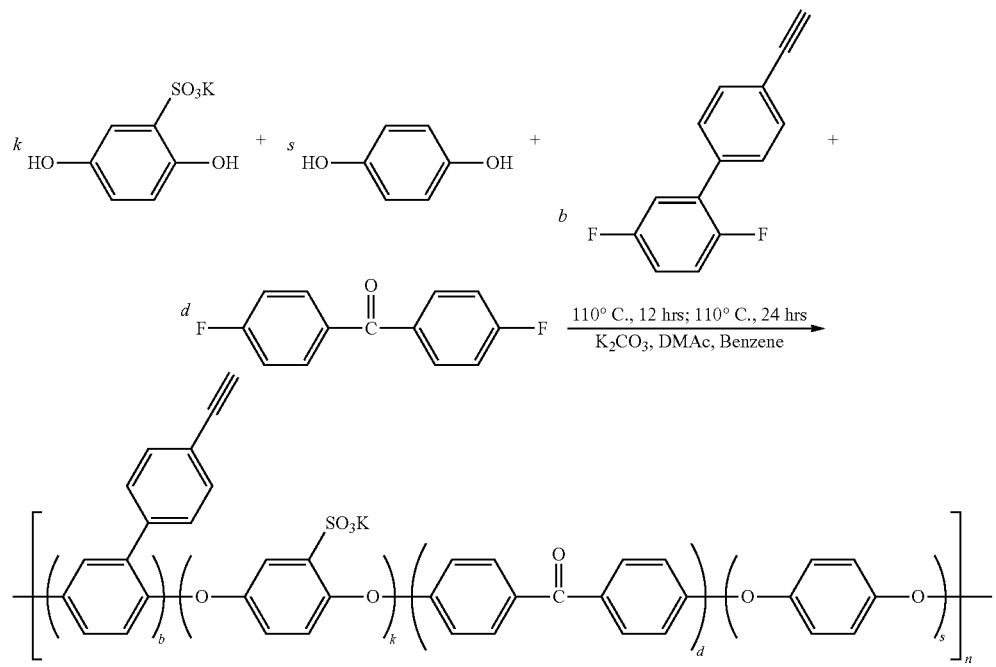

Preparation Example 15

Production of the Sulfonated Poly(Arylene Ether) Copolymer Having the Crosslinking Structure in the Chain of the Polymer (SPAEK-mSXb-DEk and SPAEK-vSXb-DEk)

[Reaction Equation 30]

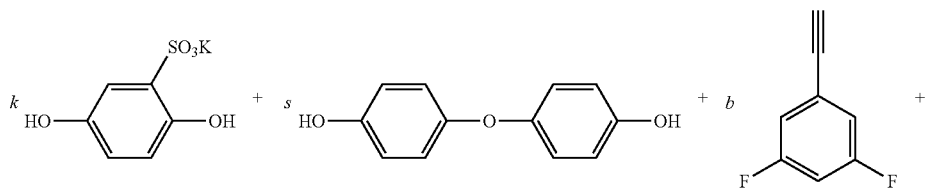

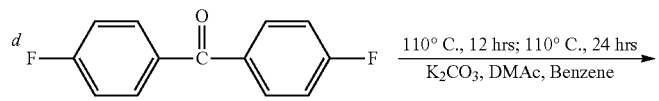

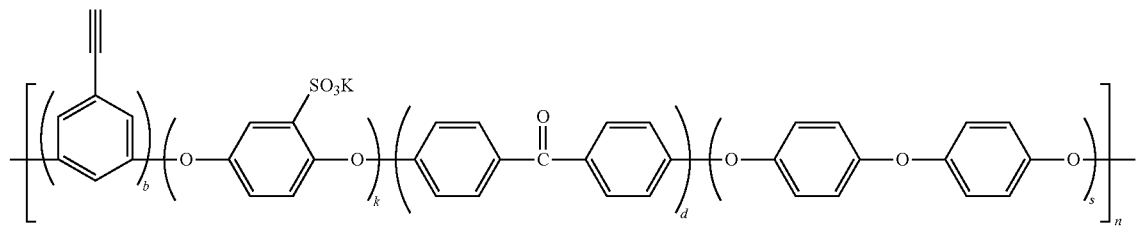

The process was carried out by using the same process as Preparation Example 2, 4,4'-difluorobenzophenone was used instead of decafluorobiphenyl as the starting material, 4,4'-dihydroxydiphenyl ether was used instead of (4,4'-hexafluoroisopropylidene)diphenol, and by changing the molar ratios (k:s:b:d) of the hydroquinonesulfonic acid potassium salt, 4,4'-dihydroxydiphenyl ether, 1-ethynyl-3,5-difluorobenzene and 4,4'-difluorobenzophenone that were starting materials, the sulfonated poly(arylene ether) copolymer SPAEK-mSXb-DEk that had the crosslinking structure in the chain of the polymer was produced. The yield of each of the copolymers was not less than 90%.

In addition, in Reaction Equation 30, in the case of when 4'-ethynyl-2,5-difluorobiphenyl was used instead of 1-ethynyl-3,5-difluorobenzene as the starting material, SPAEK-vSXb-DEk that is the copolymer shown in the following Reaction Equation 31 can be obtained.

[Reaction Equation 31]

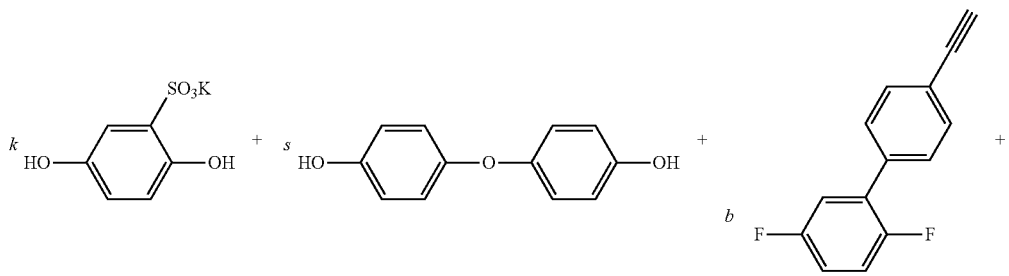

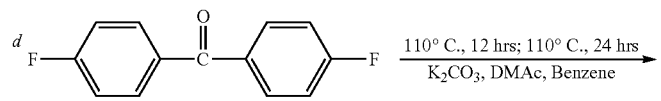

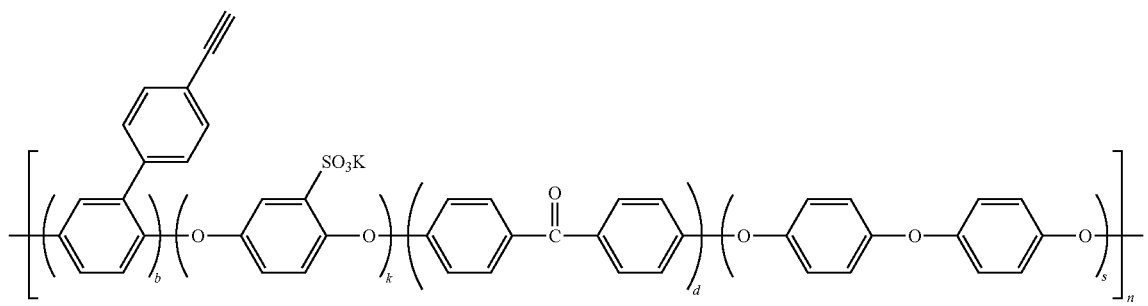

Preparation Example 16

Production of the Sulfonated Poly(Arylene Ether) Copolymer Having the Crosslinking Structure in the Chain of the Polymer (SPAEDF-pSXd-100)

[Reaction Equation 32]

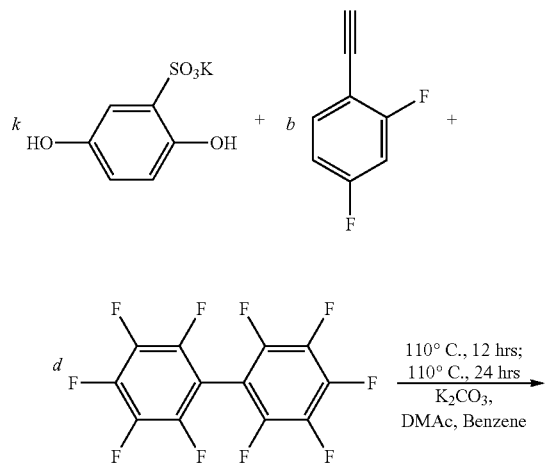

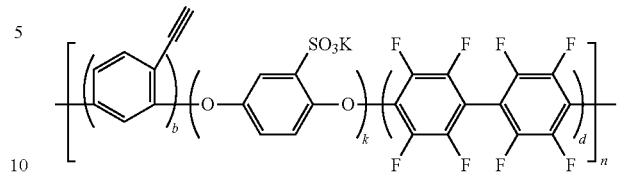

The process was carried out by using the same process as Preparation Example 1, 1-ethynyl-2,4-difluorobenzene was used instead of 1-ethynyl-3,5-difluorobenzene as the starting material, and by changing the molar ratios (b:d) of 1-ethynyl-2,4-difluorobenzene and decafluorobiphenyl that were starting materials, the sulfonated poly(arylene ether) copolymer SPAEDF-pSXd-100 that had the crosslinking structure in the chain of the polymer was produced. The yield of each of the copolymers was not less than 90%.

Preparation Example 17

Production of the Sulfonated Poly(Arylene Ether) Copolymer Having the Crosslinking Structure in the Chain of the Polymer (SPAEDF-pSXb-6Fk)

[Reaction Equation 33]

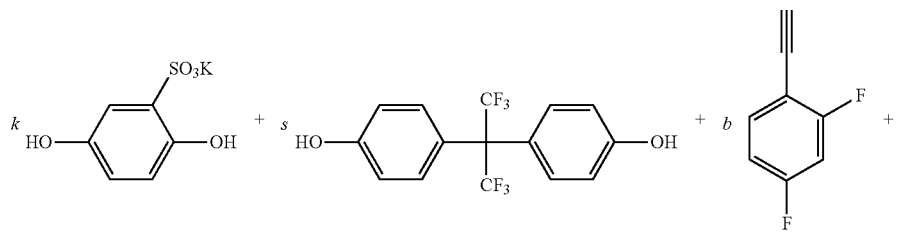

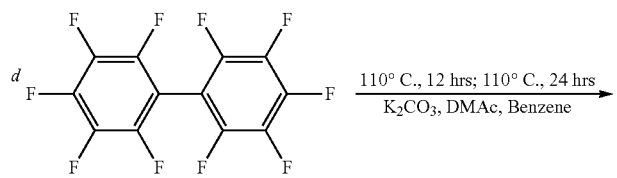

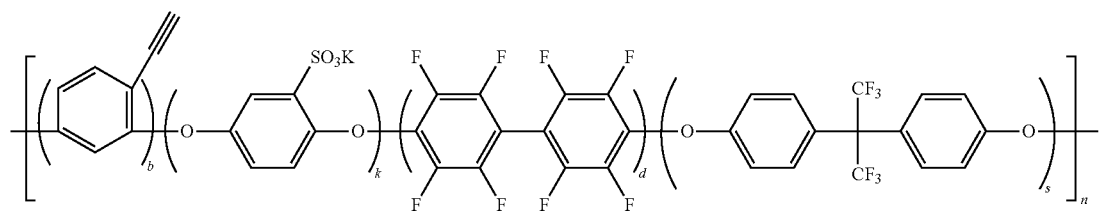

The process was carried out by using the same process as Preparation Example 2, 1-ethynyl-2,4-difluorobenzene was used instead of 1-ethynyl-3,5-difluorobenzene as the starting material, and by changing the molar ratios (k:s:b:d) of the hydroquinonesulfonic acid potassium salt, 4,4'-hexafluoroisopropylidene)diphenol, 1-ethynyl-2,4-difluorobenzene and decafluorobiphenyl that were starting materials, the sulfonated poly(arylene ether) copolymer SPAEDF-pSXb-6Fk that had the crosslinking structure in the chain of the polymer was produced. The yield of each of the copolymers was not less than 90%.

Preparation Example 18

Production of the Sulfonated Poly(Arylene Ether) Copolymer Having the Crosslinking Structure in the Chain of the Polymer (SPAEDF-pSXb-BPk)

[Reaction Equation 34]

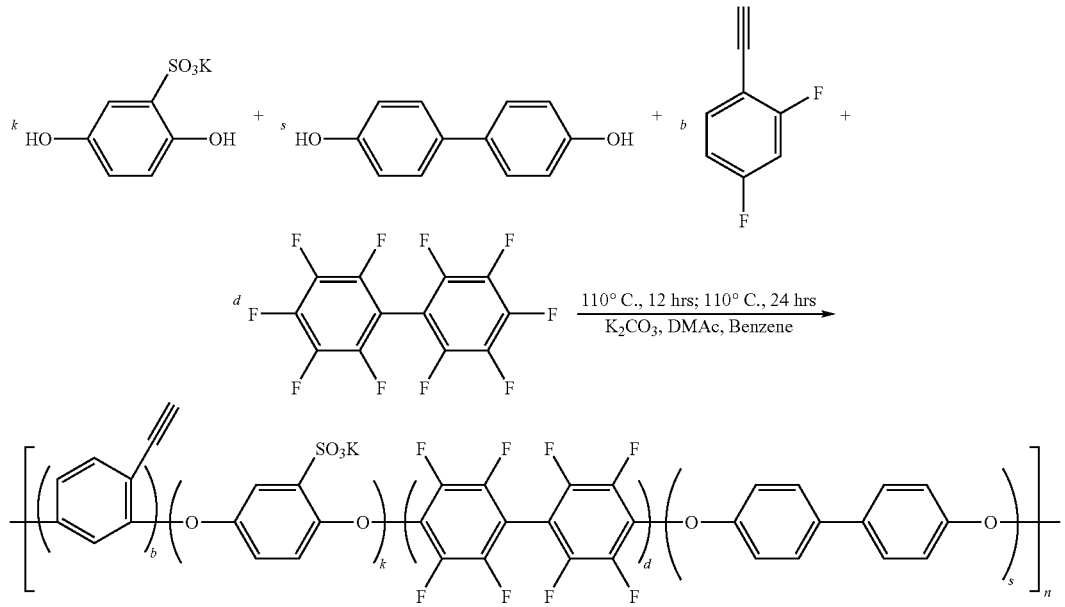

The process was carried out by using the same process as Preparation Example 2, 1-ethynyl-2,4-difluorobenzene was used instead of 1-ethynyl-3,5-difluorobenzene as the starting material, 4,4'-biphenol was used instead of (4,4'-hexafluoroisopropylidene)diphenol, and by changing the molar ratios (k:s:b:d) of the hydroquinonesulfonic acid potassium salt, 4,4'-biphenol, 1-ethynyl-2,4-difluorobenzene and decafluorobiphenyl that were starting materials, the sulfonated poly(arylene ether) copolymer SPAEDF-pSXb-BPk that had the crosslinking structure in the chain of the polymer was produced. The yield of each of the copolymers was not less than 90%.

Preparation Example 19

Production of the Sulfonated Poly(Arylene Ether) Copolymer Having the Crosslinking Structure in the Chain of the Polymer (SPAEDF-pSXb-HQk)

[Reaction Equation 35]

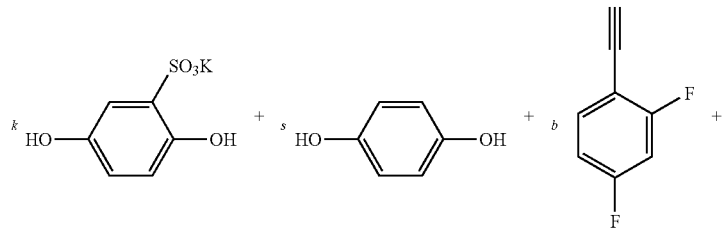

-continued

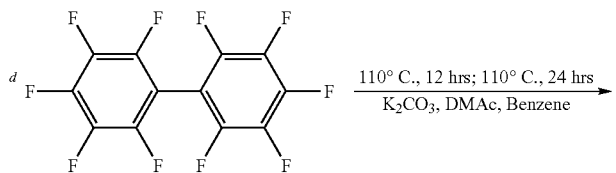

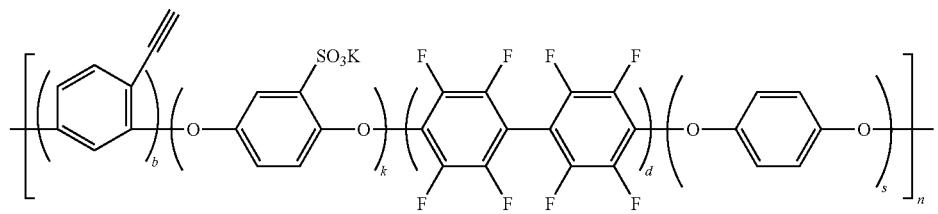

The process was carried out by using the same process as Preparation Example 2, 1-ethynyl-2,4-difluorobenzene was used instead of 1-ethynyl-3,5-difluorobenzene as the starting material, hydroquinone was used instead of (4,4'-hexafluoroisopropylidene)diphenol, and by changing the molar ratios (k:s:b:d) of the hydroquinonesulfonic acid potassium salt, hydroquinone, 1-ethynyl-2,4-difluorobenzene and decafluorobiphenyl that were starting materials, the sulfonated poly(arylene ether) copolymer SPAEDF-pSXb-HQk that had the crosslinking structure in the chain of the polymer was produced. The yield of each of the copolymers was not less than 90%.

Preparation Example 20

Production of the Sulfonated Poly(Arylene Ether) Copolymer Having the Crosslinking Structure in the Chain of the Polymer (SPAEDF-pSXb-DEk)

[Reaction Equation 36]

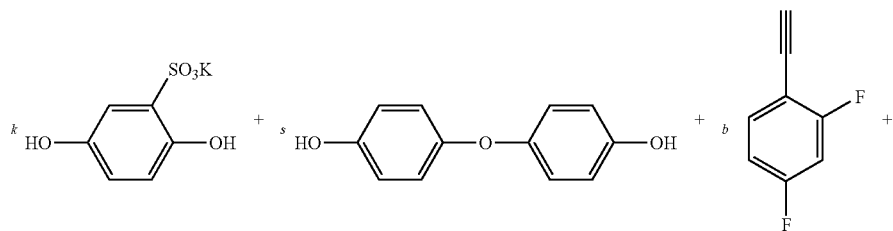

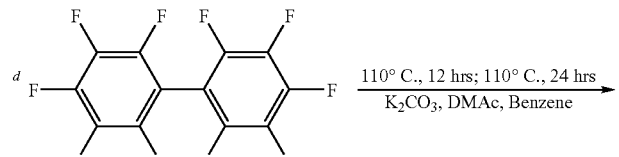

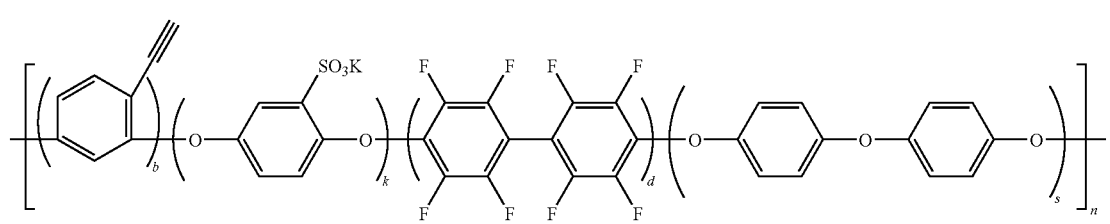

The process was carried out by using the same process as Preparation Example 2, 1-ethynyl-2,4-difluorobenzene was used instead of 1-ethynyl-3,5-difluorobenzene as the starting material, 4,4'-dihydroxydiphenyl ether was used instead of (4,4'-hexafluoroisopropylidene)diphenol, and by changing the molar ratios (k:s:b:d) of the hydroquinonesulfonic acid potassium salt, 4,4'-dihydroxydiphenyl ether, 1-ethynyl-2,4-difluorobenzene and decafluorobiphenyl that were starting materials, the sulfonated poly(arylene ether) copolymer SPAEDF-pSXb-DEk that had the crosslinking structure in the chain of the polymer was produced. The yield of each of the copolymers was not less than 90%.

Preparation Example 21

Production of the Sulfonated Poly(Arylene Ether) Copolymer Having the Crosslinking Structure in the Chain of the Polymer (SPAES-pSXb-100)

[Reaction Equation 37]

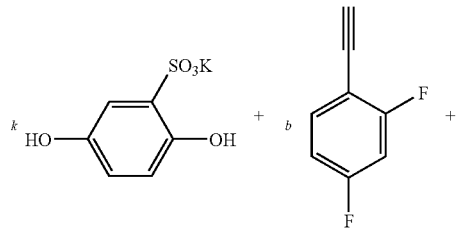

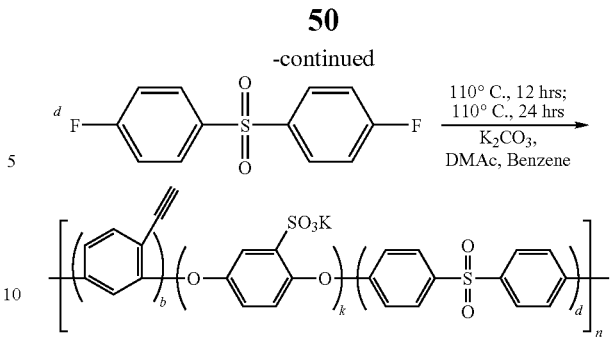

The process was carried out by using the same process as Preparation Example 1, 1-ethynyl-2,4-difluorobenzene was used instead of 1-ethynyl-3,5-difluorobenzene as the starting material, 4,4'-difluorodiphenyl sulfone was used instead of (decafluorobiphenyl), and by changing the molar ratios (b:d) of 1-ethynyl-2,4-difluorobenzene and 4,4'-difluorodiphenyl sulfone that were starting materials, the sulfonated poly(arylene ether) copolymer SPAES-pSXb-100 that had the crosslinking structure in the chain of the polymer was produced. The yield of each of the copolymers was not less than 90%.

Preparation Example 22

Production of the Sulfonated Poly(Arylene Ether) Copolymer Having the Crosslinking Structure in the Chain of the Polymer (SPAES-pSXb-6Fk)

[Reaction Equation 38]

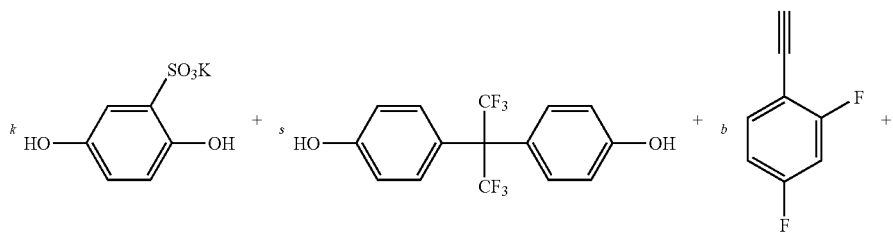

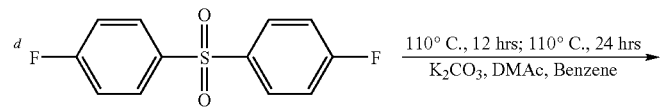

The process was carried out by using the same process as Preparation Example 2, 1-ethynyl-2,4-difluorobenzene was used instead of 1-ethynyl-3,5-difluorobenzene as the starting material, 4,4'-difluorodiphenyl sulfone was used instead of (decafluorobiphenyl, and by changing the molar ratios (k:s:b:d) of the hydroquinonesulfonic acid potassium salt, (4,4'-hexafluoroisopropylidene)diphenol, 1-ethynyl-2,4-difluorobenzene and 4,4'-difluorodiphenyl sulfone that were starting materials, the sulfonated poly(arylene ether) copolymer SPAES-pSXb-6Fk that had the crosslinking structure in the chain of the polymer was produced. The yield of each of the copolymers was not less than 90%.

Preparation Example 23

Production of the Sulfonated Poly(Arylene Ether) Copolymer Having the Crosslinking Structure in the Chain of the Polymer (SPAES-pSXb-BPk)

[Reaction Equation 39]

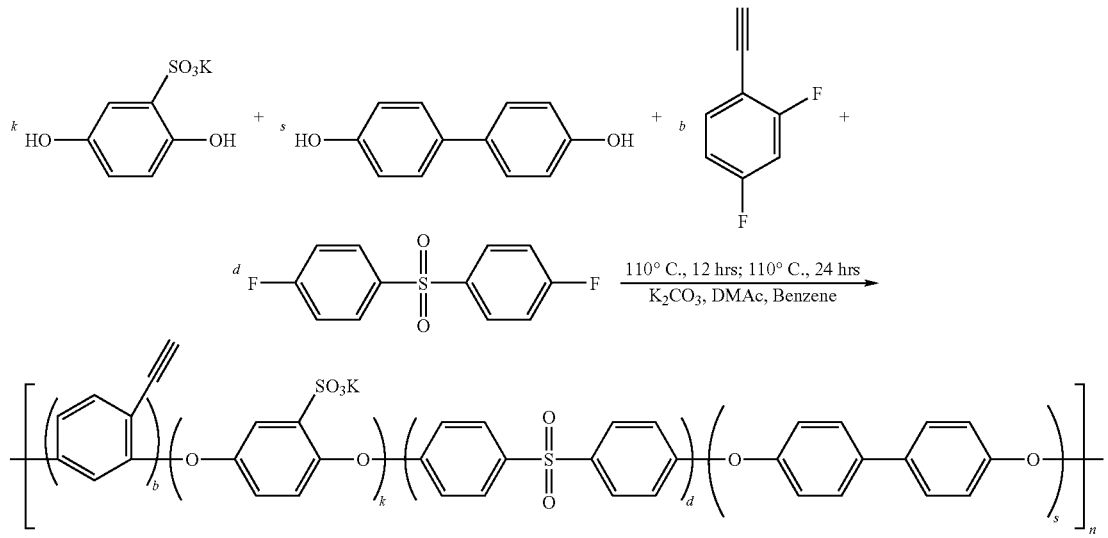

The process was carried out by using the same process as Preparation Example 2, 1-ethynyl-2,4-difluorobenzene was used instead of 1-ethynyl-3,5-difluorobenzene as the starting material, 4,4'-difluorodiphenyl sulfone was used instead of (decafluorobiphenyl, 4,4'-biphenol was used instead of (4,4'-hexafluoroisopropylidene)diphenol, and by changing the molar ratios of the hydroquinonesulfonic acid potassium salt, 4,4'-biphenol, 1-ethynyl-2,4-difluorobenzene and 4,4'-difluorodiphenyl sulfone that were starting materials, the sulfonated poly(arylene ether) copolymer SPAES-pSXb-BPk that had the crosslinking structure in the chain of the polymer was produced. The yield of each of the copolymers was not less than 90%.

Preparation Example 24

Production of the Sulfonated Poly(Arylene Ether) Copolymer Having the Crosslinking Structure in the Chain of the Polymer (SPAES-pSXb-HQk)

[Reaction Equation 40]

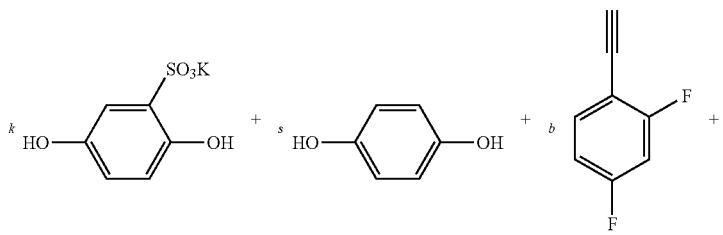

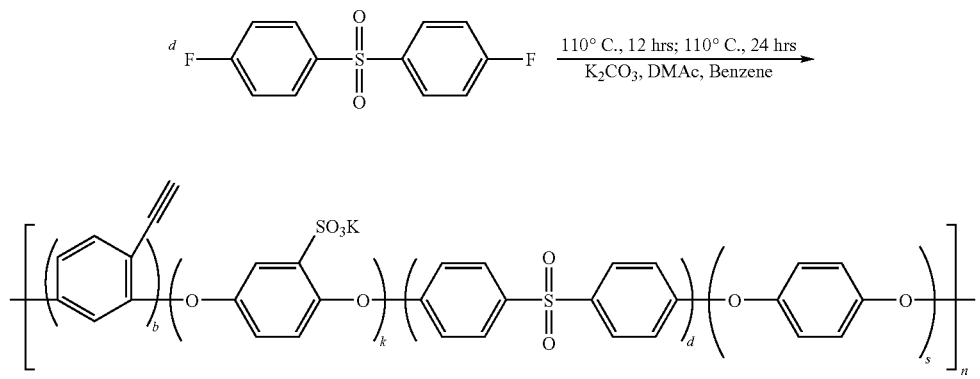

The process was carried out by using the same process as Preparation Example 2, 1-ethynyl-2,4-difluorobenzene was used instead of 1-ethynyl-3,5-difluorobenzene as the starting material, 4,4'-difluorodiphenyl sulfone was used instead of (decafluorobiphenyl, hydroquinone was used instead of (4,4'-hexafluoroisopropylidene)diphenol, and by changing the molar ratios (k:s:b:d) of the hydroquinonesulfonic acid potassium salt, hydroquinone, 1-ethynyl-2,4-difluorobenzene and 4,4'-difluorodiphenyl sulfone that were starting materials, the sulfonated poly(arylene ether) copolymer SPAES-pSXb-HQk that had the crosslinking structure in the chain of the polymer was produced. The yield of each of the copolymers was not less than 90%.

Preparation Example 25

Production of the Sulfonated Poly(Arylene Ether) Copolymer Having the Crosslinking Structure in the Chain of the Polymer (SPAES-pSXb-DEk)

[Reaction Scheme 41]

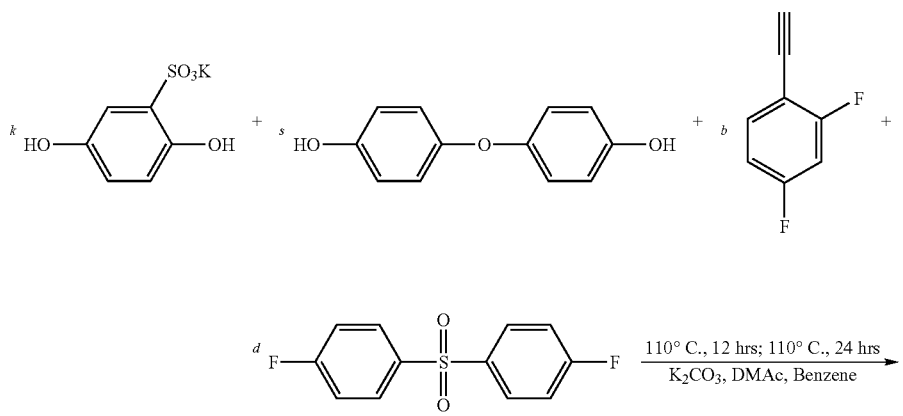

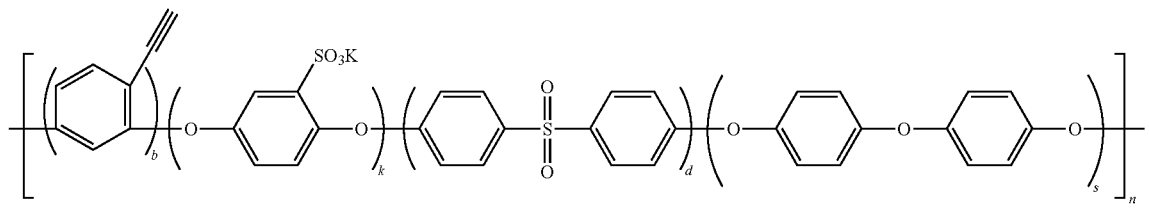

The process was carried out by using the same process as Preparation Example 2, 1-ethynyl-2,4-difluorobenzene was used instead of 1-ethynyl-3,5-difluorobenzene as the starting material, 4,4'-difluorodiphenyl sulfone was used instead of (decafluorobiphenyl, 4,4'-dihydroxydiphenyl ether was used instead of (4,4'-hexafluoroisopropylidene)diphenol, and by changing the molar ratios (k:s:b:d) of the hydroquinone-sulfonic acid potassium salt, 4,4'-dihydroxydiphenyl ether, 1-ethynyl-2,4-difluorobenzene and 4,4'-difluorodiphenyl sulfone that were starting materials, the sulfonated poly(arylene ether) copolymer SPAES-pSXb-DEk that had the crosslinking structure in the chain of the polymer was produced. The yield of each of the copolymers was not less than 90%.

Preparation Example 26

Production of the Sulfonated Poly(Arylene Ether) Copolymer Having the Crosslinking Structure in the Chain of the Polymer (SPAEK-pSXb-100)

[Reaction Equation 42]

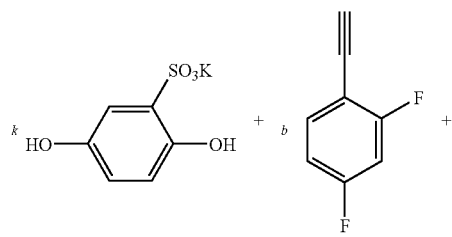

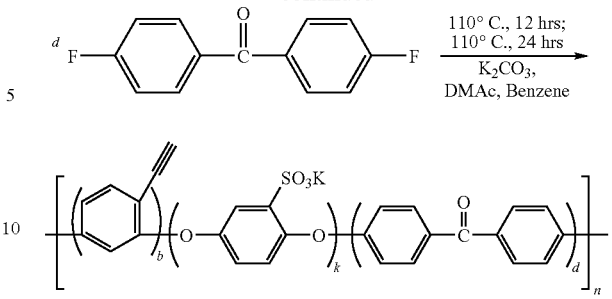

The process was carried out by using the same process as Preparation Example 1, 1-ethynyl-2,4-difluorobenzene was used instead of 1-ethynyl-3,5-difluorobenzene as the starting material, 4,4'-difluorobenzophenone was used instead of decafluorobiphenyl, and by changing the molar ratios (b:d) of 1-ethynyl-2,4-difluorobenzene and 4,4'-difluorobenzophenone that were starting materials, the sulfonated poly(arylene ether) copolymer SPAEK-pSXb-100 that had the crosslinking structure in the chain of the polymer was produced. The yield of each of the copolymers was not less than 90%.

Preparation Example 27

Production of the Sulfonated Poly(Arylene Ether) Copolymer Having the Crosslinking Structure in the Chain of the Polymer (SPAEK-pSXb-6Fk)

[Reaction Equation 43]

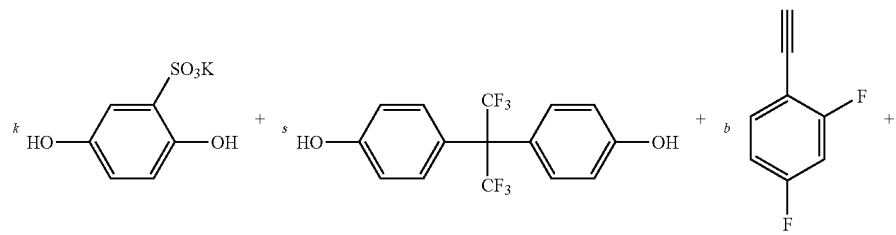

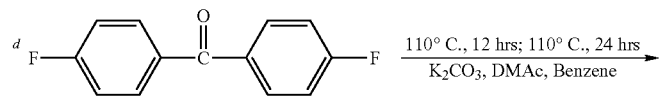

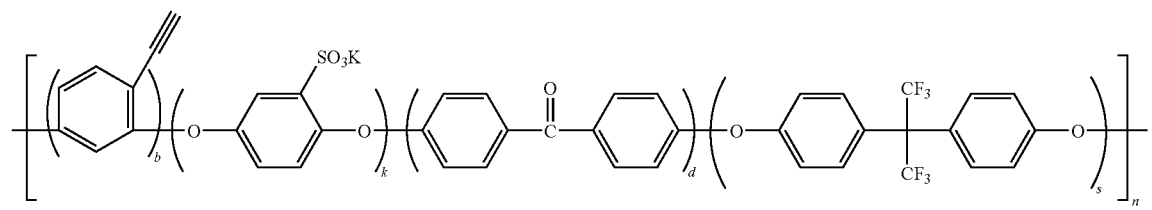

The process was carried out by using the same process as Preparation Example 2, 1-ethynyl-2,4-difluorobenzene was used instead of 1-ethynyl-3,5-difluorobenzene as the starting material, 4,4'-difluorobenzophenone was used instead of decafluorobiphenyl, and by changing the molar ratios (k:s:b:d) of the hydroquinonesulfonic acid potassium salt, (4,4'-hexafluoroisopropylidene)diphenol, 1-ethynyl-2,4-difluorobenzene and 4,4'-difluorobenzophenone that were starting materials, the sulfonated poly(arylene ether) copolymer SPAEK-pSXb-6Fk that had the crosslinking structure in the chain of the polymer was produced. The yield of each of the copolymers was not less than 90%.

Preparation Example 28

Production of the Sulfonated Poly(Arylene Ether) Copolymer Having the Crosslinking Structure in the Chain of the Polymer (SPAEK-pSXb-BPk)

[Reaction Equation 44]

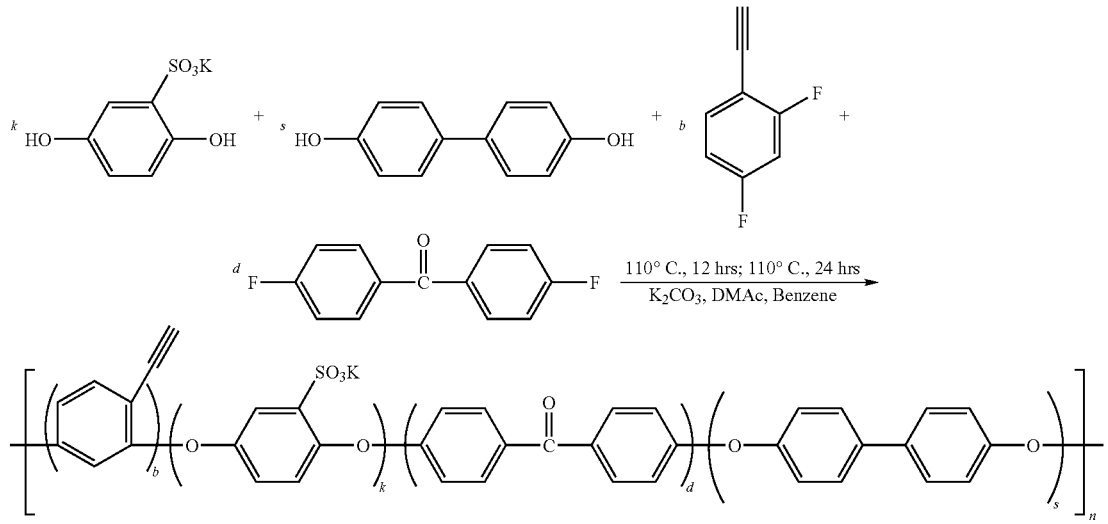

The process was carried out by using the same process as Preparation Example 2, 1-ethynyl-2,4-difluorobenzene was used instead of 1-ethynyl-3,5-difluorobenzene as the starting material, 4,4'-difluorobenzophenone was used instead of decafluorobiphenyl, 4,4'-biphenol was used instead of (4,4'-hexafluoroisopropylidene)diphenol, and by changing the molar ratios (k:s:b:d) of the hydroquinonesulfonic acid potassium salt, 4,4'-biphenol 1-ethynyl-2,4-difluorobenzene and 4,4'-difluorobenzophenone that were starting materials, the sulfonated poly(arylene ether) copolymer SPAEK-pSXb-BPk that had the crosslinking structure in the chain of the polymer was produced. The yield of each of the copolymers was not less than 90%.

Preparation Example 29

Production of the Sulfonated Poly(Arylene Ether) Copolymer Having the Crosslinking Structure in the Chain of the Polymer (SPAEK-pSXb-HQk)

[Reaction Equation 45]

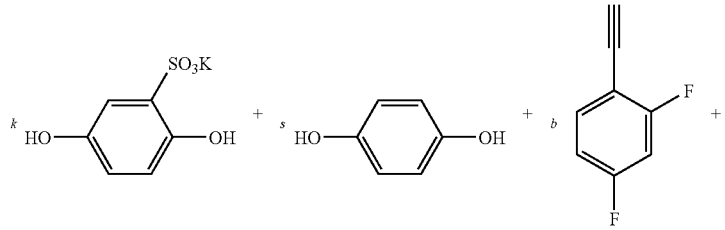

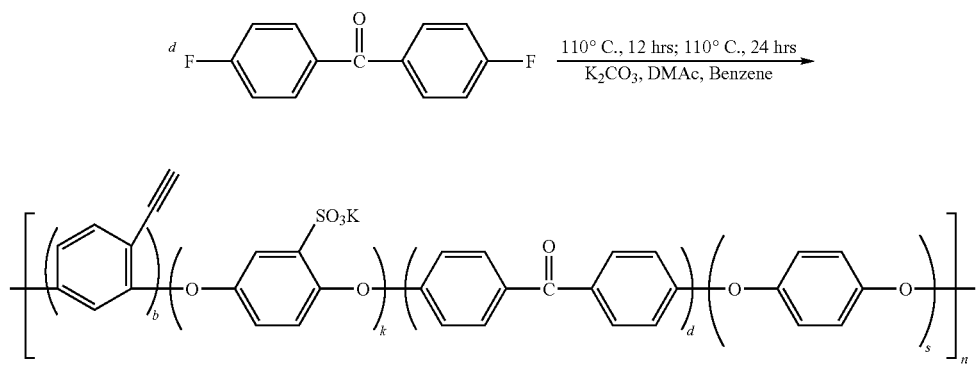

The process was carried out by using the same process as Preparation Example 2, 1-ethynyl-2,4-difluorobenzene was used instead of 1-ethynyl-3,5-difluorobenzene as the starting material, 4,4'-difluorobenzophenone was used instead of decafluorobiphenyl, hydroquinone was used instead of (4,4'-hexafluoroisopropylidene)diphenol, and by changing the molar ratios (k:s:b:d) of the hydroquinonesulfonic acid potassium salt, hydroquinone, 1-ethynyl-2,4-difluorobenzene and 4,4'-difluorobenzophenone that were starting materials, the sulfonated poly(arylene ether) copolymer SPAEK-pSXb-HQk that had the crosslinking structure in the chain of the polymer was produced. The yield of each of the copolymers was not less than 90%.

Preparation Example 30

Production of the Sulfonated Poly(Arylene Ether) Copolymer Having the Crosslinking Structure in the Chain of the Polymer (SPAEK-pSXb-DEk)

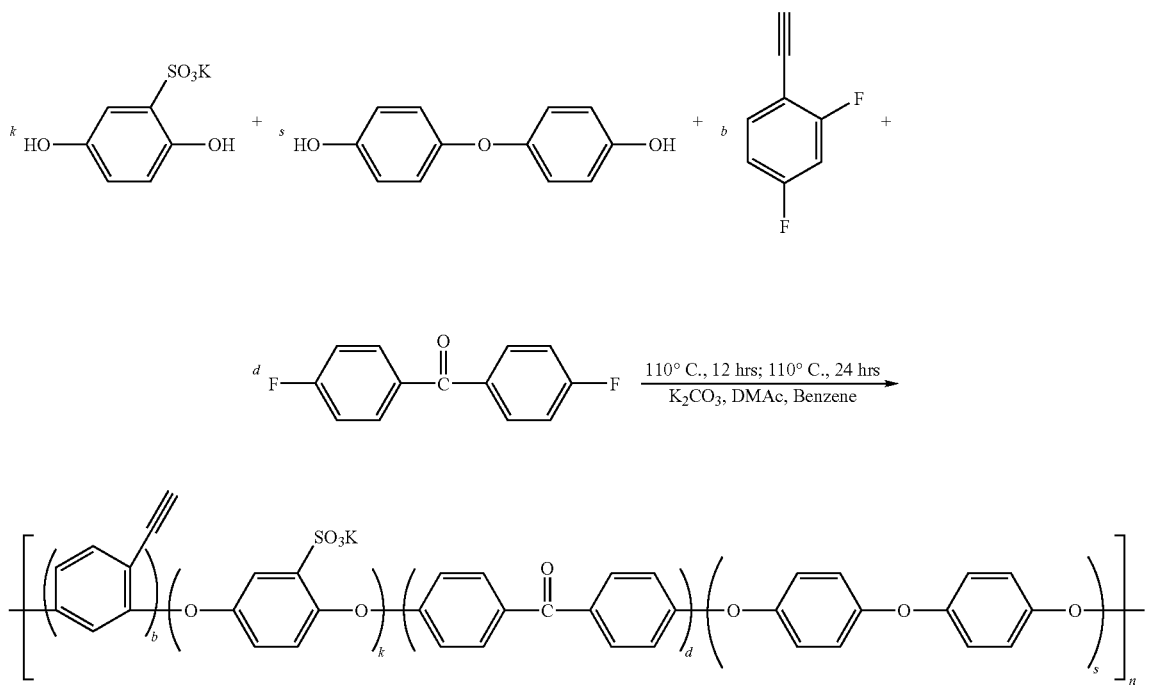

The process was carried out by using the same process as Preparation Example 2, 1-ethynyl-2,4-difluorobenzene was used instead of 1-ethynyl-3,5-difluorobenzene as the starting material, 4,4'-difluorobenzophenone was used instead of decafluorobiphenyl, 4,4'-dihydroxydiphenyl ether was used instead of (4,4'-hexafluoroisopropylidene)diphenol, and by changing the molar ratios (k:s:b:d) of the hydroquinone-sulfonic acid potassium salt, 4,4'-dihydroxydiphenyl ether, 1-ethynyl-2,4-difluorobenzene and 4,4'-difluorobenzophenone that were starting materials, the sulfonated poly(arylene ether) copolymer SPAEK-pSXb-DEk that had the crosslinking structure in the chain of the polymer was produced. The yield of each of the copolymers was not less than 90%.

The polymer structures of the sulfonated poly(arylene ether) copolymers that had the crosslinking structures that were synthesized by Preparation Examples 1 to 30 were analyzed through $^1$H-NMR and $^{19}$F-NMR.

The analysis results of $^1$H-NMR and $^{19}$F-NMR in FIGS. 1 to 15 were obtained, and it was confirmed that there were no hydroxyl groups in the monomer hydroquinonesulfonic acid potassium salt and the monomers having the hydroxyl groups as the functional groups, and by confirming the proton peak corresponding to the ethynyl group, it was confirmed that the crosslinkable monomer was substituted. In addition, it could be seen that the peaks corresponding to the peaks of the polymers were shown.

Figure 2:
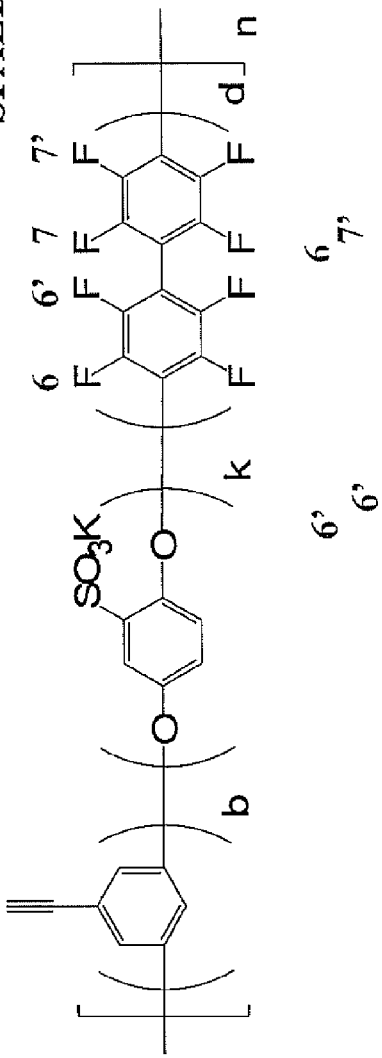
FIG. 2 is a view that illustrates a $^{19}$F-NMR spectrum of a sulfonated poly(arylene ether) copolymer (SPAEDF-mSXb-100) that includes a crosslinking structure according to the present invention.
Figure 2:
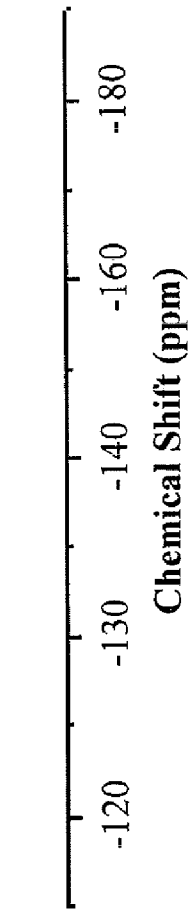
Figure 3:
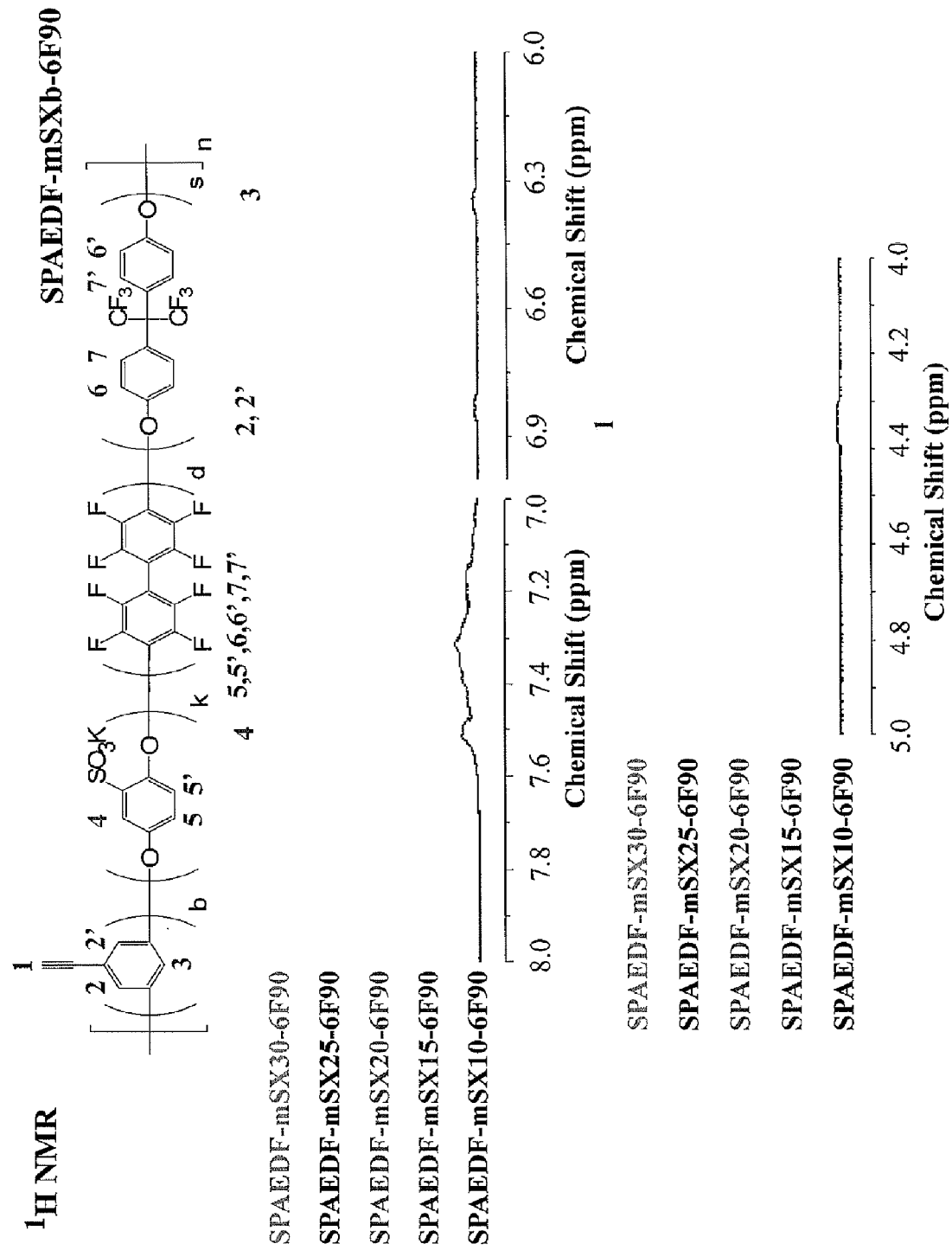
FIG. 3 is a view that illustrates a $^1$H-NMR spectrum of a sulfonated poly(arylene ether) copolymer (SPAEDF-mSXb-6F90) that includes a crosslinking structure according to the present invention.
Figure 4:
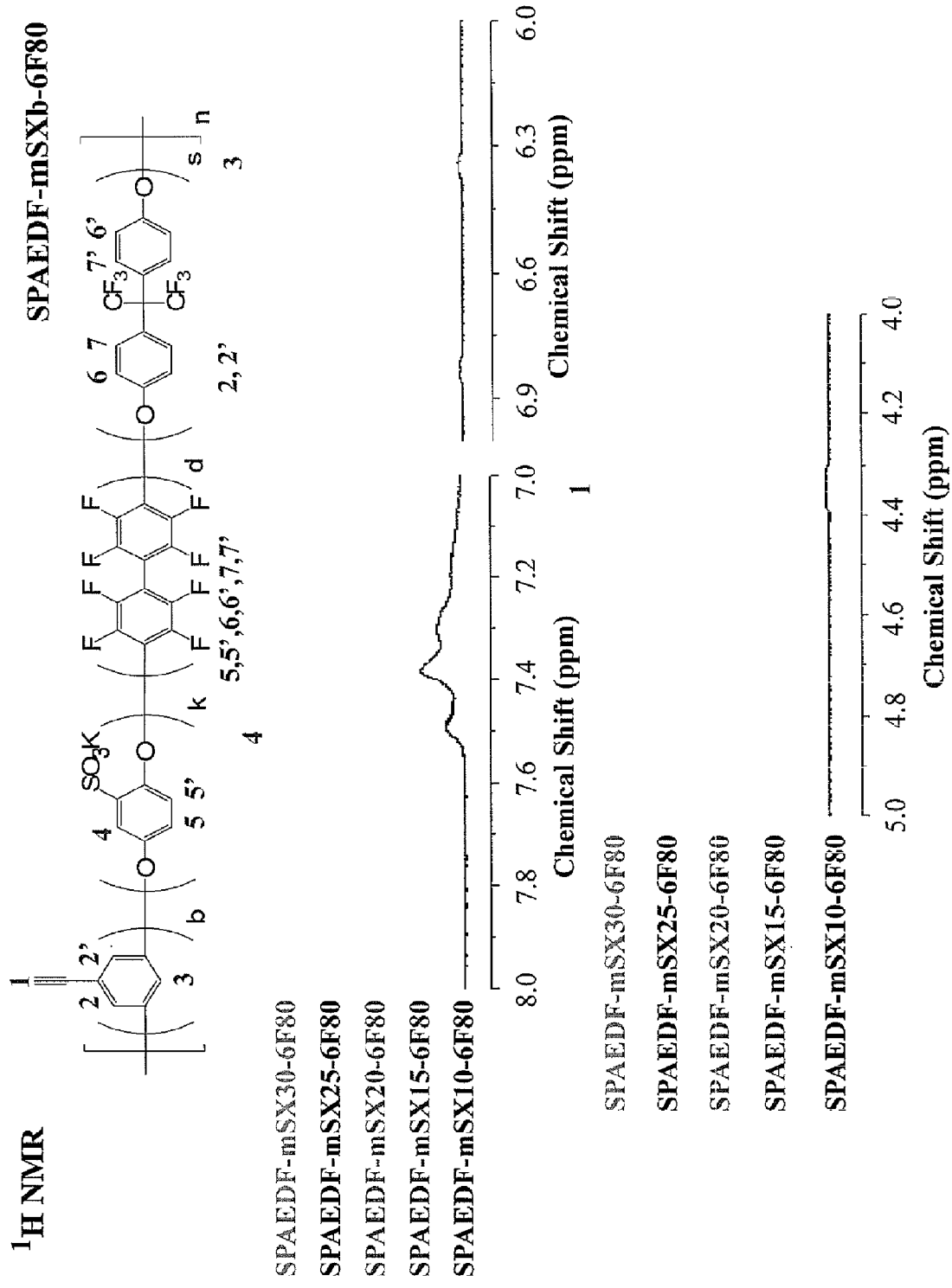
FIG. 4 is a view that illustrates a $^1$H-NMR spectrum of a sulfonated poly(arylene ether) copolymer (SPAEDF-mSXb-6F80) that includes a crosslinking structure.
Figure 5:
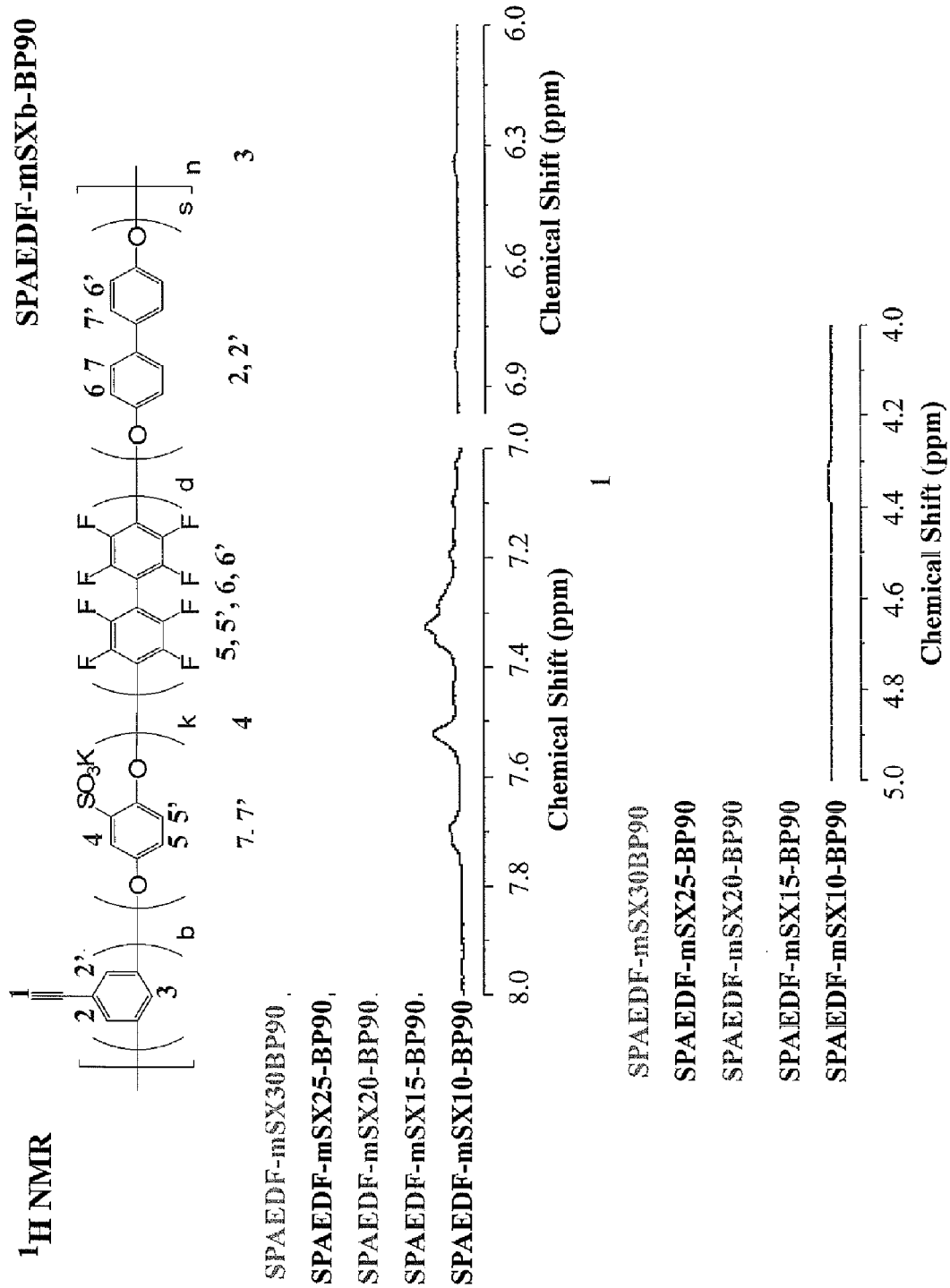
FIG. 5 is a view that illustrates a $^1$H-NMR spectrum of a sulfonated poly(arylene ether) copolymer (SPAEDF-mSXb-BP90) that includes a crosslinking structure.
Figure 6:
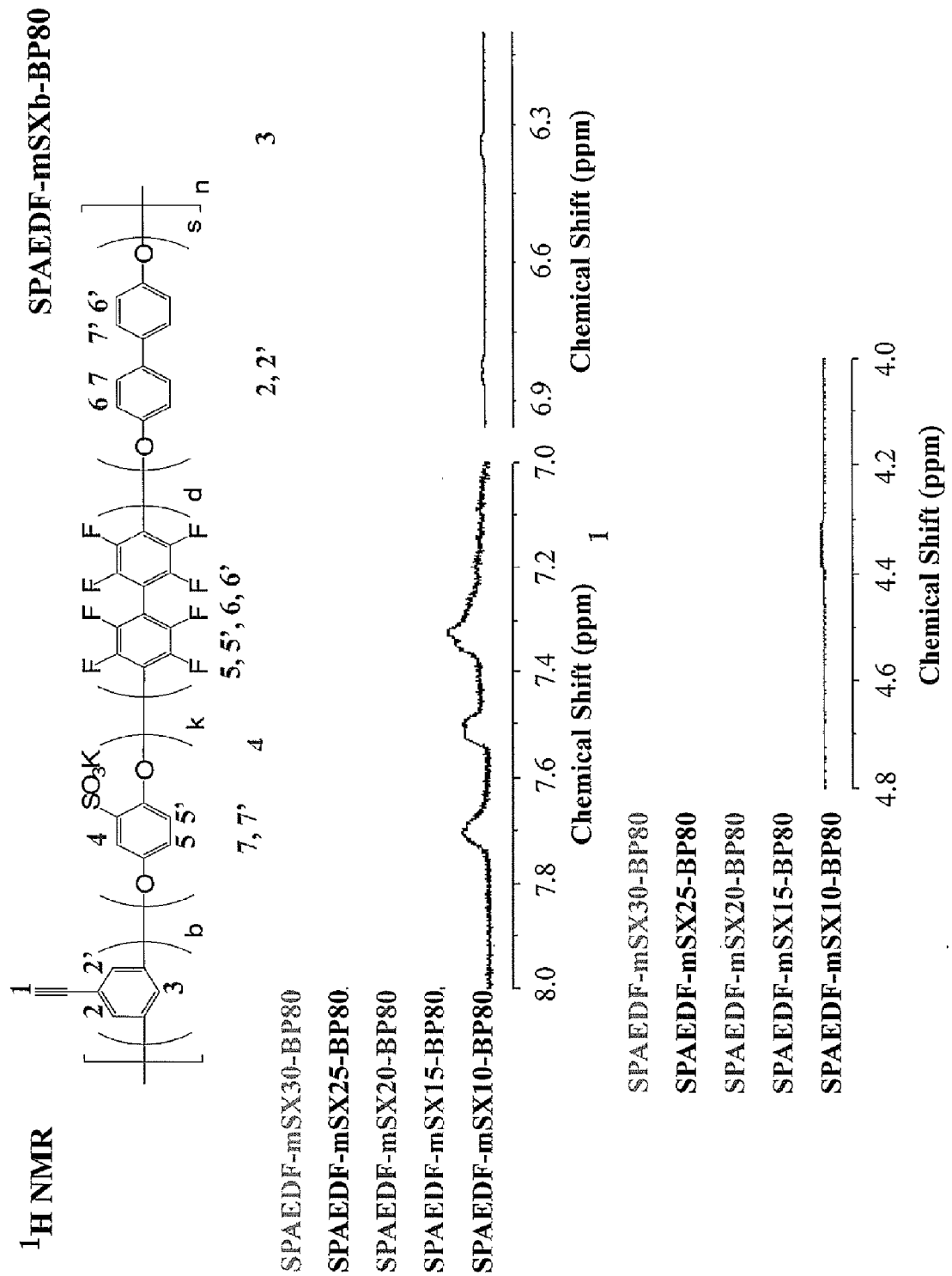
FIG. 6 is a view that illustrates a $^1$H-NMR spectrum of a sulfonated poly(arylene ether) copolymer (SPAEDF-mSXb-BP80) that includes a crosslinking structure.
Figure 7:
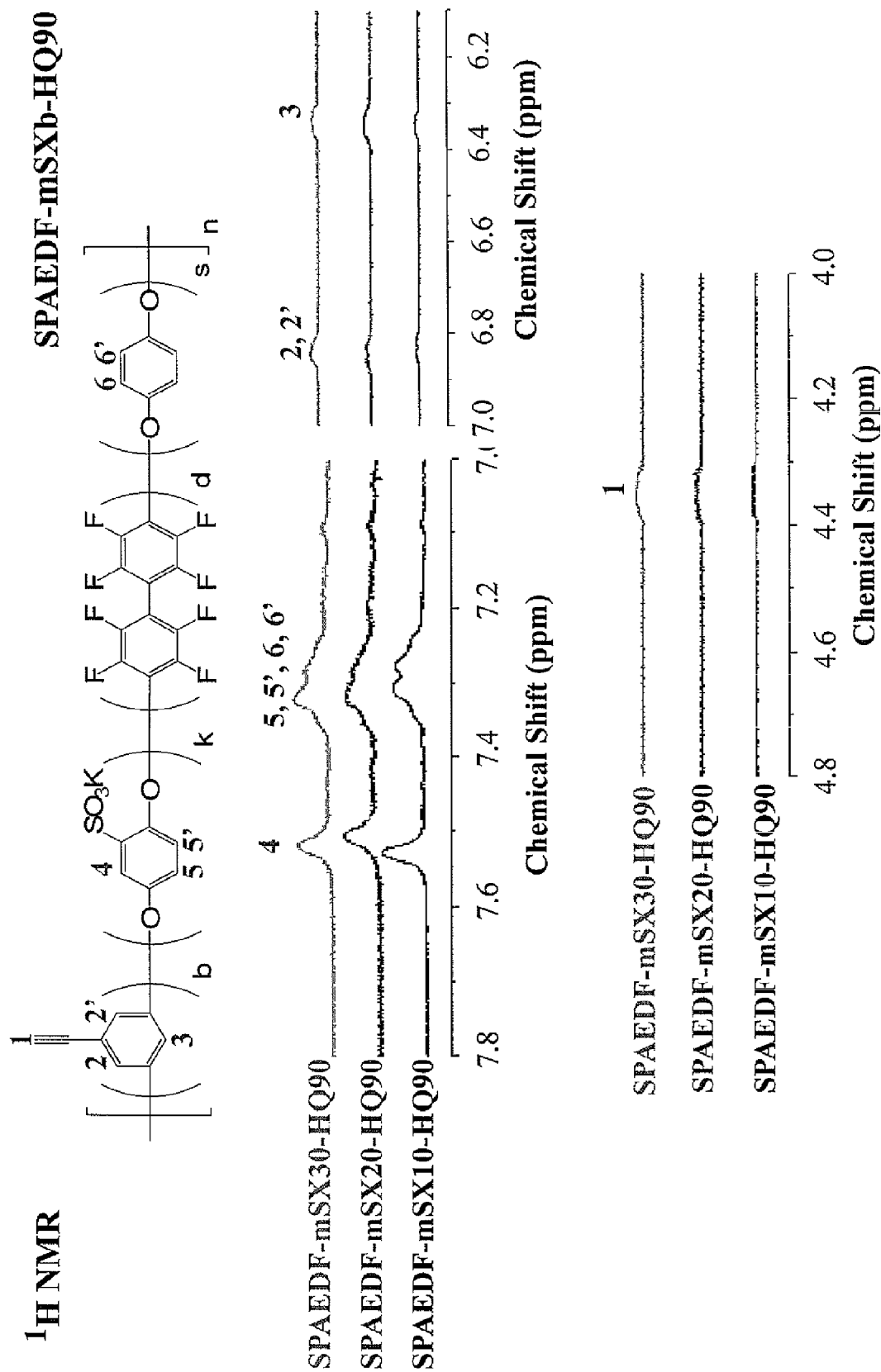
FIG. 7 is a view that illustrates a $^1$H-NMR spectrum of a sulfonated poly(arylene ether) copolymer (SPAEDF-mSXb-HQ90) that includes a crosslinking structure.
Figure 8:
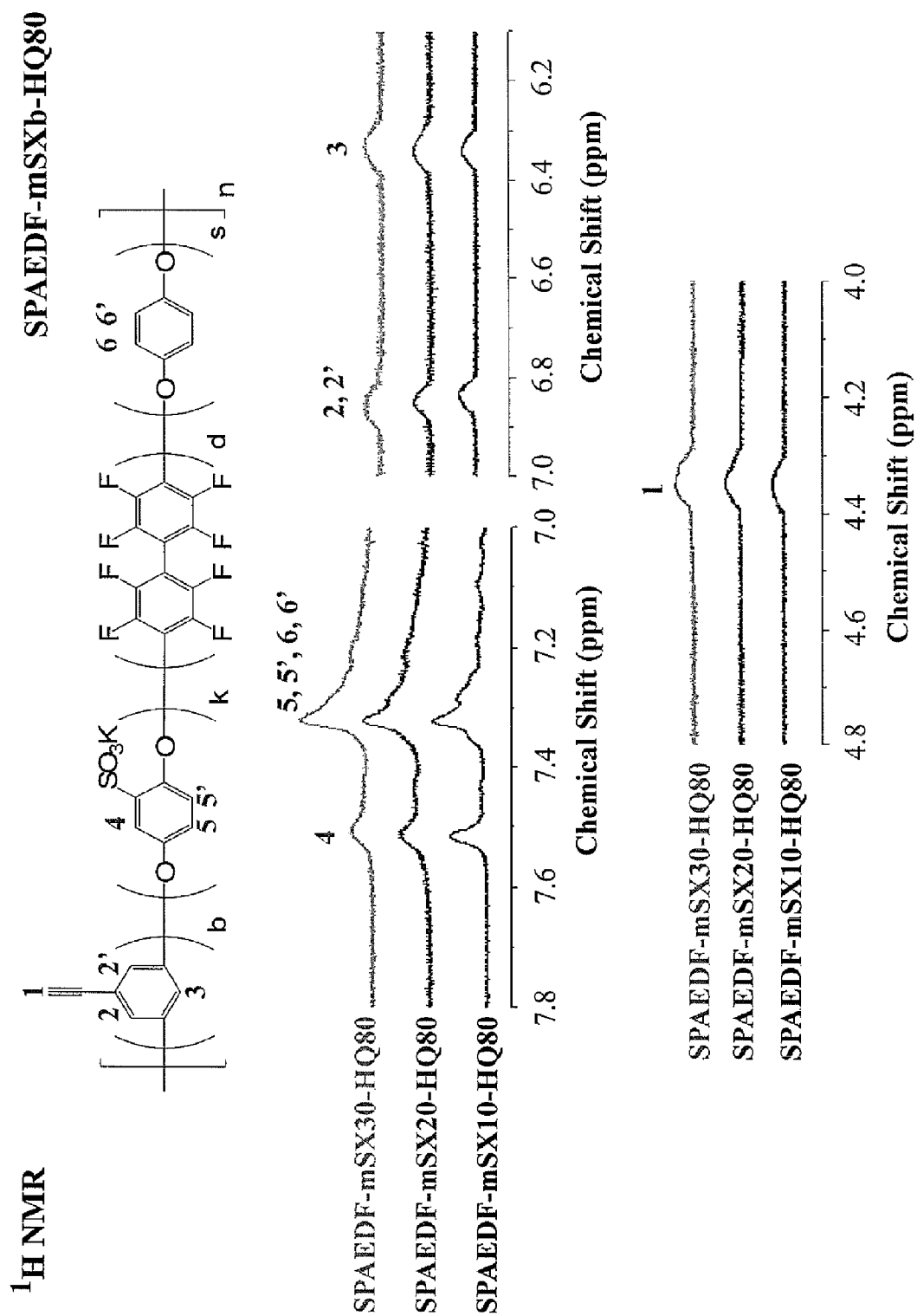
FIG. 8 is a view that illustrates a $^1$H-NMR spectrum of a sulfonated poly(arylene ether) copolymer (SPAEDF-mSXb-HQ80) that includes a crosslinking structure.
Figure 9:
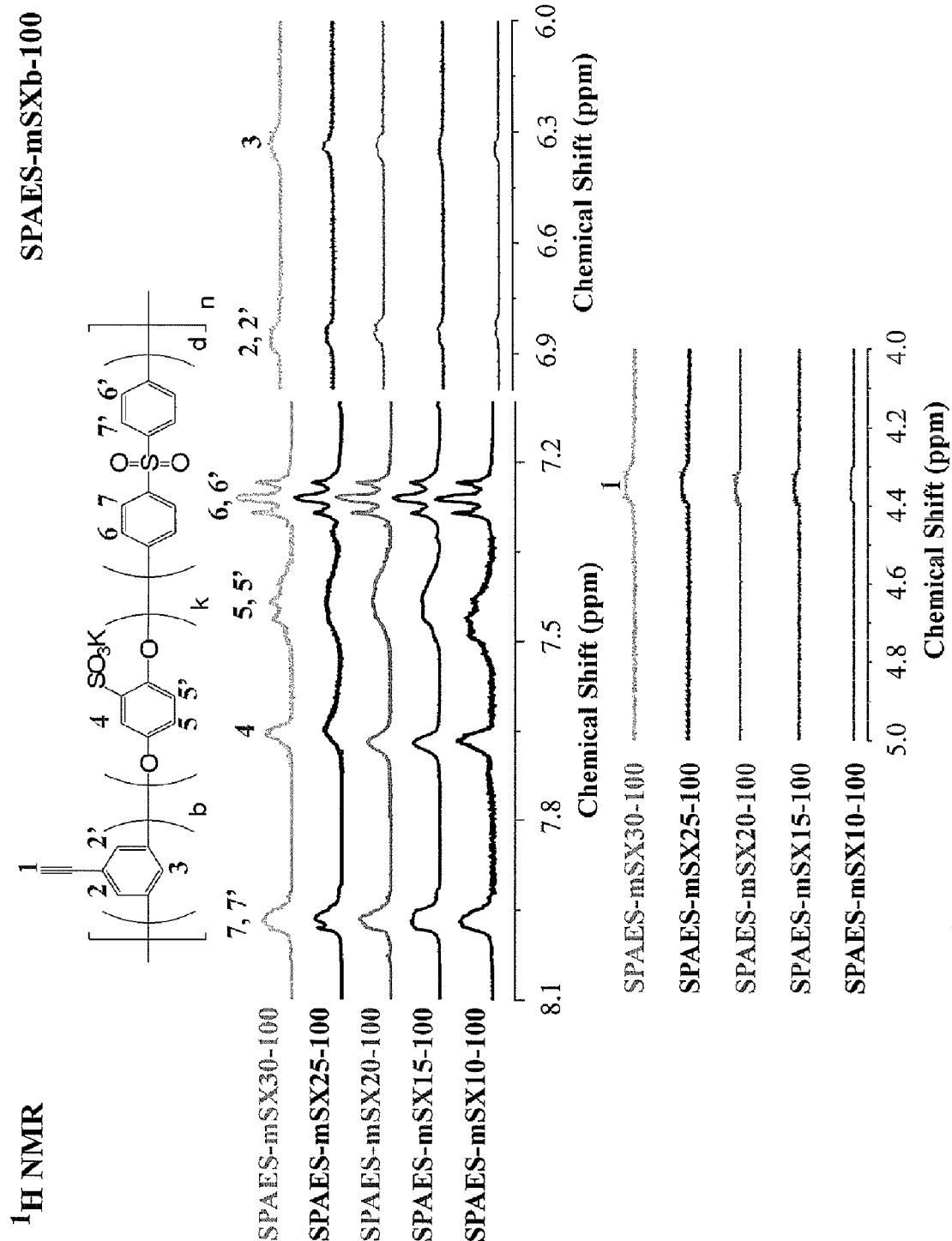
FIG. 9 is a view that illustrates a $^1$H-NMR spectrum of a sulfonated poly(arylene ether) copolymer (SPAES-mSXb-100) that includes a crosslinking structure.
Figure 10:
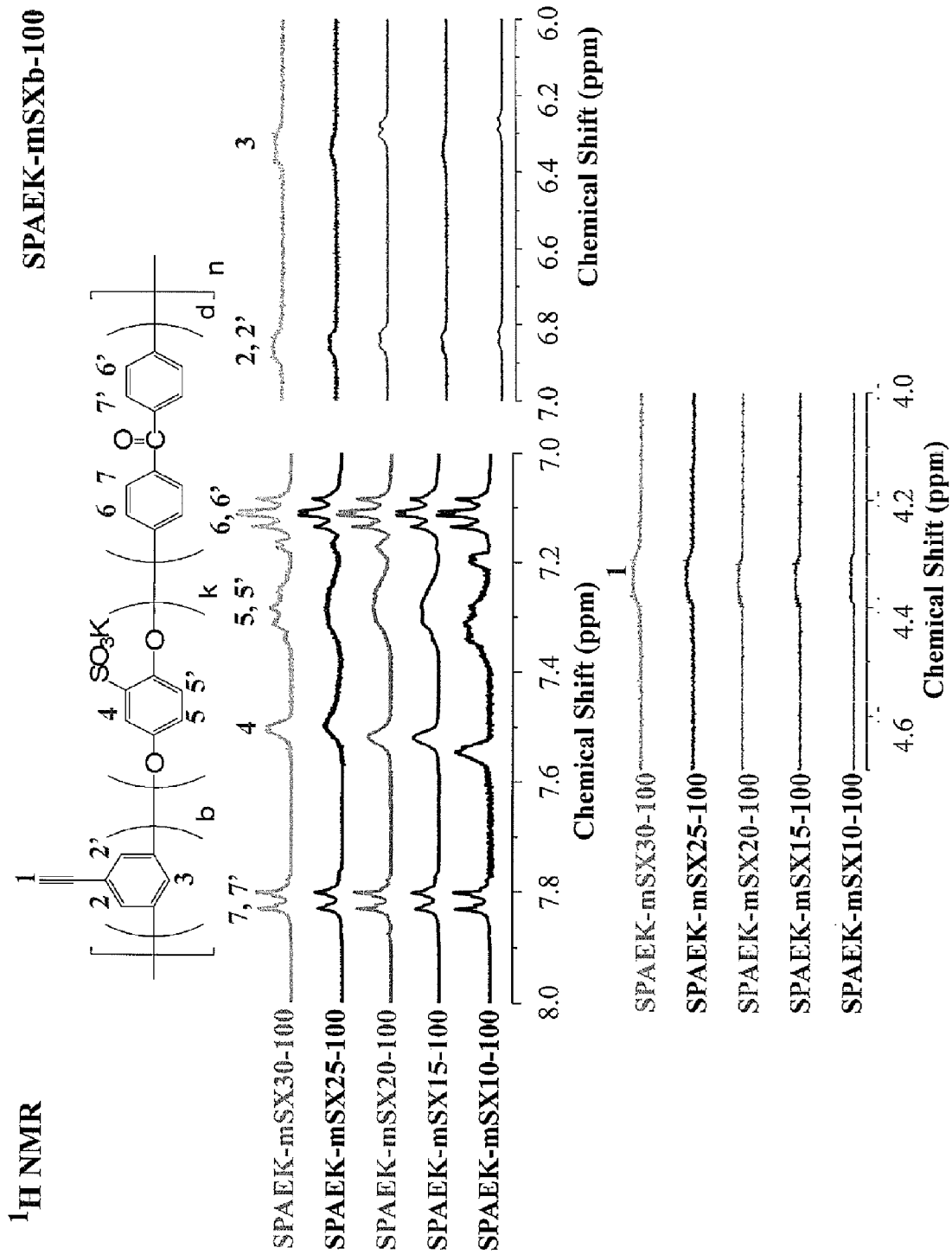
FIG. 10 is a view that illustrates a $^1$H-NMR spectrum of a sulfonated poly(arylene ether) copolymer (SPAEK-mSXb-100) that includes a crosslinking structure.
Figure 11:
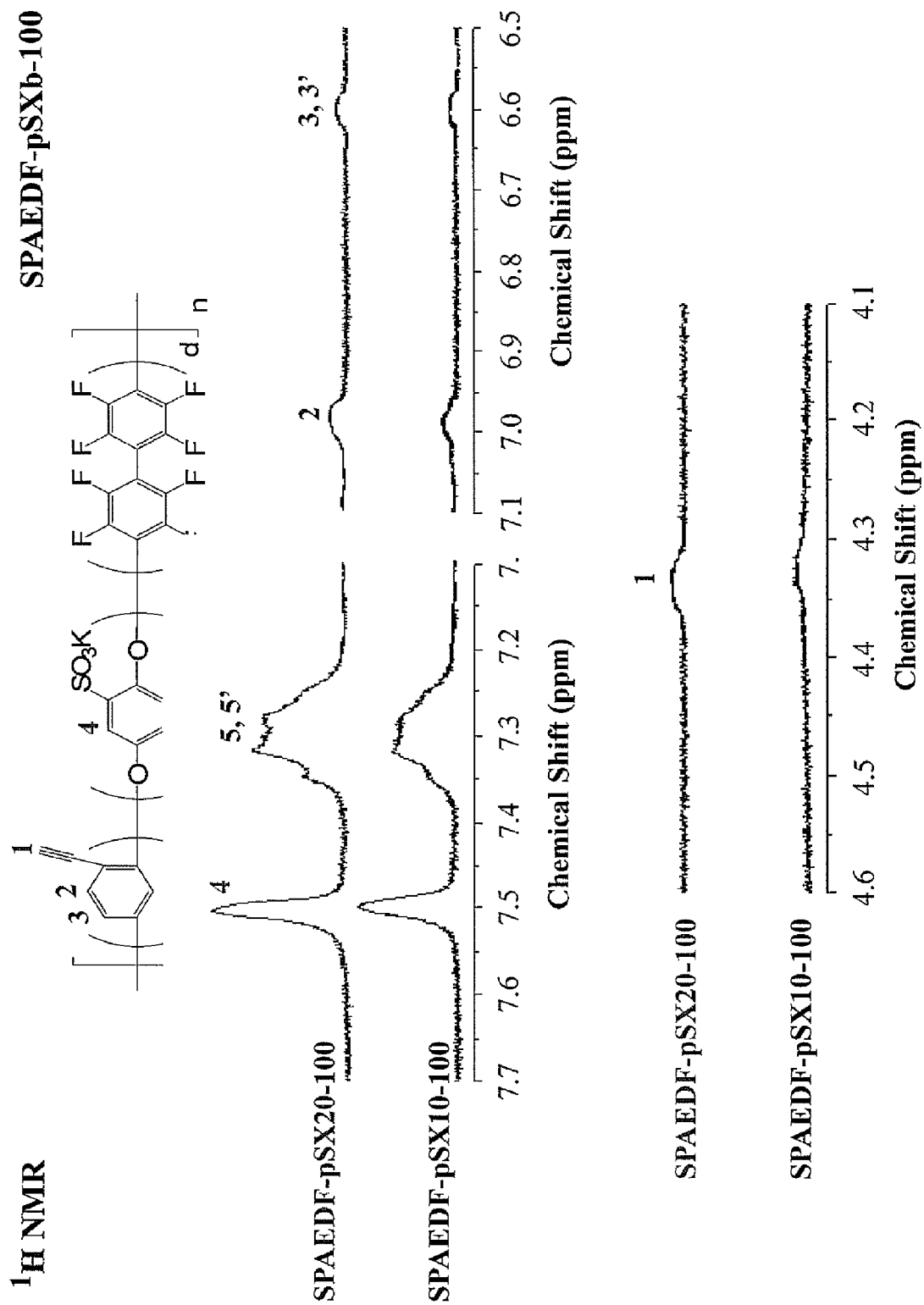
FIG. 11 is a view that illustrates a $^1$H-NMR spectrum of a sulfonated poly(arylene ether) copolymer (SPAEDF-pSXb-100) that includes a crosslinking structure.
Figure 12:
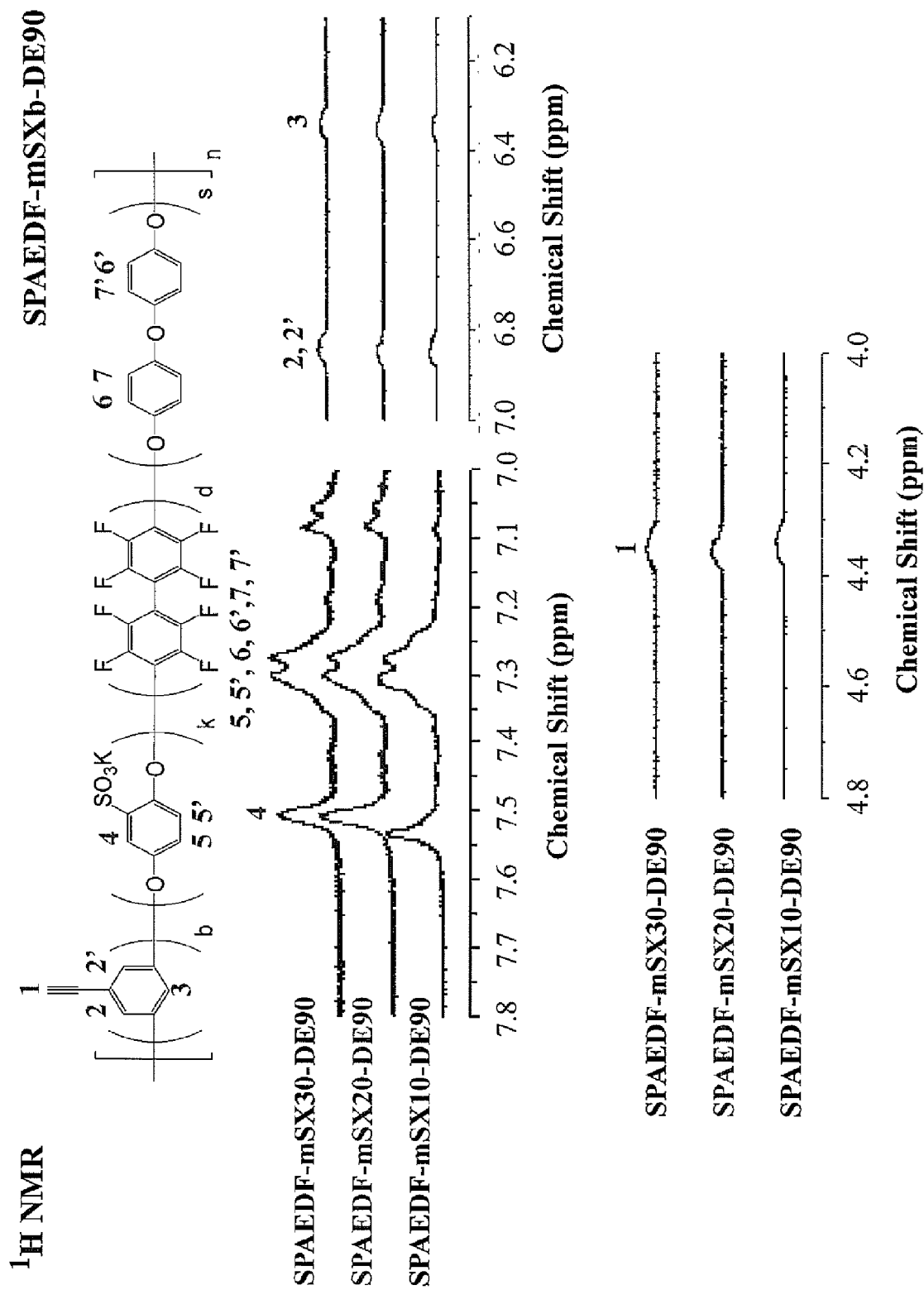
FIG. 12 is a view that illustrates a $^1$H-NMR spectrum of a sulfonated poly(arylene ether) copolymer (SPAEDF-mSXb-DE90) that includes a crosslinking structure.
Figure 13:
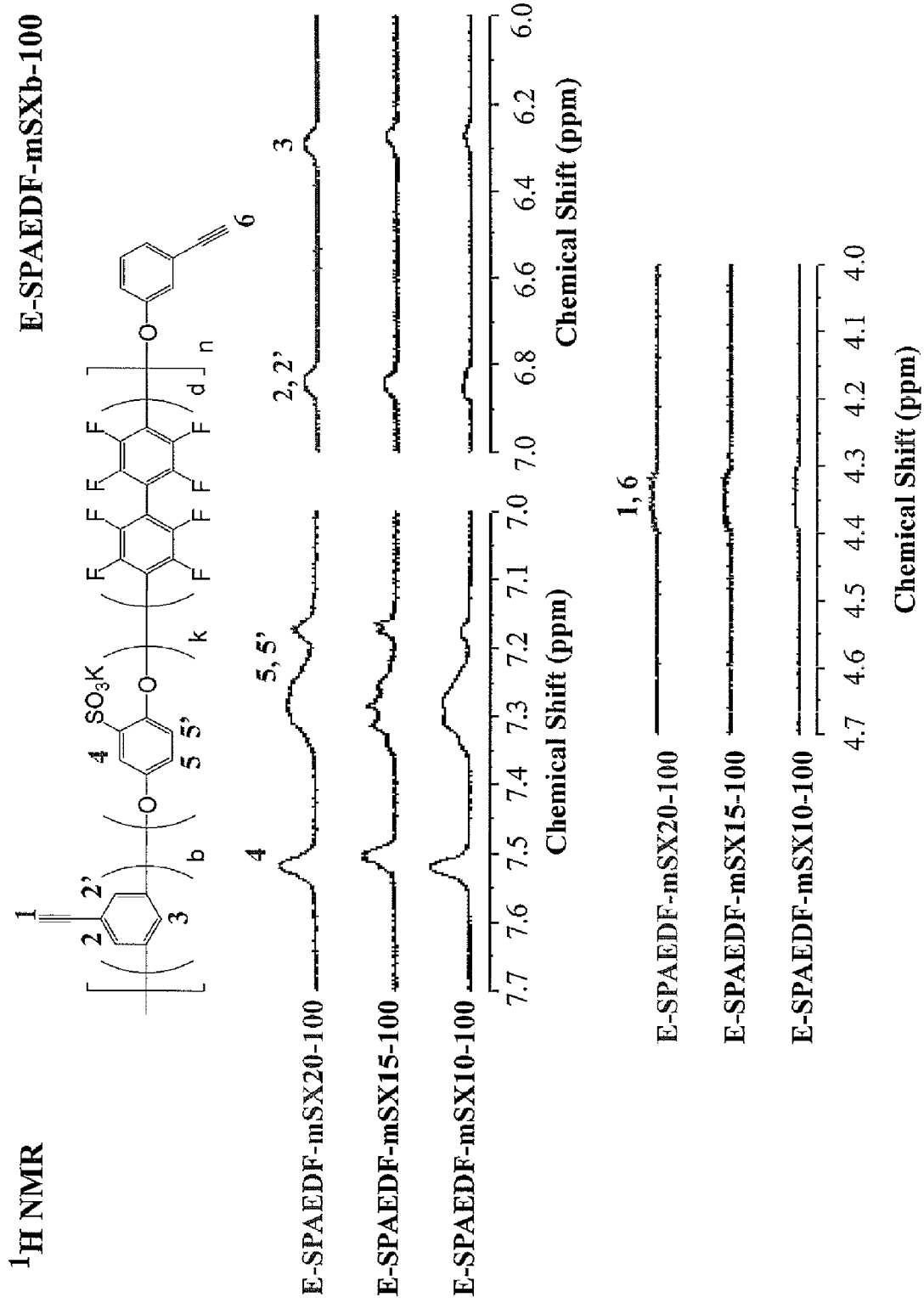
FIG. 13 is a view that illustrates a $^1$H-NMR spectrum of a sulfonated poly(arylene ether) copolymer (E-SPAEDF-mSXb-100) that includes a crosslinking structure.
Figure 14:
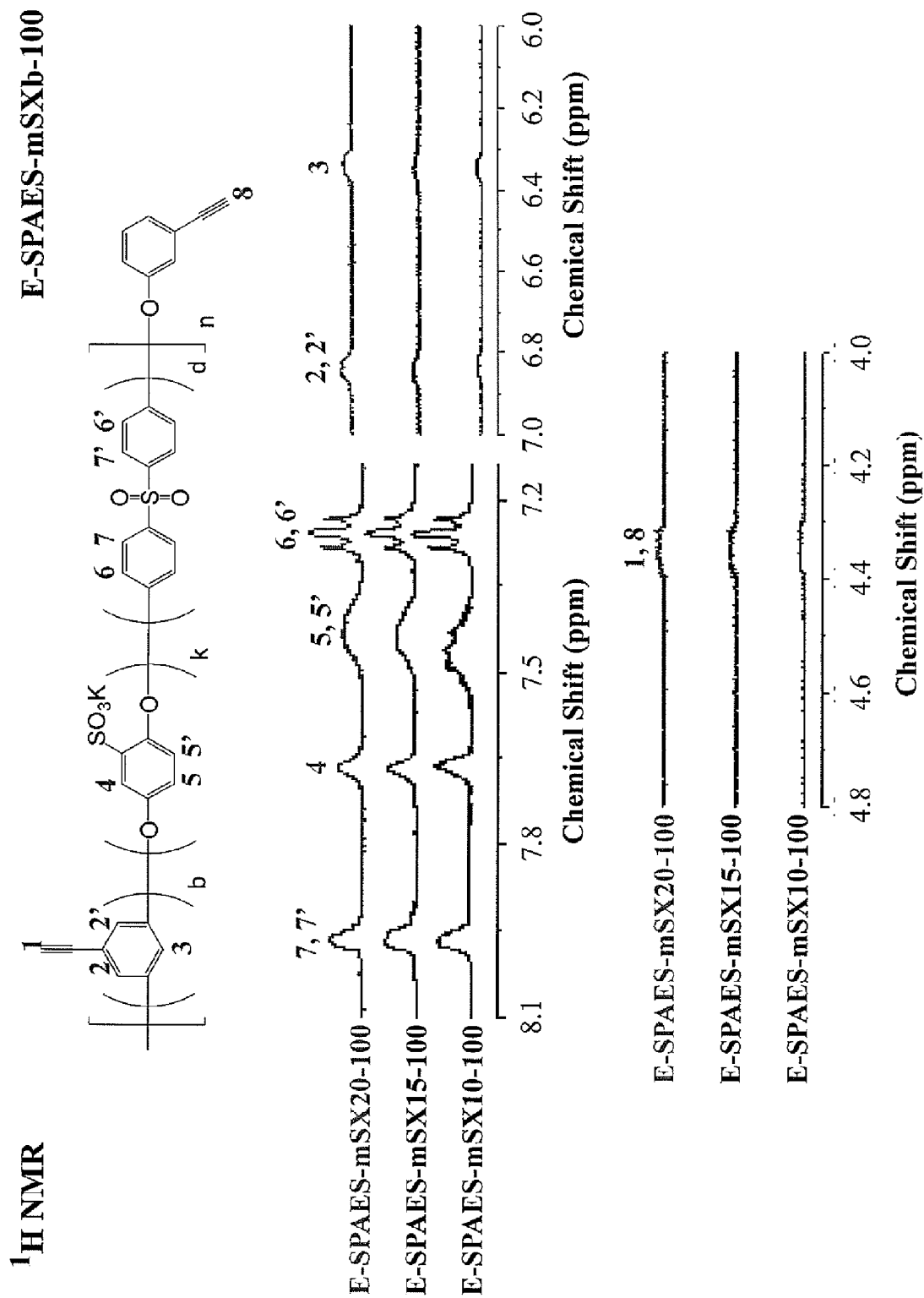
FIG. 14 is a view that illustrates a $^1$H-NMR spectrum of a sulfonated poly(arylene ether) copolymer (E-SPAES-mSXb-100) that includes a crosslinking structure.
Figure 15:
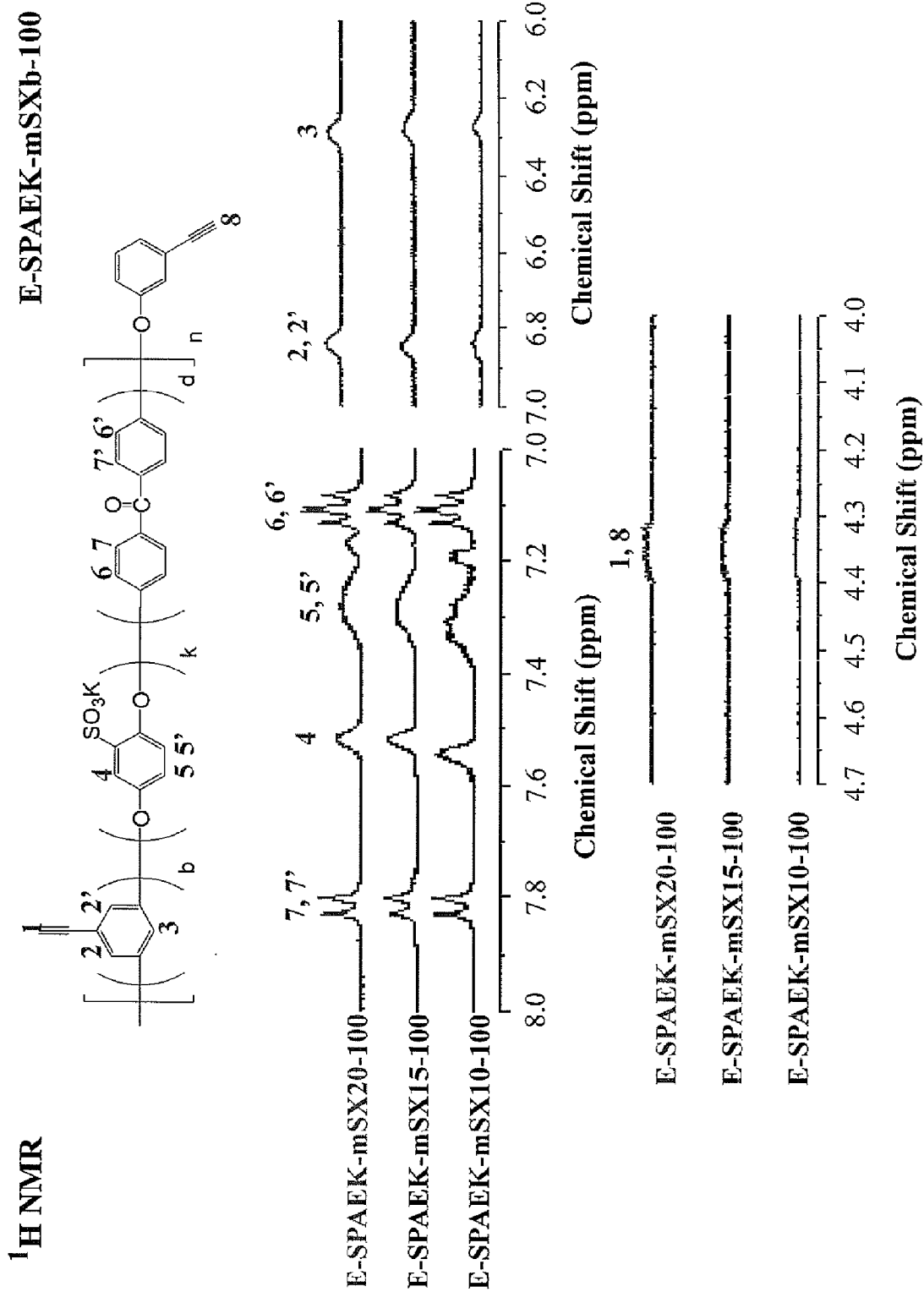
FIG. 15 is a view that illustrates a $^1$H-NMR spectrum of a sulfonated poly(arylene ether) copolymer (E-SPAEK-mSXb-100) that includes a crosslinking structure.

In addition, as the analysis result of $^{19}$F-NMR in FIG. 2, it can be seen that since only two peaks occurs, F is separated from the para position of the decafluorobiphenyl group because it takes a participate in the polymerization reaction.

Preparation Example 31

Production of the Polymer Electrolyte Film

After the sulfonated poly(arylene ether) copolymers that had the crosslinking structures synthesized by Preparation Examples 1 to 30 were dissolved in the solvent, it was filtered by using the PTFE membrane filter that had the size in the range of 0.45~1 μm. Next, after the polymer solvent was poured on the clean glass support by using the casting method, it was left in the oven 40° C. for 24 hours.

Continuously, in order to perform the crosslinking of the inside of the polymer chain, the heat treatment was carried out at the temperature in the range of 80~350° C. for 30 min or more. In addition, it is preferable that the heat treatment is carried out at the temperature in the range of 250~260° C. for 2 hours or more.

At this time, as the solvent that is capable of being used, the dipolar solvent, in detail, N,N'-dimethyl formamide (DMF), dimethyl acetamide (DMAc), dimethyl sulfoxide (DMSO) or N-methylpyrrolidone (NMP) may be used.

After the heat treatment is finished, it is cooled to normal temperature, the acid treatment is carried out to substitute the salt ion ($Na^+$, $K^+$, and the alkyl ammonium ion) of the sulfone portion that is produced in the above Reaction Equations 2 to 31 with hydrogen.

The acid treatment method uses a method in which after it is immersed in 2 normal sulfuric acid ($H_2SO_4$) aqueous solution, 1 normal nitric acid ($HNO_3$) aqueous solution or 1 normal chloric acid (HCl) aqueous solution for 24 hours, it is immersed in the distilled water for 24 hours, or it is immersed in the 0.5 mole of the sulfuric acid ($H_2SO_4$) aqueous solution and boiled for 2 hours, but is not limited thereto.

The polymer electrolyte film that is subjected to the acid treatment is immersed in the distilled water for 24 hours, and then the proton conductivity thereof is measured.

According to the name of the sulfonated poly(arylene ether) copolymers by Preparation Examples 1 to 30, the names of the produced polymer film are separately provided. That is, in the case of when the polymer film is produced by using SPAEDF-mSX5-100 of Preparation Example 1, the name of the polymer film is called as CSPAEDF-mSX5-100. That is, among the sulfonated poly(arylene ether) copolymers that are disclosed in Preparation Examples 1 to 30, the names of 30 polymer films in which 1-ethynyl-3,5-difluorobenzene is used as the starting material are CSPAEDF-mSXb-100, CSPAEDF-mSXb-6Fk, CSPAEDF-mSXb-BPk, CSPAEDF-mSXb-HQk, CSPAEDF-mSXb-DEk, CSPAES-mSXb-100, CSPAES-mSXb-6Fk, CSPAES-mSXb-BPk, CSPAES-mSXb-HQk, CSPAES-mSXb-DEk, CSPAEK-mSXb-100, CSPAEK-mSXb-6Fk, CSPAEK-mSXb-BPk, CSPAEK-mSXb-HQk, CSPAEKmSXb-DEk, CSPAEDF-pSXb-100, CSPAEDF-pSXb-6Fk, CSPAEDF-pSXb-BPk, CSPAEDF-pSXb-HQk, CSPAEDF-pSXb-DEk, CSPAES-pSXb-100, CSPAES-pSXb-6Fk, CSPAES-pSXb-BPk, CSPAES-pSXb-HQk, CSPAES-pSXb-DEk, CSPAEK-pSXb-100, CSPAEK-pSXb-6Fk, CSPAEK-pSXb-BPk, CSPAEK-pSXb-HQk, and CSPAEK-pSXb-DEk.

The following Table 1 shows the measured solubility of the 30 polymer films.

TABLE 1

| polymer electrolyte film | NMP | DMAc | DMSO | DMF | THF | Acetone | $CHCl_3$ | MeOH | Water |
| --- | --- | --- | --- | --- | --- | --- | --- | --- | --- |
| CSPAEDF-mSXb-100 | I | I | I | I | I | I | I | I | I |
| CSPAEDF-mSXb-6Fk | I | I | I | I | I | I | I | I | I |
| CSPAEDF-mSXb-BPk | I | I | I | I | I | I | I | I | I |
| CSPAEDF-mSXb-HQk | I | I | I | I | I | I | I | I | I |
| CSPAEDF-mSXb-DEk | I | I | I | I | I | I | I | I | I |
| CSPAES-mSXb-100 | I | I | I | I | I | I | I | I | I |
| CSPAES-mSXb-6Fk | I | I | I | I | I | I | I | I | I |

TABLE 1-continued

| polymer electrolyte film | NMP | DMAc | DMSO | DMF | THF | Acetone | CHCl$_3$ | MeOH | Water |
|---|---|---|---|---|---|---|---|---|---|
| CSPAES-mSXb-BPk | I | I | I | I | I | I | I | I | I |
| CSPAES-mSXb-HQk | I | I | I | I | I | I | I | I | I |
| CSPAES-mSXb-DEk | I | I | I | I | I | I | I | I | I |
| CSPAEK-mSXb-100 | I | I | I | I | I | I | I | I | I |
| CSPAEK-mSXb-6Fk | I | I | I | I | I | I | I | I | I |
| CSPAEK-mSXb-BPk | I | I | I | I | I | I | I | I | I |
| CSPAEK-mSXb-HQk | I | I | I | I | I | I | I | I | I |
| CSPAEK-mSXb-DEk | I | I | I | I | I | I | I | I | I |
| CSPAEDF-pSXb-100 | I | I | I | I | I | I | I | I | I |
| CSPAEDF-pSXb-6Fk | I | I | I | I | I | I | I | I | I |
| CSPAEDF-pSXb-BPk | I | I | I | I | I | I | I | I | I |
| CSPAEDF-pSXb-HQk | I | I | I | I | I | I | I | I | I |
| CSPAEDF-pSXb-DEk | I | I | I | I | I | I | I | I | I |
| CSPAES-pSXb-100 | I | I | I | I | I | I | I | I | I |
| CSPAES-pSXb-6Fk | I | I | I | I | I | I | I | I | I |
| CSPAES-pSXb-BPk | I | I | I | I | I | I | I | I | I |
| CSPAES-pSXb-HQk | I | I | I | I | I | I | I | I | I |
| CSPAES-pSXb-DEk | I | I | I | I | I | I | I | I | I |
| CSPAEK-pSXb-100 | I | I | I | I | I | I | I | I | I |
| CSPAEK-pSXb-6Fk | I | I | I | I | I | I | I | I | I |
| CSPAEK-pSXb-BPk | I | I | I | I | I | I | I | I | I |
| CSPAEK-pSXb-HQk | I | I | I | I | I | I | I | I | I |
| CSPAEK-pSXb-DEk | I | I | I | I | I | I | I | I | I |

In Table 1, I represents the insolubility in the solvent. In addition, as seen in Table 1, since the polymer electrolyte film is not dissolved in any solvent, it can be seen that the polymer electrolyte film is crosslinked. In addition, it can be seen that it is very chemically stable and the dimensional stability is excellent.

The ion exchange ability of the polymer electrolyte film that is produced in Preparation Example 31 is compared to that of the Nafion that is currently commercialized, and the results are described in Table 2.

TABLE 2

| electrolyte film | ion exchange ability (meq/g) test value[a] | electrolyte film | ion exchange ability (meq/g) test value[a] |
|---|---|---|---|
| CSPAEDF-mSX10-100 | 2.15 | CSPAES-mSX10-100 | 2.55 |
| CSPAEDF-mSX20-100 | 2.30 | CSPAEK-mSX10-100 | 2.78 |
| CSPAEDF-mSX10-6F90 | 1.88 | CSPAES-mSX10-6F90 | 2.21 |
| CSPAEDF-mSX20-6F90 | 2.00 | CSPAEK-mSX10-6F90 | 2.40 |
| CSPAEDF-mSX10-6F80 | 1.62 | CSPAES-mSX10-6F80 | 1.90 |
| CSPAEDF-mSX20-6F80 | 1.72 | CSPAEK-mSX10-6F80 | 2.05 |
| CSPAEDF-mSX10-BP90 | 1.94 | CSPAES-mSX10-BP90 | 2.29 |
| CSPAEDF-mSX20-BP90 | 2.07 | CSPAEK-mSX10-BP90 | 2.50 |
| CSPAEDF-mSX10-BP80 | 1.72 | CSPAES-mSX10-BP80 | 2.04 |
| CSPAEDF-mSX20-BP80 | 1.84 | CSPAEK-mSX10-BP80 | 2.22 |
| CSPAEDF-mSX10-HQ90 | 1.97 | CSPAES-mSX10-HQ90 | 2.34 |
| CSPAEDF-mSX20-HQ90 | 2.11 | CSPAEK-mSX10-HQ90 | 2.55 |

TABLE 2-continued

| electrolyte film | ion exchange ability (meq/g) test value[a] | electrolyte film | ion exchange ability (meq/g) test value[a] |
|---|---|---|---|
| CSPAEDF-mSX10-HQ80 | 1.78 | CSPAES-mSX10-HQ80 | 2.12 |
| CSPAEDF-mSX20-HQ80 | 1.91 | CSPAEK-mSX10-HQ80 | 2.32 |
| CSPAEDF-mSX10-DE90 | 1.93 | CSPAES-mSX10-DE90 | 2.28 |
| CSPAEDF-mSX20-DE90 | 2.06 | CSPAEK-mSX10-DE90 | 2.49 |
| CSPAEDF-mSX10-DE80 | 1.71 | CSPAES-mSX10-DE80 | 2.02 |
| CSPAEDF-mSX20-DE80 | 1.83 | CSPAEK-mSX10-DE80 | 2.21 |
| CSPAEDF-pSX10-100 | 2.15 | CSPAES-pSX10-100 | 2.55 |
| CSPAEDF-pSX20-100 | 2.30 | CSPAEK-pSX10-100 | 2.78 |
| CSPAEDF-pSX10-6F90 | 1.88 | CSPAES-pSX10-6F90 | 2.21 |
| CSPAEDF-pSX20-6F90 | 2.00 | CSPAEK-pSX10-6F90 | 2.40 |
| CSPAEDF-pSX10-6F80 | 1.62 | CSPAES-pSX10-6F80 | 1.90 |
| CSPAEDF-pSX20-6F80 | 1.72 | CSPAEK-pSX10-6F80 | 2.05 |
| CSPAEDF-pSX10-BP90 | 1.94 | CSPAES-pSX10-BP90 | 2.29 |
| CSPAEDF-pSX20-BP90 | 2.07 | CSPAEK-pSX10-BP90 | 2.50 |
| CSPAEDF-pSX10-BP80 | 1.72 | CSPAES-pSX10-BP80 | 2.04 |
| CSPAEDF-pSX20-BP80 | 1.84 | CSPAEK-pSX10-BP80 | 2.22 |
| CSPAEDF-pSX10-HQ90 | 1.97 | CSPAES-pSX10-HQ90 | 2.34 |
| CSPAEDF-pSX20-HQ90 | 2.11 | CSPAEK-pSX10-HQ90 | 2.55 |
| CSPAEDF-pSX10-HQ80 | 1.78 | CSPAES-pSX10-HQ80 | 2.12 |
| CSPAEDF-pSX20-HQ80 | 1.91 | CSPAEK-pSX10-HQ80 | 2.32 |
| CSPAEDF-pSX10-DE90 | 1.93 | CSPAES-pSX10-DE90 | 2.28 |
| CSPAEDF-pSX20-DE90 | 2.06 | CSPAEK-pSX10-DE90 | 2.49 |
| CSPAEDF-pSX10-DE80 | 1.71 | CSPAES-pSX10-DE80 | 2.02 |
| CSPAEDF-pSX20-DE80 | 1.83 | CSPAEK-pSX10-DE80 | 2.21 |
| Nafion 117 | 0.91 | Nafion 117 | 0.91 |

[a] after it is immersed in the 0.01N NaCl solution for 24 hours, the measurement is performed by titrating it with 0.01N NaOH. (phenolphthalane is used as the indicator)

As seen in Table 2, since the ion exchange ability of the produced polymer electrolyte film is very high in comparison with that of the Nafion, it can be expected that the proton conductivity that is the most important property of the molecular electrolyte film will be higher than that of the Nafion.

The water uptake and the proton conductivity of the polymer electrolyte film that is produced in Preparation Example 31 are compared to those of the Nafion, and the results are shown in the following Table 3.

TABLE 3

| electrolyte film | ionconductivity (S/cm)[a] | water uptake (wt %)[b] | electrolyte film | ionconductivity (S/cm)[a] | water uptake (wt %)[b] |
|---|---|---|---|---|---|
| CSPAEDF-mSX10-100 | 0.139 | 101 | CSPAEDF-pSX10-100 | 0.137 | 102 |
| CSPAEDF-mSX20-100 | 0.126 | 85 | CSPAEDF-pSX20-100 | 0.127 | 83 |
| CSPAEDF-mSX10-6F90 | 0.109 | 41 | CSPAEDF-pSX10-6F90 | 0.105 | 37 |
| CSPAEDF-mSX10-6F80 | 0.071 | 26 | CSPAEDF-pSX10-6F80 | 0.073 | 27 |
| CSPAEDF-mSX10-BP90 | 0.105 | 38 | CSPAEDF-pSX10-BP90 | 0.105 | 37 |
| CSPAEDF-mSX10-BP80 | 0.073 | 28 | CSPAEDF-pSX10-BP80 | 0.075 | 29 |
| CSPAEDF-mSX10-HQ90 | 0.120 | 50 | CSPAEDF-pSX10-HQ90 | 0.119 | 48 |
| CSPAEDF-mSX10-HQ80 | 0.087 | 35 | CSPAEDF-pSX10-HQ80 | 0.086 | 34 |
| CSPAEDF-mSX10-DE90 | 0.109 | 43 | CSPAEDF-pSX10-DE90 | 0.105 | 41 |
| CSPAEDF-mSX10-DE80 | 0.079 | 35 | CSPAEDF-pSX10-DE80 | 0.080 | 35 |
| Nafion 117 | 0.094 | 32 | Nafion 117 | 0.094 | 32 |

[a] measured by using the impedance analysis device (AutoLab, PGSTAT 30, Netherlands) {σ(S/cm) = L/(R × S), σ is the ion conductivity, L (cm) is the distance between the two electrodes, R (Ω) is the resistance of the film, and S (cm$^2$) is the surface area of the film through which the ions pass}

[b] the calculated weight value of the film {water uptake (%) = (Wwet − Wdry) × 100/Wdry, Wwet is the weight of the wet film, and Wdry is the weight of the dry film}

As seen in Table 3, it can be seen that the proton conductivity that is the most important property of the polymer electrolyte film is largely improved in comparison with that of the Nafion, and the water uptake is reduced.

In addition, among the sulfonated poly(arylene ether) copolymers by Preparation Examples 1 to 15, the name of the polymer film that is produced according to the copolymers that are synthesized by using 4'-ethynyl-2,5-difluorobiphenyl instead of 1-Ethynyl-3,5-difluorobenzene as the starting material is separately provided. That is, in the case of when the polymer film is produced by using SPAEDF-vSX5-100 of Preparation Example 1, the name of the polymer film is called as CSPAEDF-vSX5-100.

Accordingly, the polymer electrolyte film in which 4'-ethynyl-2,5-difluorobiphenyl that is disclosed in Preparation Examples 1 to 15 is used in the crosslinking structure is called as CSPAEDF-vSXb-100, CSPAEDF-vSXb-6Fk, CSPAEDF-vSXb-BPk, CSPAEDF-vSXb-HQk, CSPAEDF-vSXb-DEk, CSPAES-vSXb-100, CSPAES-vSXb-6Fk, CSPAES-vSXb-BPk, CSPAES-vSXb-HQk, CSPAES-vSXb-DEk, CSPAEK-vSXb-100, CSPAEK-vSXb-6Fk, CSPAEK-vSXb-BPk, CSPAEK-vSXb-HQk, and CSPAEK-vSXb-DEk.

The following Table 4 shows the measured solubility of the 15 polymer electrolyte films.

In Table 4, I represents the insolubility in respects to the disclosed solvent. Accordingly, it can be seen that the crosslinking of the polymer electrolyte film occurs. In addition, it can be seen that it is chemically very stable and has the excellent dimensional stability.

The ion exchange ability of the polymer electrolyte film that is produced by the present embodiment is compared to that of the Nafion that is currently commercialized, and the results are described in the following Table 5.

TABLE 5

| electrolyte film | ion exchange ability (meq/g) test value[a] | electrolyte film | ion exchange ability (meq/g) test value[a] |
|---|---|---|---|
| CSPAEDF-vSX10-100 | 2.12 | CSPAES-vSX10-100 | 2.50 |
| CSPAEDF-vSX20-100 | 2.17 | CSPAEK-vSX10-100 | 2.72 |
| CSPAEDF-vSX10-6F90 | 1.85 | CSPAES-vSX10-6F90 | 2.17 |
| CSPAEDF-vSX20-6F90 | 1.90 | CSPAEK-vSX10-6F90 | 2.35 |
| CSPAEDF-vSX10-BP90 | 1.91 | CSPAES-vSX10-BP90 | 2.25 |
| CSPAEDF-vSX20-BP90 | 1.96 | CSPAEK-vSX10-BP90 | 2.45 |

TABLE 4

| polymer electrolyte film | NMP | DMAc | DMSO | DMF | THF | Acetone | CHCl$_3$ | MeOH | Water |
|---|---|---|---|---|---|---|---|---|---|
| CSPAEDF-vSXb-100 | I | I | I | I | I | I | I | I | I |
| CSPAEDF-vSXb-6Fk | I | I | I | I | I | I | I | I | I |
| CSPAEDF-vSXb-BPk | I | I | I | I | I | I | I | I | I |
| CSPAEDF-vSXb-HQk | I | I | I | I | I | I | I | I | I |
| CSPAEDF-vSXb-DEk | I | I | I | I | I | I | I | I | I |
| CSPAES-vSXb-100 | I | I | I | I | I | I | I | I | I |
| CSPAES-vSXb-6Fk | I | I | I | I | I | I | I | I | I |
| CSPAES-vSXb-BPk | I | I | I | I | I | I | I | I | I |
| CSPAES-vSXb-HQk | I | I | I | I | I | I | I | I | I |
| CSPAES-vSXb-DEk | I | I | I | I | I | I | I | I | I |
| CSPAEK-vSXb-100 | I | I | I | I | I | I | I | I | I |
| CSPAEK-vSXb-6Fk | I | I | I | I | I | I | I | I | I |
| CSPAEK-vSXb-BPk | I | I | I | I | I | I | I | I | I |
| CSPAEK-vSXb-HQk | I | I | I | I | I | I | I | I | I |
| CSPAEK-vSXb-DEk | I | I | I | I | I | I | I | I | I |

TABLE 5-continued

| electrolyte film | ion exchange ability (meq/g) test value[a] | electrolyte film | ion exchange ability (meq/g) test value[a] |
|---|---|---|---|
| CSPAEDF-vSX10-HQ90 | 1.94 | CSPAES-vSX10-HQ90 | 2.29 |
| CSPAEDF-vSX20-HQ90 | 1.99 | CSPAEK-vSX10-HQ90 | 2.50 |
| CSPAEDF-vSX10-DE90 | 1.90 | CSPAES-vSX10-DE90 | 2.24 |
| CSPAEDF-vSX20-DE90 | 1.95 | CSPAEK-vSX10-DE90 | 2.44 |
| Nafion 117 | 0.91 | Nafion 117 | 0.91 |

[a] after it is immersed in the 0.01N NaCl solution for 24 hours, the measurement is performed by titrating it with 0.01N NaOH. (phenolphthalane is used as the indicator)

As seen in Table 5, the ion exchange ability of the produced polymer electrolyte film is very high in comparison with that of the Nafion. Accordingly, it can be expected that the proton conductivity that is the most important property of the polymer electrolyte film will be higher than that of the Nafion.

Example 2

The sulfonated poly(arylene ether) copolymer according to the Example 2 of the present invention has the crosslinking structure in and at an end of the chain of the polymer. The sulfonated poly(arylene ether copolymer is according to the following Formula 2.

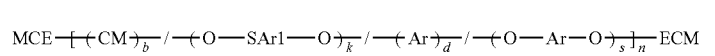

[Formula 2]

wherein SAr1 represents the sulfonated aromatic. In Formula 2, SAr1 is

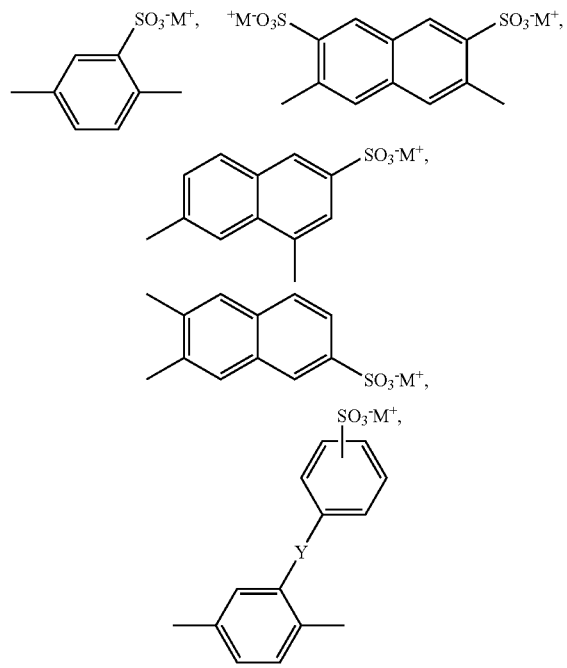

In addition, Ar represents the none sulfonated aromatic, and

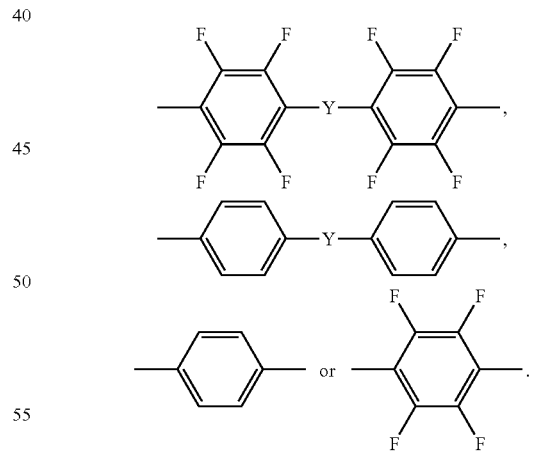

Y is a single bond in which carbon and carbon are directly connected to each other, —O—, —S—,

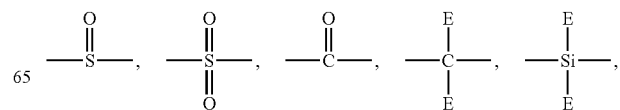

-continued

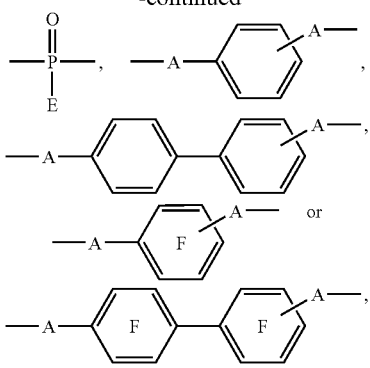

A is a single bond in which carbon and carbon are directly connected to each other, —O—, —S—,

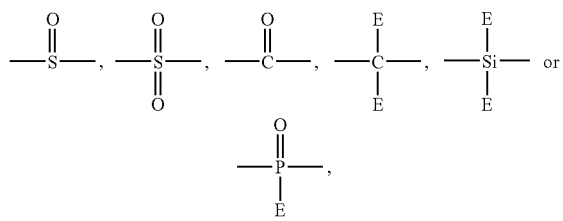

E is H, CH₃, F, CF₃, C1~C5 or

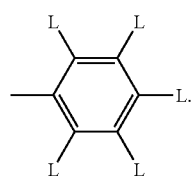

In addition, in Y,

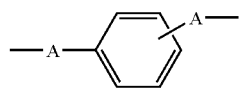

represents a benzene structure in which a connection moiety is capable of being positioned at an ortho, metha, or para positions, and

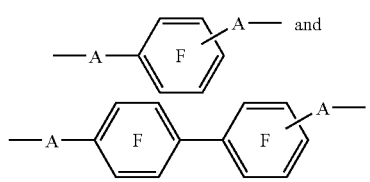

represents a benzene structure in which fluorine is completely substituted and a connection moiety is capable of being positioned at ortho, metha, or para positions.

In addition, in E, H represents hydrogen, F represents fluorine, C1~C5 represents an alkyl structure that has 1 to 5 carbon atoms and is substituted with hydrogen or fluorine, and

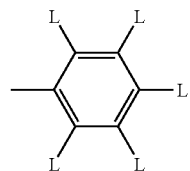

represents a structure in which L is substituted in benzene. L represents H, F, or C1~C5, H represents hydrogen, F represents fluorine, C1~C5 represents an alkyl structure that has 1 to 5 carbon atoms and is substituted with hydrogen or fluorine.

In addition, Z is a bond in which carbon of benzene is directly bonded to —SO₃⁻M⁺,

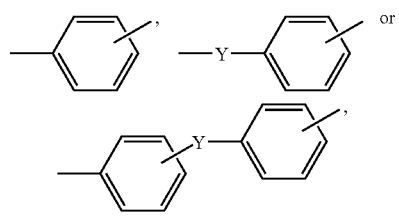

and may be positioned at ortho, metha, or para positions. The meaning of Y in Z is the same as the meaning of Y as described above.

M⁺ is a counterion having a cation charge, and represents a potassium ion (K⁺), a sodium ion (Na⁺) or alkyl amine (⁺NR₄) or the like, and preferably the potassium ion or the sodium ion.

CM is a crosslinkable moiety, and

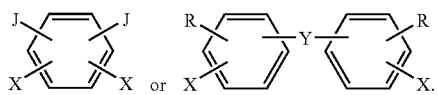

In CM, J is

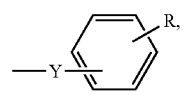

R is a triple bond that is substituted by R1 (ethynyl part)

(R = ——≡R1), a double bond (vinyl part)

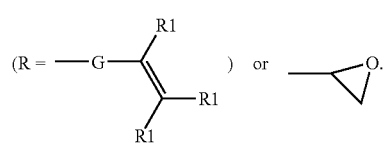

In R, G is a single bond in which carbon and carbon are directly connected to each other, —O—, —S— or

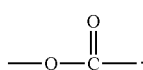

In addition, R1 is H, F, C1~C5 or

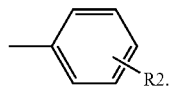

In R1, H represents hydrogen, F represents fluorine, C1~C5 represents an alkyl structure that has 1 to 5 carbon atoms and is substituted with hydrogen or fluorine, and R2 represents a substituent that has a benzene structure that is capable of being substituted at the ortho, metha, and para positions. R2 is H, X, or C1~C5. In R2, H represents hydrogen, and C1~C5 represents an alkyl structure that has 1 to 5 carbon atoms and is substituted with hydrogen or fluorine, x corresponds to a halogen atom, and X may be a functional group that can perform the polymerization in conjunction with a hydroxy group of another polymer chain. In CM, the meaning of Y is the same as the meaning of Y as described above.

In addition, in Formula 2, k, s, b and d represents a molar ratio of each of the monomers. K is in the range of 0.001-1.000, s=1−k, b is in the range of 0.001-1.000, and d=1−b. In addition, n represents a repeating unit of the polymer, and n is an integer and is in the range of 10~500.

ECM represents a crosslinkable moiety at the end thereof (End-capping crosslinkable moiety), and is

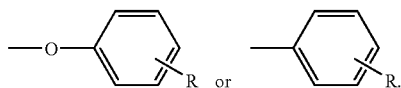

In ECM, R is a triple bond that is substituted by R1 (ethynyl part)

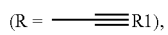

a double bond (vinyl part)

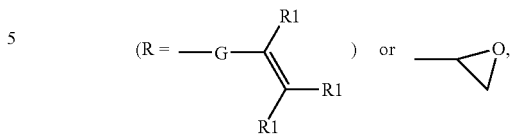

and may be positioned at the ortho, metha, or para position thereof. In R, G is a single bond in which carbon and carbon are directly connected to each other, —O—, —S— or

In addition, R1 is H, F, C1~C5 or

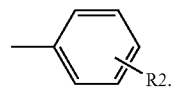

In R1, H represents hydrogen, F represents fluorine, C1~C5 represent an alkyl structure that has 1 to 5 carbon atoms and is substituted by hydrogen or fluorine, and R2 is a substituent that has the benzene structure capable of being substituted at ortho, metha, and para positions. R2 is H, X, or C1~C5. In R2, H represents hydrogen, C1~C5 represent an alkyl structure that has 1 to 5 carbon atoms and is substituted by hydrogen or fluorine, and X corresponds to the halogen atom, and in the case of X, it is a functional group that is capable of being polymerized in conjunction with the hydroxyl group of another polymer chain.

That is, the sulfonated poly(arylene ether) copolymer of the present Example is the polymer in which ECM is added to a portion that is capable of being crosslinked at an end of the structure of Formula 1 that is disclosed in Example 1.

The sulfonated poly(arylene ether) copolymer that has the crosslinking structure in and the end of the chain of the polymer of Formula 2 according to Example 2 of the present invention is produced by the following Reaction Equation 32.

[Reaction Equation 47]

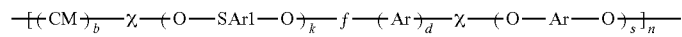

[Formula 1]

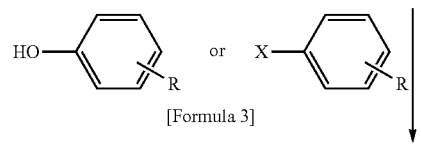

[Formula 3]

-continued

MCE─⟮⟨CM⟩$_b$─χ─⟨O─SAr1─O⟩$_k$─f─⟨Ar⟩$_d$─χ─⟨O─Ar─O⟩$_s$⟩$_n$─ECM

[Formula 2]

In Reaction Equation 47, by additionally reacting the monomer

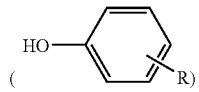

in which hydroxyl of Formula 3 is substituted or the monomer

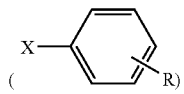

in which halide is substituted with the copolymer of Formula 1 that is formed by Reaction Equation 1 of Example 1, the sulfonated poly(arylene ether) copolymer that has the crosslinking structure in and at the end of the chain of the polymer that is disclosed in Formula 2 is synthesized.

In addition, in Reaction Equation 47, in the case of when (k+s)/(b+d) has the value that is not more than 1.000, the monomer in which hydroxyl is substituted is used, and in the case of when (k+s)/(b+d) has the value that is not less than 1.000, the monomer in which halide is substituted is used. In Formula 1, in the case of when R2 is X, regardless of the value of (k+s)/(b+d) in Formula 3, the monomer

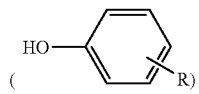

in which hydroxyl of Formula 3 is substituted may be used.

With reference to the production process of Reaction Equation 47, the sulfonated dihydroxy monomer and the none sulfonated dihydroxy monomer are activated. The activation process is the same as that disclosed in Example 1. In addition, the synthesis of the copolymer of Formula 1 is the same as that disclosed in Example 1.

Continuously, by using the polymer of Formula 1 and the monomer in which hydroxyl of Formula 3 is substituted or the monomer in which halide is substituted, the polymer in which the crosslinking structure is substituted in and at an end of the chain of the polymer of Formula 2 is formed.

The formation reaction of Formula 2 uses the same method as the production method of the polymer of Formula 1. That is, by using the activation step and the polycondensation step, the polymer in which the crosslinking structure is substituted in and at the end of the chain of the polymer of Formula 3. In addition, before the polycondensation step after the activation step, a step for removing the azeotropic solvent may further provided.

In addition, in the present Example, in order to improve the thermal stability, the electrochemical property, the film formation ability, the dimensional stability, the mechanical stability, the chemical property, the physical property, the cell performance and the like of the polymer that is represented by Formula 2, by substituting CM (crosslinkable moiety) and ECM (end-capping crosslinkable moiety) that include the crosslinkable group capable of being thermally crosslinked in and at the end of the chain of the polymer by the polycondensation reaction, the sulfonated poly(arylene ether) copolymer that includes the crosslinking structure in and at the end of the chain of the polymer of Formula 2 that is required in the present invention is produced.

In the polycondensation reaction and the crosslinkable group introduction reaction for synthesizing the sulfonated poly(arylene ether) copolymer that includes the crosslinking structure in and at the end of the polymer that is required in the present invention, as the base, the inorganic base that is selected from an alkali metal, hydroxides of an alkali earth metal, carbonate and sulfate may be used, or an organic base that is selected from ammonia and general amines may be used.

In addition, a non protonic polar solvent or a protonic polar solvent may be used as the reaction solvent. N-methylpyrrolidone (NMP), dimethyl formamide (DMF), N,N-dimethyl acetamide (DMAc), dimethyl sulfoxide (DMSO) or the like may be used as the non protonic polar solvent, methylene chloride ($CH_2Cl_2$), chloroform ($CH_3Cl$) or tetrahydrofurane (THF) may be used as the protonic polar solvent, and benzene, toluene, xylene or the like may be used as the azeotropic solvent.

In the sulfonated poly(arylene ether) copolymer that includes the crosslinking structure in the chain of the polymer that is produced by the above-mentioned method, the thermal stability, the film formation ability, the mechanical stability, the chemical property, the physical property, the cell performance and the like are the same as or better than the Nafion layer that is used as the known sulfonated poly(arylene ether) copoly or the commerced polymer electrolyte film, the electrochemical property, in particular, the proton conductivity and the cell performance are largely improved, and even though it is exposed to the moisture over a long period of time, since there is no change of the electrolyte film property, the result in which the dimension stability is high is shown.

The above present invention will be described in more detail with reference to the following Preparation Examples, but is not limited thereto.

Preparation Example 32

Production of the Sulfonated Poly(Arylene Ether) Copolymer Having the Crosslinking Structure in the Chain of the Polymer (E-SPAEDF-mSXb-100)

[Reaction Equation 48]

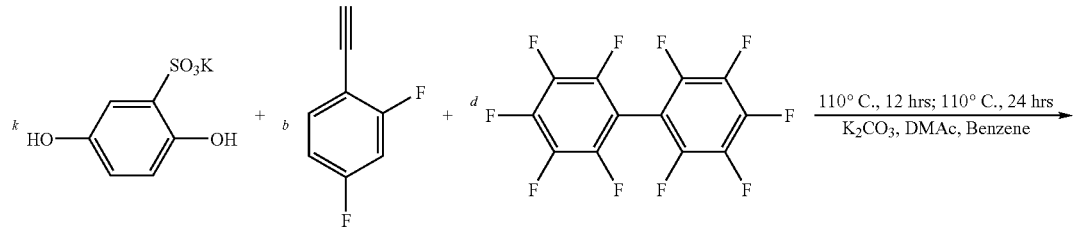

-continued

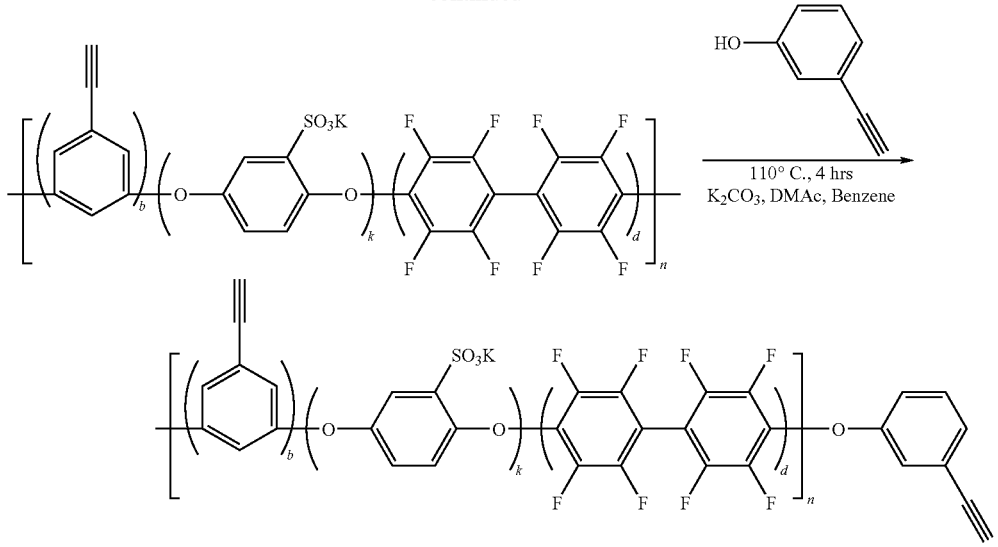

Into 250 ml of the two neck round flask that was provided with the agitation device, the nitrogen introduction pipe, the magnetic stir bar, and the Dean-Stark (azeotropic distillation), the hydroquinonesulfonic acid potassium salt was added in the molar ratio of 20 mmol (k=1) in conjunction with $K_2CO_3$ (1.15 equivalent), N,N-dimethylacetamide (DMAc) (60 ml) and benzene (20 ml).

The activation step was carried out for 6~8 hours by in creasing the temperature in the range of 105~110° C. for 6 hours, in the reaction, water that was produced as the sideproduct was removed by the azeotropic distillation method with benzene that was one of the reaction solvents, and after the activation step was finished, benzene was removed from the reactor.

Next, the molar ratio of 1-Ethynyl-3,5-difluorobenzene and decafluorobiphenyl esd 1 mmol:19 mmol (b:d=0.05: 0.95), they were added to the reactor, the reaction was carried out for 12 hours or more while the reaction temperature was maintained at 110° C., 3-ethynylphenol that is the monomer in which hydroxyl is substituted in the amount that corresponds to the molar ratio of 0.2-0.5 times as large as that of the decafluorobiphenyl monomer, benzene (10 ml), and $K_2CO_3$ (1.15 equivalent ratio) were added to the synthesized polymer solution to be further reacted for 4 hours or more at 110° C., and benzene was completely removed.

In addition, in order to remove the water that is the sideproduct in the reaction, the water was removed by the azeotropic distillation method with benzene. After the reaction was finished, they were precipitated in 500 ml of ethanol, washed several times with water and ethanol, and vacuum dried at 60° C. for 3 days. The final product was obtained as the light brown solid, and the yield was not less than 90%.

Through the above process, the copolymer that the molar ratio b is 0.05 is called as E-SPAEDF-mSX5-100. In the case of when the molar ratio b is changed, the copolymers according to the present Preparation Examples are called as E-SPAEDF-mSXb-100. In the above names, b is the value that is obtained by reducing the molar ratio with the percentage. That is, it is referred to as the structure in which the crosslinking structure is added to the end of SPAEDF-mSXb-100 that is disclosed in the Preparation Example 1.

Accordingly, the structure in which the crosslinking structure is added to the end of SPAEDF-vSXb-100 that is disclosed in the Preparation Example 1 is called as E-SPAEDF-vSXb-100. This naming is applied to the sulfonated poly (arylene ether) copolymers that are formed by Preparation Examples of Example 1 by using the same method.

In addition, the poly(arylene ether) copolymer that has the crosslinking structure in the chain of the polymer is the same as that disclosed in Example 1. However, in the process for forming the crosslinking structure at the end of the chain of the polymer, the method that is disclosed in the present Preparation Example is applied to the copolymers that are formed in Example 1 by using the same method.

Therefore, the synthesis of the poly(arylene ether) copolymer in which the crosslinking structure is formed at the end of the polymer on the basis of Preparation Examples 2 to 30 of Example 1 is apparent to those who skilled in the art even though it is not described in order to avoid the duplication of the description.

Preparation Example 33

Production of the Polymer Electrolyte Film

After the sulfonated poly(arylene ether) copolymers that was synthesized on the basis of the Preparation Example 32 and had the crosslinking structure were dissolved in the solvent, and they were filtered by using the PTFE membrane filter of 0.45~1 μm. Next, after the polymer solvent was poured on the clean glass support by using the casting method, it was left in the oven 40° C. for 24 hours.

Continuously, in order to perform the crosslinking of the inside of the polymer chain, the heat treatment was carried out at the temperature in the range of 80-350° C. for 30 min or more. In addition, it is preferable that the heat treatment is carried out at the temperature in the range of 250~260° C. for 2 hours or more.

At this time, as the solvent that is capable of being used, the dipolar solvent, in detail, N,N'-dimethyl formamide (DMF), dimethyl acetamide (DMAc), dimethyl sulfoxide (DMSO) or N-methylpyrrolidone (NMP) may be used.

After the heat treatment is finished, it is cooled to normal temperature, the acid treatment is carried out to substitute the salt ion ($Na^+$, $K^+$, and the alkyl ammonium ion) of the sulfone portion of the polymer that is produced on the basis of the Preparation Example 32 with hydrogen.

The acid treatment method uses a method in which after it is immersed in 2 normal sulfuric acid ($H_2SO_4$) aqueous solution, 1 normal nitric acid ($HNO_3$) aqueous solution or 1 normal chloric acid (HCl) aqueous solution for 24 hours, it is immersed in the distilled water for 24 hours, or it is immersed in the 0.5 mole of the sulfuric acid ($H_2SO_4$) aqueous solution and boiled for 2 hours, but is not limited thereto.

The polymer electrolyte film that is subjected to the acid treatment is immersed in the distilled water for 24 hours, and then the proton conductivity thereof is measured.

On the basis of Preparation Example 32, the names are provided to the produced polymer films according to the names of the sulfonated poly(arylene ether) copolymers. That is, in the case of when the polymer film is produced by using E-SPAEDF-mSXb-100 in Preparation Example 32, the name of the polymer film is called as E-CSPAEDF-mSXb-100.

That is, the copolymers that are formed in Example 1 are SPAEDF-mSXb-100, SPAEDF-mSXb-6Fk, SPAEDF-mSXb-BPk, SPAEDF-mSXb-HQk, SPAEDF-mSXb-DEk, SPAES-mSXb-100, SPAES-mSXb-6Fk, SPAES-mSXb-BPk, SPAES-mSXb-HQk, SPAES-mSXb-DEk, SPAEK-mSXb-100, SPAEK-mSXb-6Fk, SPAEK-mSXb-BPk, SPAEK-mSXb-HQk, SPAEK-mSXb-DEk, SPAEDF-pSXb-100, SPAEDF-pSXb-6Fk, SPAEDF-pSXb-BPk, SPAEDF-pSXb-HQk, SPAEDF-pSXb-DEk, SPAES-pSXb-100, SPAES-pSXb-6Fk, SPAES-pSXb-BPk, SPAES-pSXb-HQk, SPAES-pSXb-DEk, SPAEK-pSXb-100, SPAEK-pSXb-6Fk, SPAEK-pSXb-BPk, SPAEK-pSXb-HQk, and SPAEK-pSXb-DEk, and in the case of when the monomer in which the halide is substituted or the monomer in which the hydroxyl group is substituted is applied to include the crosslinking structure at the end of the polymer in the present Example on the basis of it, these copolymers are sequentially called as E-SPAEDF-mSXb-100, E-SPAEDF-mSXb-6Fk, E-SPAEDF-mSXb-BPk, E-SPAEDF-mSXb-HQk, E-SPAEDF-mSXb-DEk, E-SPAES-mSXb-100, E-SPAES-mSXb-6Fk, E-SPAES-mSXb-BPk, E-SPAES-mSXb-HQk, E-SPAES-mSXb-DEk, E-SPAEK-mSXb-100, E-SPAEK-mSXb-6Fk, E-SPAEK-mSXb-BPk, E-SPAEK-mSXb-HQk, E-SPAEK-mSXb-DEk, E-SPAEDF-pSXb-100, E-SPAEDF-pSXb-6Fk, E-SPAEDF-pSXb-BPk, E-SPAEDF-pSXb-HQk, E-SPAEDF-pSXb-DEk, E-SPAES-pSXb-100, E-SPAES-pSXb-6Fk, E-SPAES-pSXb-BPk, E-SPAES-pSXb-HQk, E-SPAES-pSXb-DEk, E-SPAEK-pSXb-100, E-SPAEK-pSXb-6Fk, E-SPAEK-pSXb-BPk, E-SPAEK-pSXb-HQk, and E-SPAEK-pSXb-DEk.

In addition, the polymer electrolyte films that are formed on the basis of this are sequentially called as E-CSPAEDF-mSXb-100, E-CSPAEDF-mSXb-6Fk, E-CSPAEDF-mSXb-BPk, E-CSPAEDF-mSXb-HQk, E-CSPAEDF-mSXb-DEk, E-CSPAES-mSXb-100, E-CSPAES-mSXb-6Fk, E-CSPAES-mSXb-BPk, E-CSPAES-mSXb-HQk, E-CSPAES-mSXb-DEk, E-CSPAEK-mSXb-100, E-CSPAEK-mSXb-6Fk, E-CSPAEK-mSXb-BPk, E-CSPAEK-mSXb-HQk, E-CSPAEK-mSXb-DEk, E-CSPAEDF-pSXb-100, E-CSPAEDF-pSXb-6Fk, E-CSPAEDF-pSXb-BPk, E-CSPAEDF-pSXb-HQk, E-CSPAEDF-pSXb-DEk, E-CSPAES-pSXb-100, E-CSPAES-pSXb-6Fk, E-CSPAES-pSXb-BPk, E-CSPAES-pSXb-HQk, E-CSPAES-pSXb-DEk, E-CSPAEK-pSXb-100, E-CSPAEK-pSXb-6Fk, E-CSPAEK-pSXb-BPk, E-CSPAEK-pSXb-HQk, and E-CSPAEK-pSXb-DEk.

The following Table 6 shows the solubilities of the 30 polymer electrolyte films.

TABLE 6

| polymer electrolyte film | NMP | DMAc | DMSO | DMF | THF | Acetone | CHCl$_3$ | MeOH | Water |
|---|---|---|---|---|---|---|---|---|---|
| E-CSPAEDF-mSXb-100 | I | I | I | I | I | I | I | I | I |
| E-CSPAEDF-mSXb-6Fk | I | I | I | I | I | I | I | I | I |
| E-CSPAEDF-mSXb-BPk | I | I | I | I | I | I | I | I | I |
| E-CSPAEDF-mSXb-HQk | I | I | I | I | I | I | I | I | I |
| E-CSPAEDF-mSXb-DEk | I | I | I | I | I | I | I | I | I |
| E-CSPAES-mSXb-100 | I | I | I | I | I | I | I | I | I |
| E-CSPAES-mSXb-6Fk | I | I | I | I | I | I | I | I | I |
| E-CSPAES-mSXb-BPk | I | I | I | I | I | I | I | I | I |
| E-CSPAES-mSXb-HQk | I | I | I | I | I | I | I | I | I |
| E-CSPAES-mSXb-DEk | I | I | I | I | I | I | I | I | I |
| E-CSPAEK-mSXb-100 | I | I | I | I | I | I | I | I | I |
| E-CSPAEK-mSXb-6Fk | I | I | I | I | I | I | I | I | I |
| E-CSPAEK-mSXb-BPk | I | I | I | I | I | I | I | I | I |
| E-CSPAEK-mSXb-HQk | I | I | I | I | I | I | I | I | I |
| E-CSPAEK-mSXb-DEk | I | I | I | I | I | I | I | I | I |
| E-CSPAEDF-pSXb-100 | I | I | I | I | I | I | I | I | I |
| E-CSPAEDF-pSXb-6Fk | I | I | I | I | I | I | I | I | I |

TABLE 6-continued

| polymer electrolyte film | NMP | DMAc | DMSO | DMF | THF | Acetone | CHCl$_3$ | MeOH | Water |
|---|---|---|---|---|---|---|---|---|---|
| E-CSPAEDF-pSXb-BPk | I | I | I | I | I | I | I | I | I |
| E-CSPAEDF-pSXb-HQk | I | I | I | I | I | I | I | I | I |
| E-CSPAEDF-pSXb-DEk | I | I | I | I | I | I | I | I | I |
| E-CSPAES-pSXb-100 | I | I | I | I | I | I | I | I | I |
| E-CSPAES-pSXb-6Fk | I | I | I | I | I | I | I | I | I |
| E-CSPAES-pSXb-BPk | I | I | I | I | I | I | I | I | I |
| E-CSPAES-pSXb-HQk | I | I | I | I | I | I | I | I | I |
| E-CSPAES-pSXb-DEk | I | I | I | I | I | I | I | I | I |
| E-CSPAEK-pSXb-100 | I | I | I | I | I | I | I | I | I |
| E-CSPAEK-pSXb-6Fk | I | I | I | I | I | I | I | I | I |
| E-CSPAEK-pSXb-BPk | I | I | I | I | I | I | I | I | I |
| E-CSPAEK-pSXb-HQk | I | I | I | I | I | I | I | I | I |
| E-CSPAEK-pSXb-DEk | I | I | I | I | I | I | I | I | I |

As seen in Table 6, I (insolubility) represents that the polymer electrolyte film is not dissolved in any solvents but is subjected to the crosslinking. In addition, it can be seen that it is chemically very stable and has the excellent dimensional stability.

Table 7 shows that the ion exchange ability of the polymer electrolyte film that is produced by the present Example is compared to that of the Nafion that is currently commercialized.

TABLE 7

| electrolyte film | ion exchange ability (meq/g) test value[a] | electrolyte film | ion exchange ability (meq/g) test value[a] |
|---|---|---|---|
| E-CSPAEDF-mSX10-100 | 2.12 | E-CSPAES-mSX10-100 | 2.50 |
| E-CSPAEDF-mSX20-100 | 2.28 | E-CSPAEK-mSX10-100 | 2.68 |
| E-CSPAEDF-mSX10-6F90 | 1.85 | E-CSPAES-mSX10-6F90 | 2.20 |
| E-CSPAEDF-mSX20-6F90 | 1.95 | E-CSPAEK-mSX10-6F90 | 2.35 |
| E-CSPAEDF-mSX10-6F80 | 1.59 | E-CSPAES-mSX10-6F80 | 1.88 |
| E-CSPAEDF-mSX20-6F80 | 1.71 | E-CSPAEK-mSX10-6F80 | 1.99 |
| E-CSPAEDF-mSX10-BP90 | 1.92 | E-CSPAES-mSX10-BP90 | 2.21 |
| E-CSPAEDF-mSX20-BP90 | 2.05 | E-CSPAEK-mSX10-BP90 | 2.48 |
| E-CSPAEDF-mSX10-BP80 | 1.72 | E-CSPAES-mSX10-BP80 | 2.01 |
| E-CSPAEDF-mSX20-BP80 | 1.84 | E-CSPAEK-mSX10-BP80 | 2.15 |
| E-CSPAEDF-mSX10-HQ90 | 1.91 | E-CSPAES-mSX10-HQ90 | 2.17 |
| E-CSPAEDF-mSX20-HQ90 | 2.05 | E-CSPAEK-mSX10-HQ90 | 2.45 |
| E-CSPAEDF-mSX10-HQ80 | 1.75 | E-CSPAES-mSX10-HQ80 | 2.10 |
| E-CSPAEDF-mSX20-HQ80 | 1.89 | E-CSPAEK-mSX10-HQ80 | 2.32 |
| E-CSPAEDF-mSX10-DE90 | 1.91 | E-CSPAES-mSX10-DE90 | 2.27 |
| E-CSPAEDF-mSX20-DE90 | 2.05 | E-CSPAEK-mSX10-DE90 | 2.45 |
| E-CSPAEDF-mSX10-DE80 | 1.68 | E-CSPAES-mSX10-DE80 | 1.91 |
| E-CSPAEDF-mSX20-DE80 | 1.78 | E-CSPAEK-mSX10-DE80 | 2.12 |
| E-CSPAEDF-pSX10-100 | 2.15 | E-CSPAES-pSX10-100 | 2.52 |
| E-CSPAEDF-pSX20-100 | 2.21 | E-CSPAEK-pSX10-100 | 2.61 |
| E-CSPAEDF-pSX10-6F90 | 1.80 | E-CSPAES-pSX10-6F90 | 1.93 |
| E-CSPAEDF-pSX20-6F90 | 1.95 | E-CSPAEK-pSX10-6F90 | 2.35 |
| E-CSPAEDF-pSX10-6F80 | 1.62 | E-CSPAES-pSX10-6F80 | 1.87 |
| E-CSPAEDF-pSX20-6F80 | 1.72 | E-CSPAEK-pSX10-6F80 | 2.05 |
| E-CSPAEDF-pSX10-BP90 | 1.89 | E-CSPAES-pSX10-BP90 | 2.23 |
| E-CSPAEDF-pSX20-BP90 | 2.03 | E-CSPAEK-pSX10-BP90 | 2.43 |

TABLE 7-continued

| electrolyte film | ion exchange ability (meq/g) test value[a] | electrolyte film | ion exchange ability (meq/g) test value[a] |
|---|---|---|---|
| E-CSPAEDF-pSX10-BP80 | 1.70 | E-CSPAES-pSX10-BP80 | 1.95 |
| E-CSPAEDF-pSX20-BP80 | 1.84 | E-CSPAEK-pSX10-BP80 | 2.22 |
| E-CSPAEDF-pSX10-HQ90 | 1.97 | E-CSPAES-pSX10-HQ90 | 2.34 |
| E-CSPAEDF-pSX20-HQ90 | 2.05 | E-CSPAEK-pSX10-HQ90 | 2.48 |
| E-CSPAEDF-pSX10-HQ80 | 1.65 | E-CSPAES-pSX10-HQ80 | 2.10 |
| E-CSPAEDF-pSX20-HQ80 | 1.89 | E-CSPAEK-pSX10-HQ80 | 2.32 |
| E-CSPAEDF-pSX10-DE90 | 1.91 | E-CSPAES-pSX10-DE90 | 2.23 |
| E-CSPAEDF-pSX20-DE90 | 2.05 | E-CSPAEK-pSX10-DE90 | 2.39 |
| E-CSPAEDF-pSX10-DE80 | 1.71 | E-CSPAES-pSX10-DE80 | 1.97 |
| E-CSPAEDF-pSX20-DE80 | 1.82 | E-CSPAEK-pSX10-DE80 | 2.21 |
| Nafion 117 | 0.91 | Nafion 117 | 0.91 |

[a]after it is immersed in the 0.01N NaCl solution for 24 hours, the measurement is performed by titrating it with 0.01N NaOH. (phenolphthalane is used as the indicator)

As seen in Table 7, the ion exchange ability of the produced polymer electrolyte film is very high in comparison with that of the Nafion. Accordingly, it can be expected that the proton conductivity that is the most important property of the polymer electrolyte film will be higher than that of the Nafion.

In addition, in the present Example, the water uptake and the proton conductivity of the produced polymer electrolyte film were compared to that of the Nafion that is currently commercialized, and the results are described in the following Table 8.

As seen in Table 8, it can be seen that the proton conductivity that is the most important property of the polymer electrolyte film is largely improved in comparison with that of the Nafion, and the water uptake is reduced.

In addition, on the basis of SPAEDF-vSXb-100, SPAEDF-vSXb-6Fk, SPAEDF-vSXb-BPk, SPAEDF-vSXb-HQk, SPAEDF-vSXb-DEk, SPAES-vSXb-100, SPAES-vSXb-6Fk, SPAES-vSXb-BPk, SPAES-vSXb-HQk, SPAES-vSXb-DEk, SPAEK-vSXb-100, SPAEK-vSXb-6Fk, SPAEK-vSXb-BPk, SPAEK-vSXb-HQk, and SPAEK-vSXb-Dek that were synthesized in Preparation Examples 1 to 15 of Example 1, according to the method that was disclosed in Preparation Example 32 of the present Example, E-SPAEDF-vSXb-100, E-SPAEDF-vSXb-6Fk, E-SPAEDF-vSXb-BPk, E-SPAEDF-vSXb-HQk, E-SPAEDF-vSXb-DEk, E-PAES-vSXb-100, E-PAES-vSXb-6Fk, E-SPAES-vSXb-BPk, E-SPAES-vSXb-HQk, E-SPAES-vSXb-DEk, E-SPAEK-vSXb-100, E-SPAEK-vSXb-6Fk, E-SPAEK-vSXb-BPk, E-SPAEK-vSXb-HQk, and E-SPAEK-vSXb-Dek to which the crosslinking structure was further introduced to the end of the polymer was produced.

In addition, according to the method that was disclosed in the present Preparation Example, the polymer electrolyte film was formed. The polymer electrolyte films are called as E-CSPAEDF-vSXb-100, E-CSPAEDF-vSXb-6Fk, E-CSPAEDF-vSXb-BPk, E-CSPAEDF-vSXb-HQk, E-CSPAEDF-vSXb-DEk, E-CPAES-vSXb-100, E-CPAES-vSXb-6Fk, E-CSPAES-vSXb-BPk, E-CSPAES-vSXb-HQk, E-CSPAES-vSXb-DEk, E-CSPAEK-vSXb-100, E-CSPAEK-vSXb-6Fk, E-CSPAEK-vSXb-BPk, E-CSPAEK-vSXb-HQk, and E-CSPAEK-vSXb-Dek according to the order of the poly(arylene ether) copolymers in which the crosslinking structure is further introduced at the end of the polymer.

The following Table 9 shows the measured solubility of the 15 polymer electrolyte films.

TABLE 8

| electrolyte film | ionconductivity (S/cm)[a] | water uptake (wt %)[b] | electrolyte film | ionconductivity (S/cm)[a] | water uptake (wt %)[b] |
|---|---|---|---|---|---|
| E-CSPAEDF-mSX10-100 | 0.128 | 91 | E-CSPAEDF-pSX10-100 | 0.126 | 90 |
| E-CSPAEDF-mSX20-100 | 0.115 | 72 | E-CSPAEDF-pSX20-100 | 0.115 | 71 |
| E-CSPAEDF-mSX10-6F90 | 0.101 | 37 | E-CSPAEDF-pSX10-6F90 | 0.098 | 35 |
| E-CSPAEDF-mSX10-6F80 | 0.068 | 23 | E-CSPAEDF-pSX10-6F80 | 0.070 | 24 |
| E-CSPAEDF-mSX10-BP90 | 0.098 | 35 | E-CSPAEDF-pSX10-BP90 | 0.099 | 35 |
| E-CSPAEDF-mSX10-BP80 | 0.070 | 26 | E-CSPAEDF-pSX10-BP80 | 0.071 | 26 |
| E-CSPAEDF-mSX10-HQ90 | 0.112 | 42 | E-CSPAEDF-pSX10-HQ90 | 0.111 | 40 |
| E-CSPAEDF-mSX10-HQ80 | 0.079 | 31 | E-CSPAEDF-pSX10-HQ80 | 0.080 | 31 |
| E-CSPAEDF-mSX10-DE90 | 0.101 | 38 | E-CSPAEDF-pSX10-DE90 | 0.102 | 40 |
| E-CSPAEDF-mSX10-DE80 | 0.069 | 29 | E-CSPAEDF-pSX10-DE80 | 0.072 | 30 |
| Nafion 117 | 0.094 | 32 | Nafion 117 | 0.094 | 32 |

[a]measured by using the impedance analysis device (AutoLab, PGSTAT 30, Netherlands) {$\sigma(S/cm) = L/(R \times_2 S)$, $\sigma$ is the ion conductivity, L (cm) is the distance between the two electrodes, R (Ω) is the resistance of the film, and S (cm$^2$) is the surface area of the film through which the ions pass}
[b]the calculated weight value of the film {water uptake (%) = (Wwet − Wdry) × 100/Wdry, Wwet is the weight of the wet film, and Wdry is the weight of the dry film}

TABLE 9

| polymer electrolyte film | NMP | DMAc | DMSO | DMF | THF | Acetone | CHCl$_3$ | MeOH | Water |
|---|---|---|---|---|---|---|---|---|---|
| E-CSPAEDF-vSXb-100 | I | I | I | I | I | I | I | I | I |
| E-CSPAEDF-vSXb-6Fk | I | I | I | I | I | I | I | I | I |
| E-CSPAEDF-vSXb-BPk | I | I | I | I | I | I | I | I | I |
| E-CSPAEDF-vSXb-HQk | I | I | I | I | I | I | I | I | I |
| E-CSPAEDF-vSXb-DEk | I | I | I | I | I | I | I | I | I |
| E-CSPAES-vSXb-100 | I | I | I | I | I | I | I | I | I |
| E-CSPAES-vSXb-6Fk | I | I | I | I | I | I | I | I | I |
| E-CSPAES-vSXb-BPk | I | I | I | I | I | I | I | I | I |
| E-CSPAES-vSXb-HQk | I | I | I | I | I | I | I | I | I |
| E-CSPAES-vSXb-DEk | I | I | I | I | I | I | I | I | I |
| E-CSPAEK-vSXb-100 | I | I | I | I | I | I | I | I | I |
| E-CSPAEK-vSXb-6Fk | I | I | I | I | I | I | I | I | I |
| E-CSPAEK-vSXb-BPk | I | I | I | I | I | I | I | I | I |
| E-CSPAEK-vSXb-HQk | I | I | I | I | I | I | I | I | I |
| E-CSPAEK-vSXb-DEk | I | I | I | I | I | I | I | I | I |

As seen in I (insolubility) of Table 9, the polymer electrolyte film was not dissolved in any solvents but was subjected to the crosslinking. In addition, it can be seen that it was chemically very stable and had the excellent dimensional stability.

The ion exchange ability of the polymer electrolyte film is compared to that of the Nafion that is currently commercialized in Table 10.

TABLE 10

| electrolyte film | ion exchange ability (meq/g) test value[a] | electrolyte film | ion exchange ability (meq/g) test value[a] |
|---|---|---|---|
| E-CSPAEDF-vSX10-100 | 2.09 | E-CSPAES-vSX10-100 | 2.35 |
| E-CSPAEDF-vSX20-100 | 2.10 | E-CSPAEK-vSX10-100 | 2.66 |
| E-CSPAEDF-vSX10-6F90 | 1.78 | E-CSPAES-vSX10-6F90 | 2.12 |
| E-CSPAEDF-vSX20-6F90 | 1.83 | E-CSPAEK-vSX10-6F90 | 2.34 |
| E-CSPAEDF-vSX10-BP90 | 1.86 | E-CSPAES-vSX10-BP90 | 2.20 |
| E-CSPAEDF-vSX20-BP90 | 1.95 | E-CSPAEK-vSX10-BP90 | 2.43 |
| E-CSPAEDF-vSX10-HQ90 | 1.93 | E-CSPAES-vSX10-HQ90 | 2.29 |
| E-CSPAEDF-vSX20-HQ90 | 1.90 | E-CSPAEK-vSX10-HQ90 | 2.47 |
| E-CSPAEDF-vSX10-DE90 | 1.87 | E-CSPAES-vSX10-DE90 | 2.24 |
| E-CSPAEDF-vSX20-DE90 | 1.85 | E-CSPAEK-vSX10-DE90 | 2.38 |
| Nafion 117 | 0.91 | Nafion 117 | 0.91 |

[a]after it is immersed in the 0.01N NaCl solution for 24 hours, the measurement is performed by titrating it with 0.01N NaOH. (phenolphthalane is used as the indicator)

As seen in Table 10, the ion exchange ability of the produced polymer electrolyte film is very high in comparison with that of the Nafion. Accordingly, it can be expected that the proton conductivity that is the most important property of the polymer electrolyte film will be higher than that of the Nafion.

What is claimed is:

1. A poly(arylene ether) copolymer that has a crosslinking structure in a polymer chain that is represented by the following Formula 1 and is sulfonated:

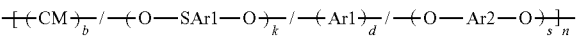

wherein SAr1 is

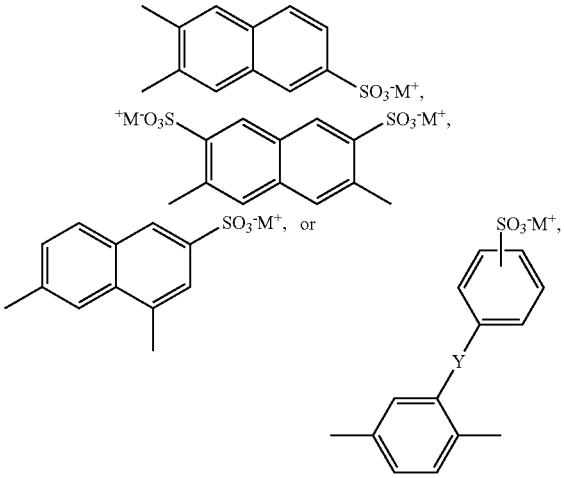

Ar1 represents a first non sulfonated aromatic, Ar2 represents a second non sulfonated aromatic, and CM represents a crosslinkable moiety, wherein SAr1, Ar1, Ar2, and CM are different respectively, wherein k is in the range of 0.001-1.000, s=1-k, b is in the range of 0.001-1.000, d=1-b, n represents a repeating unit of a polymer, and n is an integer and is in the range of 10 to 500, wherein CM is

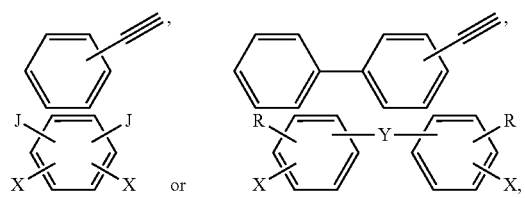

in CM, X is a halogen, J is

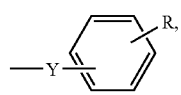

R is a triple bond that is substituted by R1 (ethynyl part)

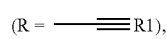

a double bond (vinyl part)

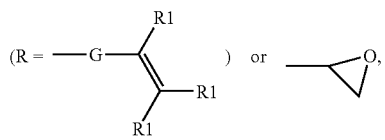

in R, G is a single bond in which carbon and carbon are directly connected to each other, —O—, —S— or

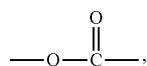

R1 is H, F, C1~C5 alkyl or

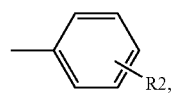

R2 is H, X, or C1~C5 alkyl, Y is a single bond in which carbon and carbon are directly connected to each other, —O—, —S—,

-continued

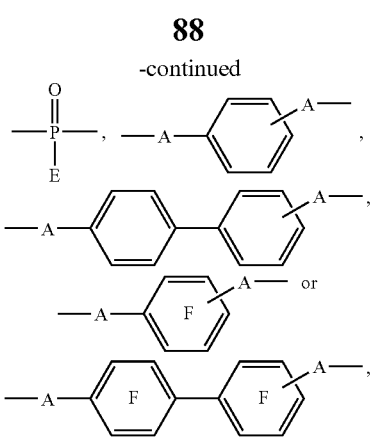

A is a single bond in which carbon and carbon are directly connected to each other, —O—, —S—,

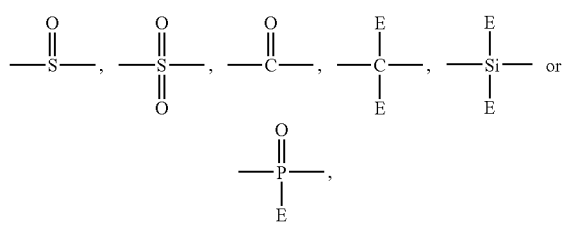

E is H, CH$_3$, F, CF$_3$, C1~C5 alkyl, or

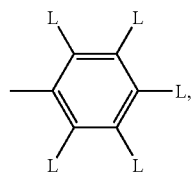

L is H, F, or C1~C5 alkyl, and

is a fluorinated phenylene, and M+ is a counterion having a cation charge.

2. The poly(arylene ether) copolymer that has a crosslinking structure in a polymer chain and is sulfonated according to claim 1, Ar1 or Ar2 is

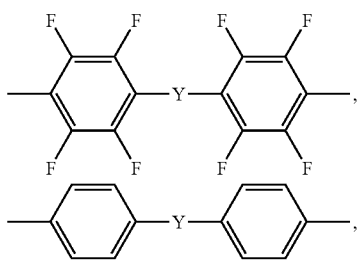

-continued

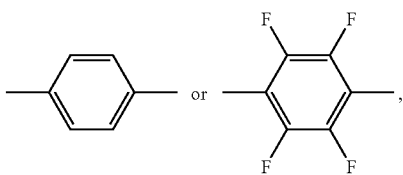

Y is a single bond in which carbon and carbon are directly connected to each other, —O—, —S—,

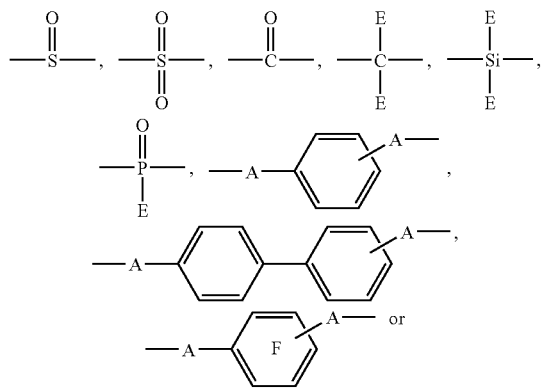

E is H, CH3, F, CF3, C1~C5 alkyl or

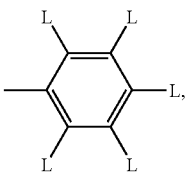

L is H, F, or C1~C5 alkyl,

is a fluorinated phenylene.

3. The poly(arylene ether) copolymer that has a crosslinking structure in a polymer chain and is sulfonated according to claim 2, wherein the counterion that has the cation charge is potassium ion, sodium ion or alkyl amine.

4. The poly(arylene ether) copolymer that has a crosslinking structure in a polymer chain and is sulfonated according to claim 1, wherein the sulfonated poly(arylene ether) copolymer of Formula 1 is formed according to the following Reaction Equation 1 which includes the polycondensation reaction of a sulfonated dihydroxy monomer (HO—SAr1-OH), a non sulfonated dihydroxy monomer (HO—Ar2-OH), a crosslinkable dihalide monomer (X-CM-X), and a non sulfonated dihalide monomer (X—Ar1-X):

[Reaction Equation 1]

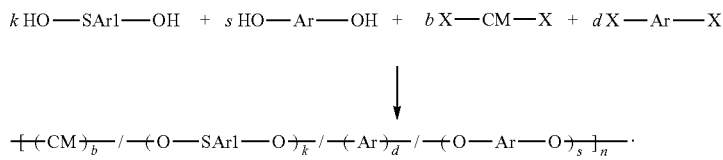

-continued

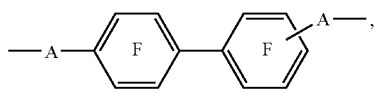

A is a single bond in which carbon and carbon are directly connected to each other, —O—, —S—,

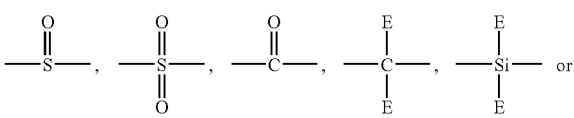

or

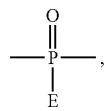

5. The poly(arylene ether) copolymer that has a crosslinking structure in a polymer chain and is sulfonated according to claim 4, wherein the polycondensation reaction is carried out in the presence of a solvent that includes a base, an azeotropic solvent, and a polar solvent at a temperature in the range of 0~300° C. for 1 to 100 hours.

6. The poly(arylene ether) copolymer that has a crosslinking structure in a polymer chain and is sulfonated according to claim 5, wherein the base is an inorganic base that is selected from an alkali metal, hydroxides of an alkali earth metal, carbonate and sulfate, or an organic base that is selected from ammonia and general amines, the polar solvent is a non protonic polar solvent or a protonic polar solvent, N-methylpyrrolidone (NMP), dimethyl formamide (DMF), N,N-dimethyl acetamide (DMAc) or dimethyl sulfoxide (DMSO) is used as the non protonic polar solvent, methylene chloride (CH2Cl2), chloroform (CH3Cl) or tetrahydrofurane (THF) is used as the protonic polar solvent, and the azeotropic solvent is benzene, toluene or xylene.

* * * * *